US011861456B2

(12) United States Patent
Langer et al.

(10) Patent No.: US 11,861,456 B2
(45) Date of Patent: Jan. 2, 2024

(54) APPARATUSES, COMPUTER-IMPLEMENTED METHODS, AND COMPUTER PROGRAM PRODUCTS FOR INSTRUCTION COMPILATION FOR AT LEAST ONE TIME SLICE IN A ONE-DIMENSIONAL QUANTUM COMPUTING ENVIRONMENT

(71) Applicant: Quantinuum LLC, Broomfield, CO (US)

(72) Inventors: Christopher Eugene Langer, Highlands Ranch, CO (US); Dominic George Lucchetti, Louisville, CO (US)

(73) Assignee: Quantinuum LLC, Broomfield, CO (US)

( * ) Notice: Subject to any disclaimer, the term of this patent is extended or adjusted under 35 U.S.C. 154(b) by 407 days.

(21) Appl. No.: 17/319,511

(22) Filed: May 13, 2021

(65) Prior Publication Data

US 2021/0374594 A1 Dec. 2, 2021

Related U.S. Application Data

(60) Provisional application No. 63/031,410, filed on May 28, 2020.

(51) Int. Cl.
*G06N 10/00* (2022.01)
*G06F 8/41* (2018.01)

(52) U.S. Cl.
CPC ............... *G06N 10/00* (2019.01); *G06F 8/41* (2013.01)

(58) Field of Classification Search
CPC .................................. G06N 10/00; G06F 8/41

USPC ........................................................ 716/100
See application file for complete search history.

(56) References Cited

U.S. PATENT DOCUMENTS

| | | | | |
|---|---|---|---|---|
| 11,494,681 B1 * | 11/2022 | Peterson | ................ | G06N 10/00 |
| 2004/0238813 A1 * | 12/2004 | Lidar | ..................... | B82Y 10/00 |
| | | | | 257/31 |
| 2019/0095561 A1 * | 3/2019 | Pednault | ................. | G06F 17/16 |
| 2019/0197426 A1 * | 6/2019 | Kawano | ................... | G06F 17/14 |
| 2020/0394544 A1 * | 12/2020 | Low | ....................... | G16C 10/00 |
| 2021/0279631 A1 * | 9/2021 | Pichler | ................... | G06N 10/20 |
| 2021/0374594 A1 * | 12/2021 | Langer | ..................... | G06F 8/41 |
| 2022/0164505 A1 * | 5/2022 | Mosca | .................... | G06N 10/20 |

(Continued)

OTHER PUBLICATIONS

Alexander Cowtan et al: "On the qubit routing problem", arxiv.org, Cornell University Library, 201 Olin Library Cornell University Ithaca, NY 14853, Feb. 21, 2019 (Feb. 21, 2019), XP081031832.

(Continued)

*Primary Examiner* — Suchin Parihar
(74) *Attorney, Agent, or Firm* — Alston & Bird LLP

(57) ABSTRACT

Various embodiments of the present disclosure provide for instruction compilation for at least one time slice in a one-dimensional quantum computing environment. In this regard, embodiments generate an algorithm swap command set by performing an even-odd transposition sort based on at least an initial qubit position set and a target qubit position set for one or more time slices. The algorithm swap command set may correspond to a qubit manipulation instruction set which can be used to generate a hardware instruction set that, upon execution, efficiently repositions any number of qubits to the target positions for gating.

20 Claims, 35 Drawing Sheets

| Qubit Set: | 0 | 1 | 2 | 3 | 4 | 5 | 6 | 7 | 304 |
|---|---|---|---|---|---|---|---|---|---|
| Initial Qubit Position Set: | 0 | 1 | 2 | 3 | 4 | 5 | 6 | 7 | 402 |
| Target Qubit Position Set: | 2 | 0 | 1 | 4 | 5 | 6 | 7 | 3 | 404 |

| | | | | | | | | | |
|---|---|---|---|---|---|---|---|---|---|
| Algorithm Start | 2 | 0 | 1 | 4 | 5 | 6 | 7 | 3 | 502A |
| Step 1: | 0 | 2 | 1 | 4 | 5 | 6 | 3 | 7 | 502B |
| Step 2: | 0 | 1 | 2 | 4 | 5 | 3 | 6 | 7 | 502C |
| Step 3: | 0 | 1 | 2 | 4 | 3 | 5 | 6 | 7 | 502D |
| Step 4: | 0 | 1 | 2 | 3 | 4 | 5 | 6 | 7 | 502E |

| L | R | - | - | - | - | L | R | |
|---|---|---|---|---|---|---|---|---|
| - | L | R | - | - | L | R | - | 504 |
| - | - | - | - | L | R | - | - | |
| - | - | - | L | R | - | - | - | |

(56) References Cited

U.S. PATENT DOCUMENTS

| | | | | |
|---|---|---|---|---|
| 2022/0391571 A1* | 12/2022 | Dhand | .................. | G06N 10/20 |
| 2022/0414507 A1* | 12/2022 | Chernoguzov | ........ | G06N 10/20 |
| 2023/0016119 A1* | 1/2023 | Wei | ........................ | G06N 10/60 |
| 2023/0071000 A1* | 3/2023 | Higgott | ................. | G06N 10/70 |

OTHER PUBLICATIONS

Damian S Steiger et al: "Advantages of a modular high-level quantum programming framework", arxiv.org, Cornell University Library, 201 Olin Library Cornell University Ithaca, NY 14853, Jun. 5, 2018 (Jun. 5, 2018), XP080887446.
European Search Report and Search Opinion received for EP Application No. 21175477.5, dated Nov. 17, 2021, 9 pages.
Khan Arif et al: "Mapping Arbitrarily Sparse Two-Body Interactions on One-Dimensional Quantum Circuits", 2019 IEEE 26th International Conference On High Performance Computing, Data, and Analytics (HIPC), IEEE, Dec. 17, 2019 (Dec. 17, 2019), pp. 52-62, XP033713752,.
Lalengmawia C et al: "Compiling NCV Quantum Circuits for Nearest Neighbour Realization", 2020 International Conference On Emerging Trends in Information Technology and Engineering (IC-ETITE), IEEE, Feb. 24, 2020 (Feb. 24, 2020), pp. 1-5, XP033764596.
Yuichi Hirata et al: "An Efficient Conversion of Quantum Circuits to a Linear Nearest Neighbor Architecture", Quantum Information and Computation, vol. 11, Jan. 1, 2011 (Jan. 1, 2011), pp. 142-166, XP055497722.
Notification of Correction issued in Chinese Application No. 202110595306.6 dated Jun. 22, 2021, 1 page.

* cited by examiner

Time Slice: k

Qubit Set: | 0 | 1 | 2 | 3 | 4 | 5 | 6 | 7 | — 304

Initial Qubit Position Set: | 0 | 1 | 2 | 3 | 4 | 5 | 6 | 7 | — 402
402A — 402B — 402C — 402D — 402E — 402F — 402G — 402H Target Qubit Position Set: | 2 | 0 | 1 | 4 | 5 | 6 | 7 | 3 | — 404
404A — 404B — 404C — 404D — 404E — 404F — 404G — 404H

FIG. 4

| L | R | - | - | - | - | L | R |
|---|---|---|---|---|---|---|---|
| - | L | R | - | - | L | R | - |
| - | - | - | - | L | R | - | - |
| - | - | - | L | R | - | - | - |

504

| 1 | 0 | 0 | 0 | 0 | 0 | 1 | 0 |
|---|---|---|---|---|---|---|---|
| 0 | 1 | 0 | 0 | 0 | 1 | 0 | 0 |
| 0 | 0 | 0 | 0 | 1 | 0 | 0 | 0 |
| 0 | 0 | 0 | 1 | 0 | 0 | 0 | 0 |

602

| 1 | 0 | 0 | 1 |
|---|---|---|---|
| 1 | 0 | 1 | 0 |
| 0 | 0 | 1 | 0 |
| 0 | 1 | 0 | 0 |

─ 1752
Starting Positions Pairing Set :
{ (0, 15),
(1, 9),
(2, 6),
(3, 11),
(4, 25),
(5, 12),
(7, 24),
(8, 22),
(10, 13),
(14, 20),
(16, 27),
(17, 18),
(19, 26),
(21, 23) }

─ 1754A
EE-Pair Set :
{ (2, 6),
(8, 22),
(14, 20) }

─ 1754B
OO-Pair Set :
{ (1, 9),
(3, 11),
(21, 23) }

─ 1754C
EO-Pair Set :
{ (0, 15),
(4, 25),
(5, 12),
(7, 24),
(10, 13),
(16, 27),
(17, 18),
(19, 26) }

Original Path Pairs : —— 2402A
{ (27, 16), (17, 18), (19, 26) }

Original $sw_1$ = abs(27-16) = 11
Original $sw_2$ = abs(17-18) = 1  —— 2404A
Original $sw_3$ = abs(19-26) = 7

Original $h_0$ = weight histogram of original $sw_1$ to original $sw_3$: —— 2406A
{ 11: 1, 7: 1, 1: 1 }

Path weight = swapped $h_1$ – original $h_0$ : —— 2408
{ 11: -1, 9: 2, 7: -1, 3: 1, 1: -1 }

Swapped Path Pairs : —— 2402B
{ (26, 17), (16, 19), (18, 27) }

Swapped $sw_1$ = abs(26-17) = 9
Swapped $sw_2$ = abs(16-19) = 3  —— 2404B
Swapped $sw_3$ = abs(18-27) = 9

Swapped $h_1$ = weight histogram of swapped $sw_1$ to swapped $sw_3$ : —— 2406B
{ 9: 2, 3: 1 }

Starting Positions Pairing Set (EE/OO-Pairs, Before Conversion) : ⎯⎯ 1702
{ (0, 15), (1, 9), (2, 6), (3, 11), (4, 25), (5, 12), (7, 24), (8, 22), (10, 13), (14, 20), (16, 27), (17, 18), (19, 26), (21, 23) }

Initial Swap Command : ⎯⎯ 2504
{ (4, 5), (6, 7), (8, 9), (10, 11), (12, 13), (16, 17), (18, 19), (20, 21), (24, 25), (26, 27) }

Starting Positions Pairing Set (EO-Pairs Only, After Conversion via Initial Swap Command) : ⎯⎯ 2506
{ (0, 15), (2, 7), (4, 13), (6, 25), (8, 1), (10, 3), (12, 11), (14, 21), (16, 19), (18, 27), (20, 23), (22, 9), (24, 5), (26, 17) }

FIG. 25

APPARATUSES, COMPUTER-IMPLEMENTED METHODS, AND COMPUTER PROGRAM PRODUCTS FOR INSTRUCTION COMPILATION FOR AT LEAST ONE TIME SLICE IN A ONE-DIMENSIONAL QUANTUM COMPUTING ENVIRONMENT

CROSS-REFERENCE TO RELATED APPLICATIONS

This application claims priority to U.S. Provisional Application No. 63/031,410, titled "APPARATUSES, COMPUTER-IMPLEMENTED METHODS, AND COMPUTER PROGRAM PRODUCTS FOR INSTRUCTION COMPILATION FOR AT LEAST ONE TIME SLICE IN A ONE-DIMENSIONAL QUANTUM COMPUTING ENVIRONMENT," filed May 28, 2020, the contents of which are incorporated herein by reference in their entirety.

TECHNOLOGICAL FIELD

Embodiments of the present disclosure generally relate to qubit manipulation in a quantum computing environment, and Embodiments of the present disclosure generally relate to qubit manipulation in a quantum computing environment, and specifically to instruction compilation for at least one time slice in a one-dimensional quantum computing environment to reposition qubits for gating at the one or more time slices.

BACKGROUND

General purpose quantum computers must compile user programs into machine instructions specific to the underlying hardware embodying the quantum computer. Often, implementations of such quantum computers require qubits be repositioned to be utilized in executing one or more logic operations, for example one or more logic gates. However, the transport sequence for repositioning qubits can be a costly, error prone, and otherwise resource intensive task. Accordingly, it is desired to efficiently compile user programs into instructions that efficiently transport qubits within a quantum system as required at various times. Applicant has discovered problems with current implementations of instruction compilation in a one-dimensional quantum computing environment. Through applied effort, ingenuity, and innovation, Applicant has solved many of these identified problems by developing solutions embodied in the present disclosure, which are described in detail below.

BRIEF SUMMARY

In general, embodiments of the present disclosure provided herein provide for instruction compilation for at least one time slice in a one-dimensional quantum computing environment. Other implementations for compilation of instructions for at least one time slice in a one-dimensional quantum computing environment will be, or will become, apparent to one with skill in the art upon examination of the following figures and detailed description. It is intended that all such additional implementations be included within the scope of the disclosure and be protected by the following claims.

In accordance with at least one aspect of the present disclosure, a computer-implemented method for instruction compilation for at least one time slice in a one-dimensional quantum computing environment is provided. The computer-implemented method may be performed by any of the computing entities, apparatuses, and/or other devices described herein embodied in hardware, software, firmware, and/or a combination thereof. In at least one example embodiment, the computer-implemented method comprises identifying an initial qubit position set associated with a qubit set, the qubit set associated with a qubit pairing set for gating at a first time slice, the qubit pairing set including at least one qubit pair, each qubit pair having a first qubit and a second qubit. The example computer-implemented method further comprises identifying a target qubit position set associated with the qubit set and the initial qubit position set at a first time slice where, for each qubit pair, the first qubit is associated with a first target position index in the target qubit position set and the second qubit is associated with a second target position index in the target qubit position set, and where the first target position index is adjacent to the second target position index. The example computer-implemented method further comprises generating an algorithm swap command set by performing an even-odd transposition sort based on at least the target qubit position set.

Additionally or alternatively, in some example embodiments of the example computer-implemented method, generating the algorithm swap command set comprises storing, in a data object representing the algorithm swap command set, a first swap indicator for each even swap determined from the even-odd transposition sort, and storing, to the data object representing the algorithm swap command set, a second swap indicator for each odd swap determined from the even-odd transposition sort.

Additionally or alternatively, in some example embodiments of the example computer-implemented method, generating the algorithm swap command set comprises determining, while executing the even-odd transposition sort, a second qubit pair for gating at the first time slice is associated with a first position index and a second position index, wherein the first position index and second position index represent adjacent position indices; storing at least one command to perform a logical operation based on at least the second qubit pair; and determining a first updated target qubit position index and a second updated target qubit position index for the second qubit pair, wherein the first updated target qubit position index and the second updated target qubit position index are determined based on a second time slice.

Additionally or alternatively, in some example embodiments of the example computer-implemented method, the target qubit position set represents a second initial qubit position set, and the computer-implemented method further comprises identifying a second initial qubit position set at a second time slice based on the target qubit position set of the first time slice; identifying a second target qubit position set associated with the qubit set at a second time slice based on the initial qubit position set at the second time slice; and generating a second algorithm swap command set by performing a second even-odd transposition sort based on at least the second target qubit position set.

Additionally or alternatively, in some example embodiments of the example computer-implemented method, identifying the target qubit position set comprises receiving a quantum program comprising a qubit pairing set associated with the qubit set, the qubit pairing set representing the at least one qubit pair for gating at the first time slice; and generating the target qubit position set based on the qubit pairing set.

Additionally or alternatively, in some such example embodiments of the example computer-implemented method, for each qubit pair of the at least one qubit pair for gating, the first qubit is associated with a first initial position index of the initial qubit position set and the second qubit is associated with a second initial position index of the initial qubit position set, and generating the target qubit position set comprises determining, for each of the at least one qubit pair for gating at the first time slice and starting with a qubit pair having a greatest position distance based on at least the first initial position index and the second initial position index, a near-midpoint open index pair based on at least the first initial position index and the second initial position index, where the near-midpoint open index pair comprises the first target position index and the second target position index; and assigning, in the target qubit position set, the first target position index and the second target position index based on at least the near-midpoint open index pair.

Additionally or alternatively, in some example embodiments of the example computer-implemented method, the computer-implemented method further comprises generating, based on at least the algorithm swap command set, a qubit manipulation instruction set, the qubit manipulation instruction set comprising any number of qubit swap instructions, any number of qubit split instructions, any number of qubit join instructions, and any number of qubit shift instructions.

Additionally or alternatively, in some such example embodiments of the example computer-implemented method, the computer-implemented method further comprises generating a hardware instruction set based on at least the qubit manipulation instruction set, wherein the hardware instruction set comprises at least one action to be performed by qubit manipulation hardware to position the qubit set based on the qubit manipulation instruction set; and executing the hardware instruction set using the qubit manipulation hardware.

Additionally or alternatively, in some example embodiments of the example computer-implemented method, identifying the target qubit position set comprises identifying a starting positions pairing set corresponding to the qubit pairing set; generating a target slots vector based at least in part on the starting positions pairing set; determining a target slots midpoint vector by sorting the target slots vector utilizing even-odd transposition sort; and generating the target qubit position set based at least in part on the target slots midpoint vector.

Additionally or alternatively, in some such example embodiments of the example computer-implemented method, the computer-implemented method further comprises determining the start positions pairing set satisfies a first constraint indicating that each start positions pair in the start positions pairing set comprises: a first position existing in a first subset of an equal bi-partitioning of all positions, and a second position existing in a second subset of the equal bi-partitioning of all positions, where each position in the first subset of the equal bi-partitioning is associated with a unique position in the second subset of the bi-partitioning. The association between the position in the first subset and the unique position in the second subset may be utilized for purposes of generating the target slots vector.

Additionally or alternatively, in some such example embodiments of the example computer-implemented method, each first position in the first subset of the equal bi-partitioning is adjacent to the unique position in the second subset of the equal bi-partitioning associated with the first position.

Additionally or alternatively, in some example embodiments of the example computer-implemented method, the first subset of the equal bi-partitioning of all positions comprises a set of even positions and the second subset of the equal bi-partitioning of all positions comprises a set of odd positions.

Additionally or alternatively, in some such example embodiments of the example computer-implemented method, generating the target slots vector comprises assigning, for each position in the first subset of the equal bi-partitioning, a fixed slot of an available slot set; and generating the target slots vector comprising, for each starting positions pair comprising the first position from the first subset of the equal bi-partitioning of all positions and the second position from the second subset of the equal bi-partitioning of all positions, a second slot representing the second position, the second slot generated at an index of the target slots vector corresponding to the fixed slot of the available slot set assigned for the first position.

Additionally or alternatively, in some such example embodiments of the example computer-implemented method, determining the target slots midpoint vector by sorting the target slots vector utilizing even-odd transposition sort comprises sorting the target slots vector to attain, for each starting position pair in the starting positions pairing set, parity between the second slot representing the second position and the fixed slot assigned for the first position.

Additionally or alternatively, in some such example embodiments of the example computer-implemented method, the starting positions pairing set comprises a plurality of even-odd position pairs, each even-odd position pair comprising an even position and an odd position associated with the even position, wherein the targets slots vector is generated based on assigning the fixed slot of the available slot set for even position of the plurality of even-odd position pairs, and the target slots vector is generated based on each odd positions of the plurality of even-odd position pairs.

Additionally or alternatively, in some such example embodiments of the example computer-implemented method, the computer-implemented method further comprises identifying an original starting positions pairing set corresponding to the qubit pairing set; determining the original starting positions pairing set does not satisfy the first constraint; and converting the original starting positions pairing set to the starting positions pairing set to satisfy the first constraint by: generating a directed graph based on the original starting positions pairing set; and applying a path selection algorithm to the graph.

Additionally or alternatively, in some such example embodiments of the example computer-implemented method, generating the directed graph comprises generating a first set of nodes representing a first subset of pairs from the original starting positions pairing set, the first subset of pairs comprising a subset of ee-pairs or a subset of oo-pairs from the original starting positions pairing set; generating a second set of nodes representing a second subset of pairs from the original starting positions pairing set, the second subset of pairs comprising the other of the ee-pairs or the subset of oo-pairs from the original starting positions pairing set; generating a third set of nodes representing a third subset of pairs from the original starting positions pairing set, the third subset of pairs comprising a subset of eo-pairs from the original starting positions pairing set, the third set possibly being the empty set if no eo-pairs exist; generating a first set of directed edges emitting from each first node associated with the first set of nodes to a second node associated with the second set of nodes, wherein the first node is associated with a starting positions pair comprising at least one position that is adjacent to at least one position of a second starting positions pair associated with the second node consistent with a first phase of sort; generating a single source node and a second set of directed edges from the single source node to each node of the first set of nodes; and generating a single target node and a third set of directed edges from each node of the second set of nodes to the single target node.

Additionally or alternatively, in some such example embodiments of the example computer-implemented method, the path selection algorithm comprises a Suurballe's algorithm implementation that finds a set of node-disjoint paths from the single source node to the single target node, the set of node-disjoint paths representing paths from the ee-pairs to the oo-pairs in one parallel swap command.

Additionally or alternatively, in some such example embodiments of the example computer-implemented method, the Suurballe's algorithm implementation comprises a modified Suurballe's algorithm comprises generating edge weights for one or more of the first set of directed edges, the second set of directed edges, and the third set of directed edges representing a differential histogram of distances.

Additionally or alternatively, in some such example embodiments of the example computer-implemented method, the computer-implemented method further comprises determining the original starting positions pairing set does not satisfy at least one additional constraint; and updating the original starting positions pairing set to satisfy the at least one additional constraint.

In accordance with another aspect of the present disclosure, an apparatus for instruction compilation for at least one time slice in a one-dimensional quantum computing environment is provided. In at least one example embodiment, the apparatus comprises at least one processor and at least one memory having computer-coded instructions stored thereon. The computer-coded instructions, in execution via the at least one processor, configure the apparatus to perform any one of the example computer-implemented methods described herein. In at least one other example embodiment, the apparatus comprises means for performing each step of any one of the example computer-implemented methods described herein.

In accordance with yet another aspect of the present disclosure, a computer program product for instruction compilation for at least one time slice in a one-dimensional quantum computing environment is provided. In at least one example embodiment, the computer program product comprises at least one non-transitory computer-readable storage medium having computer program code stored thereon. The computer program code, in execution via at least one processor, configures the computer program product for performing any one of the example computer-implemented methods described herein.

BRIEF DESCRIPTION OF THE DRAWINGS

Figure 1:
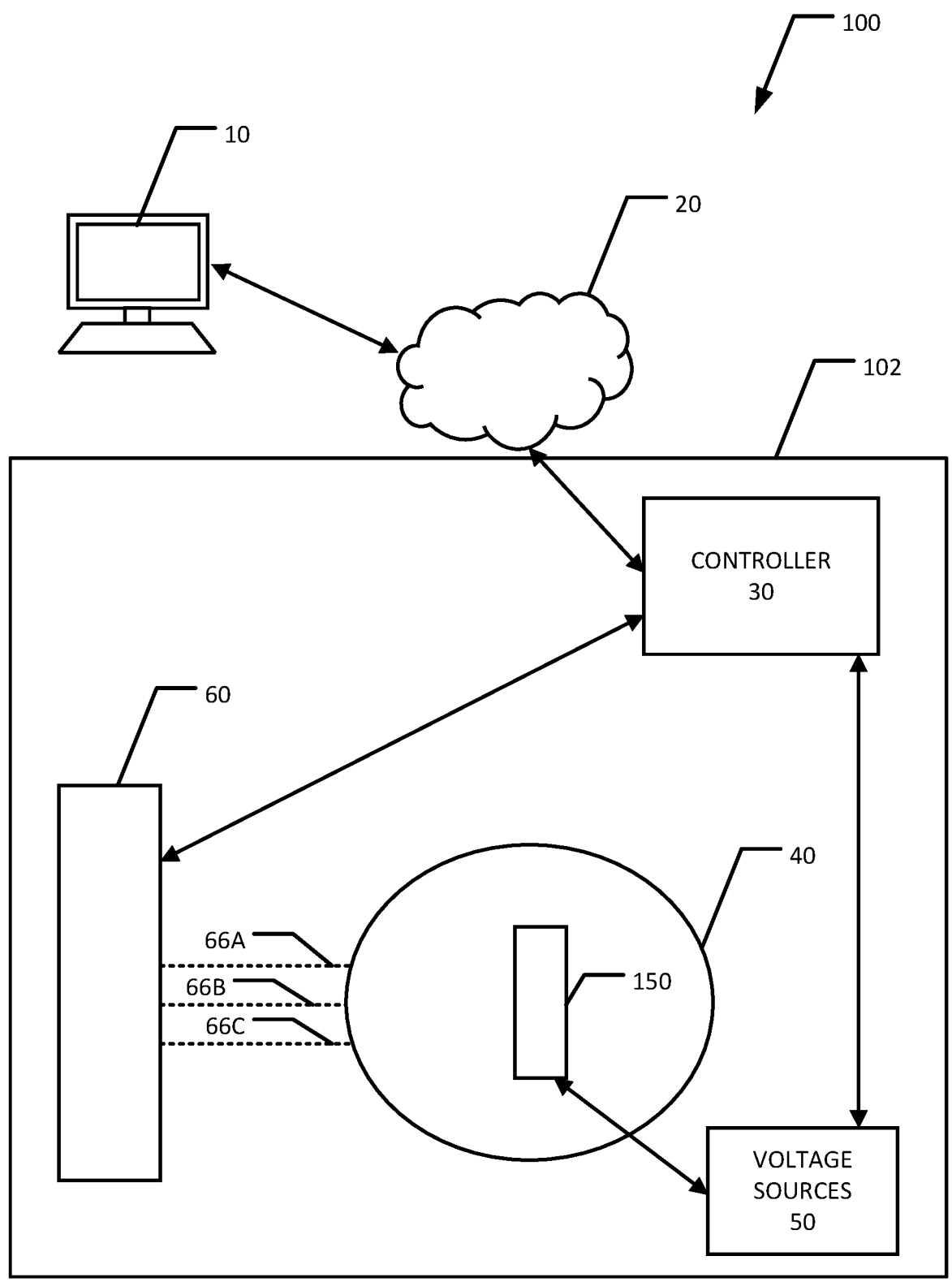
Figure 2:
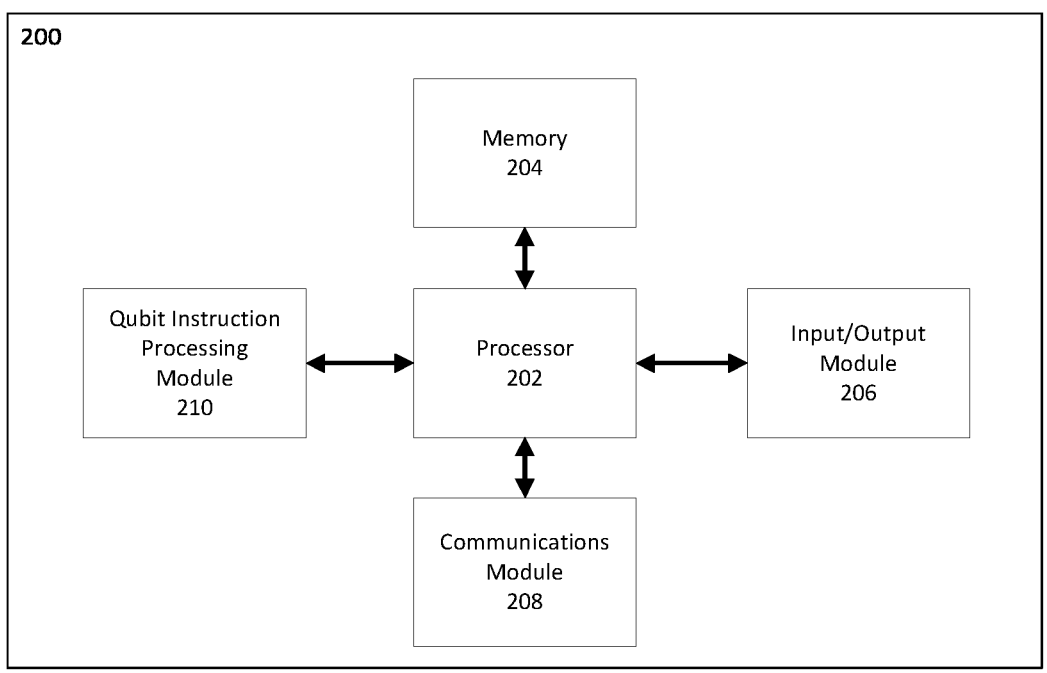
Figure 3:
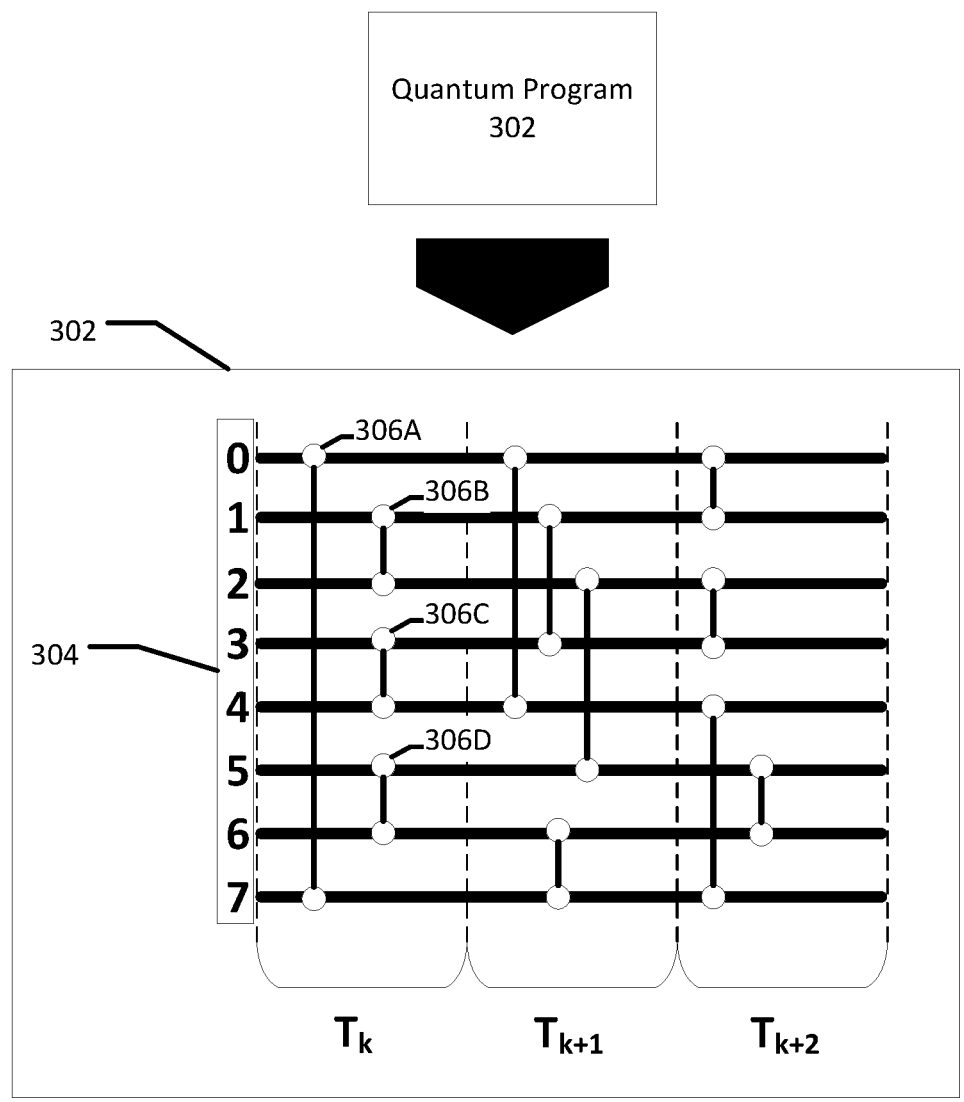
Figure 5:
Figure 7A:
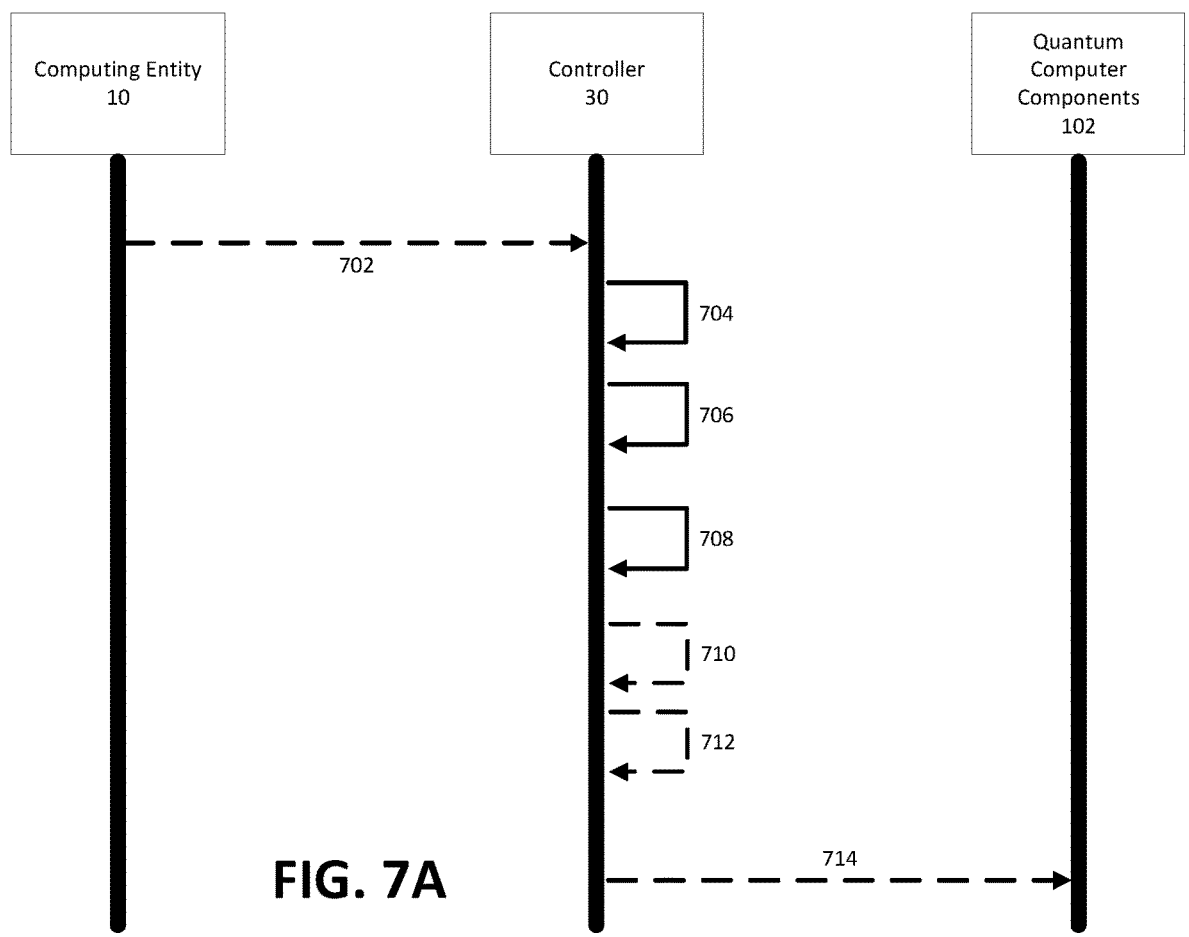
Figure 7B:
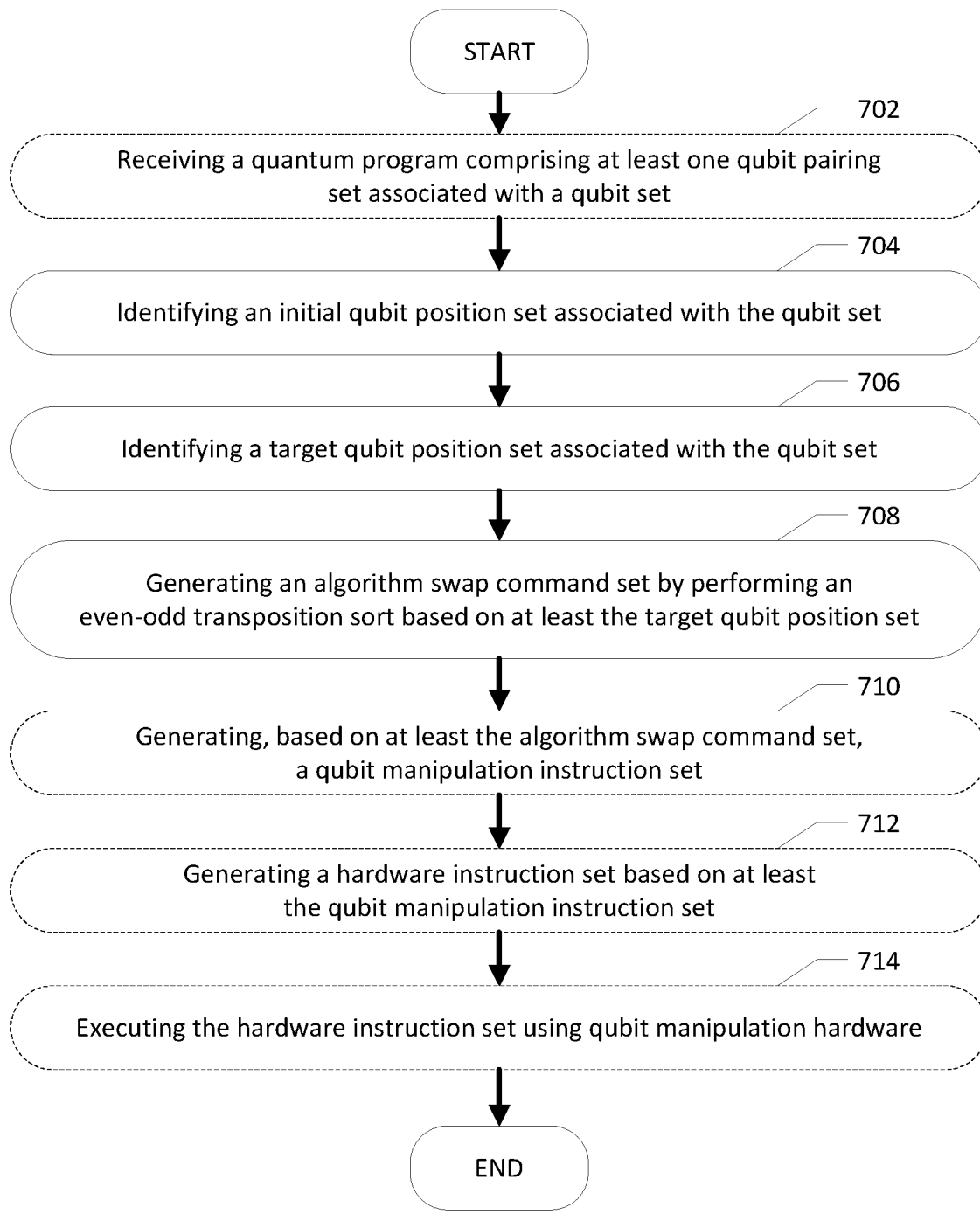
Figure 8:
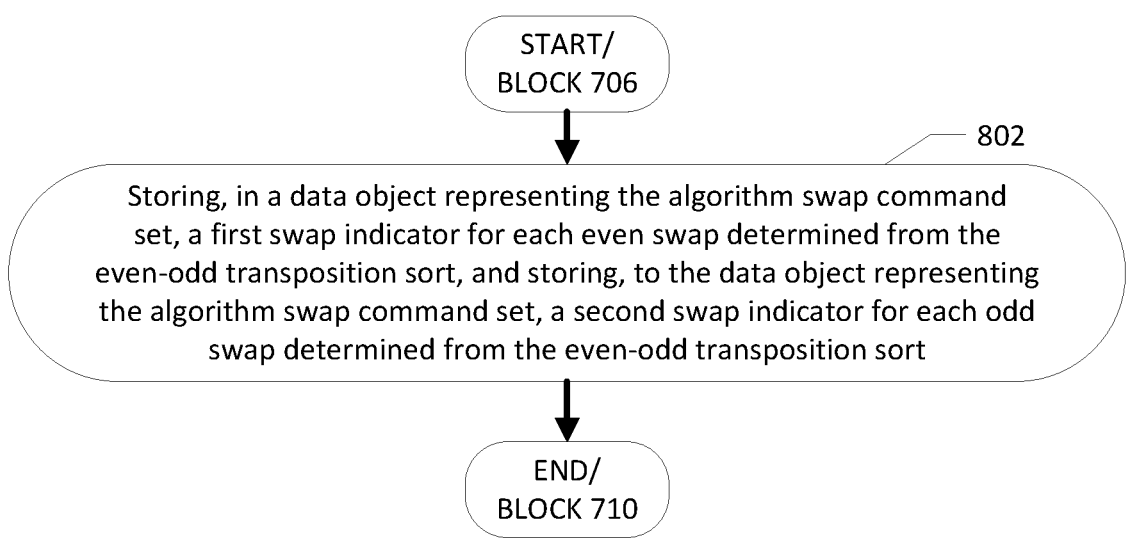
Figure 9:
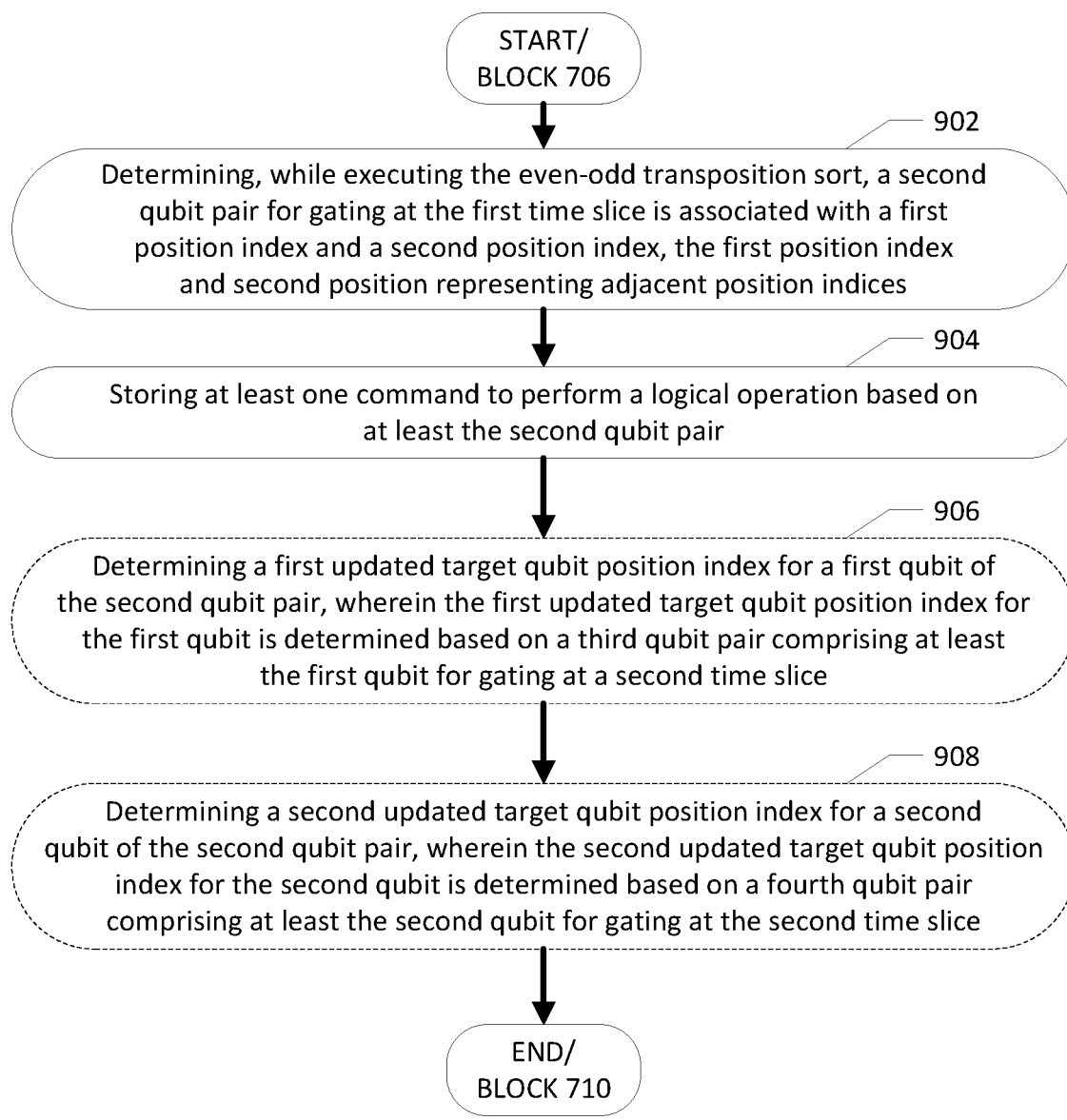
Figure 10:
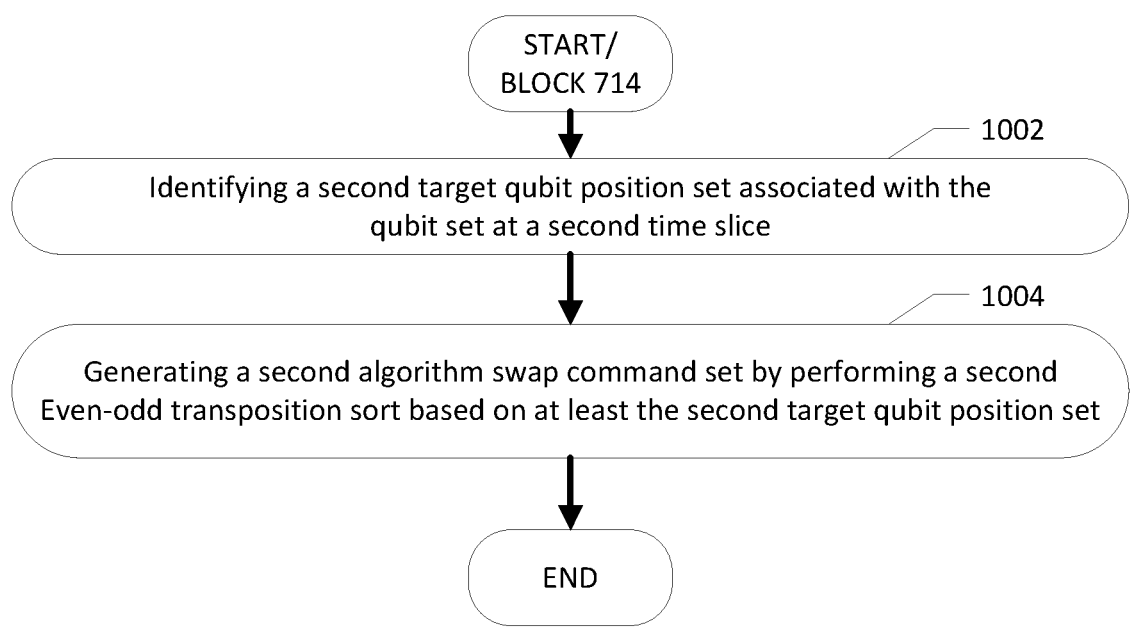
Figure 11:
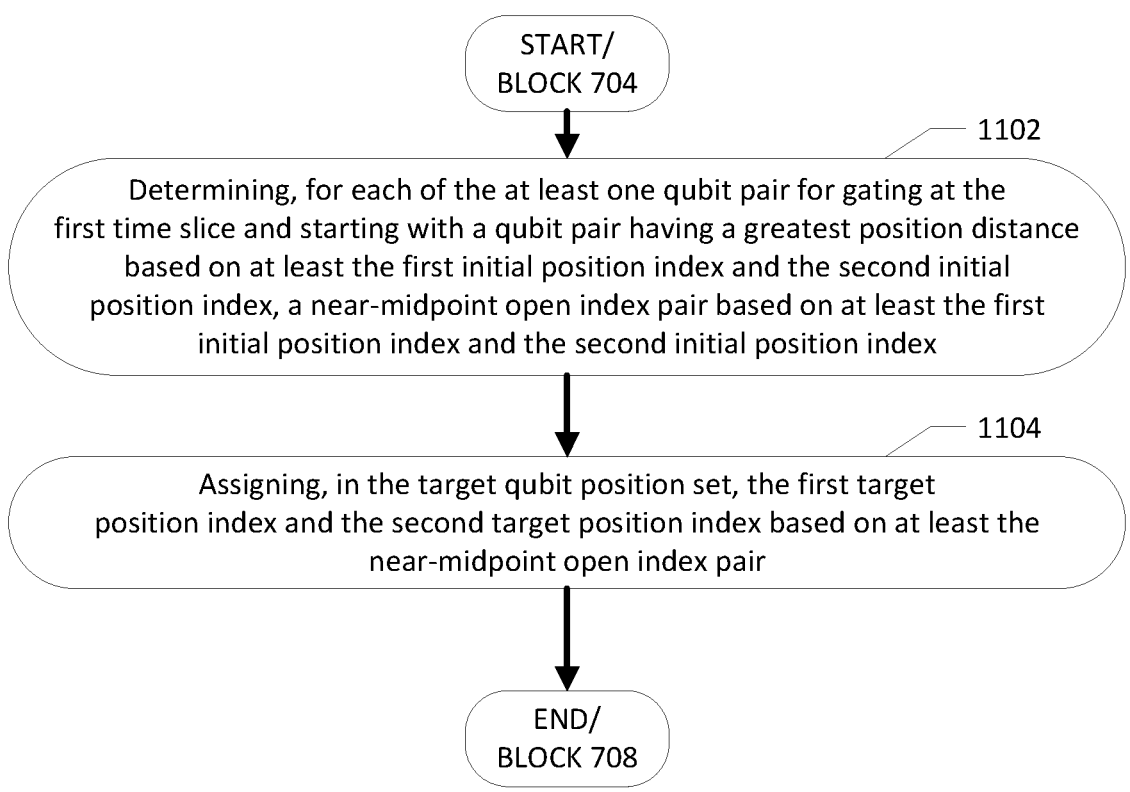
Figure 12:
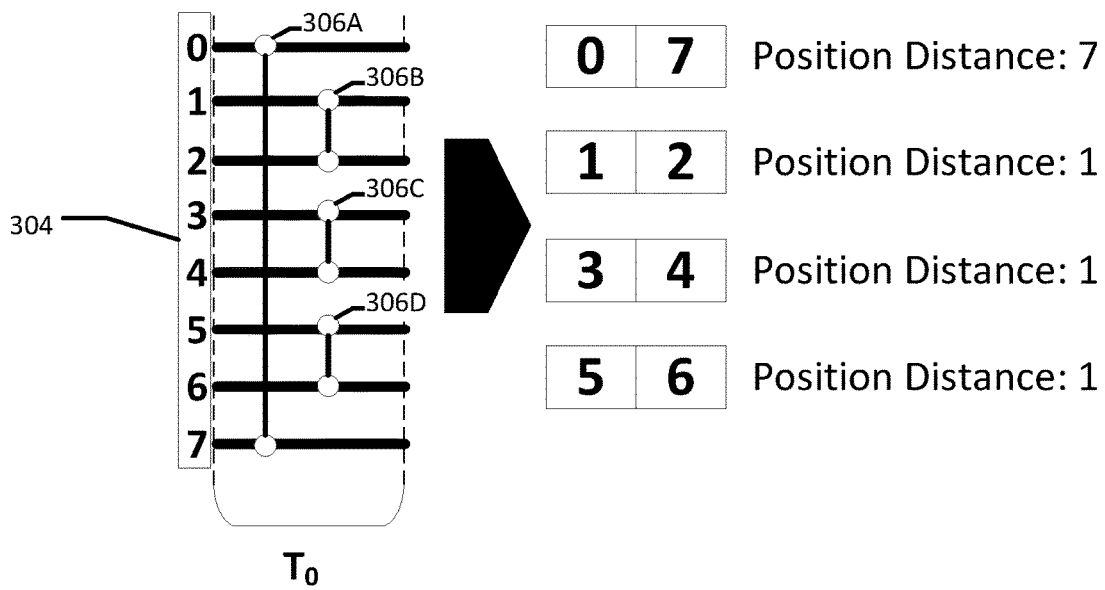
Figure 12:
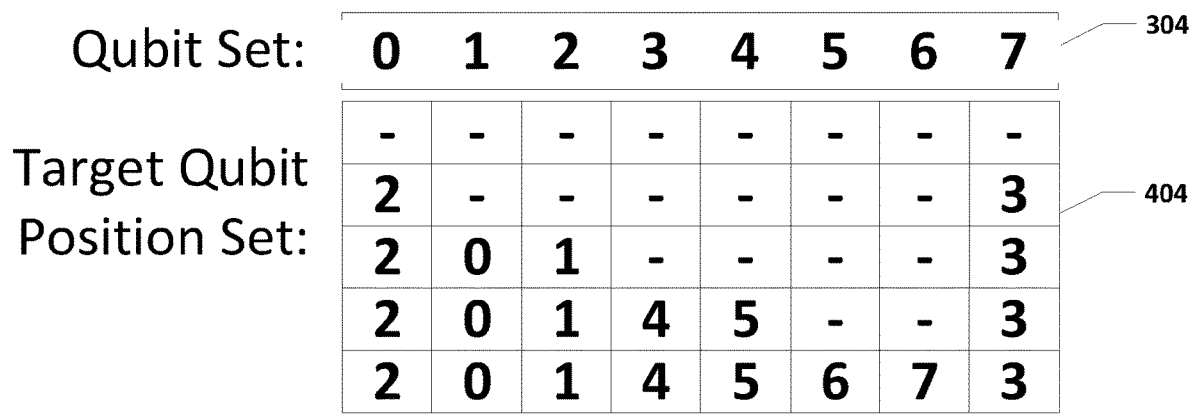
Figure 13:
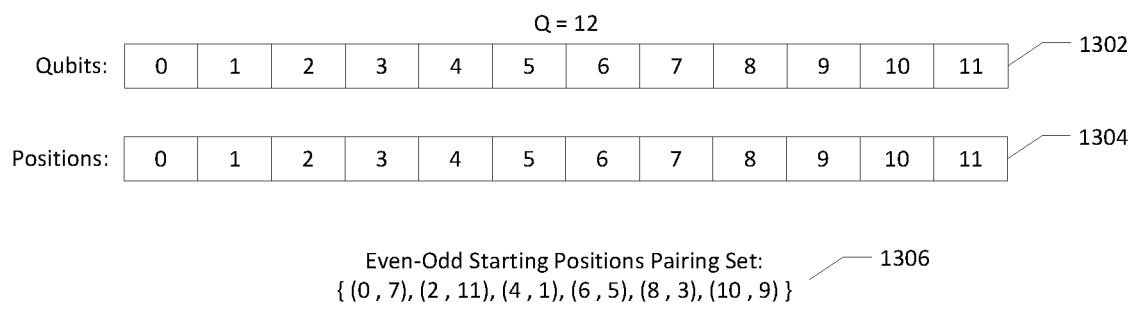
Figure 14:
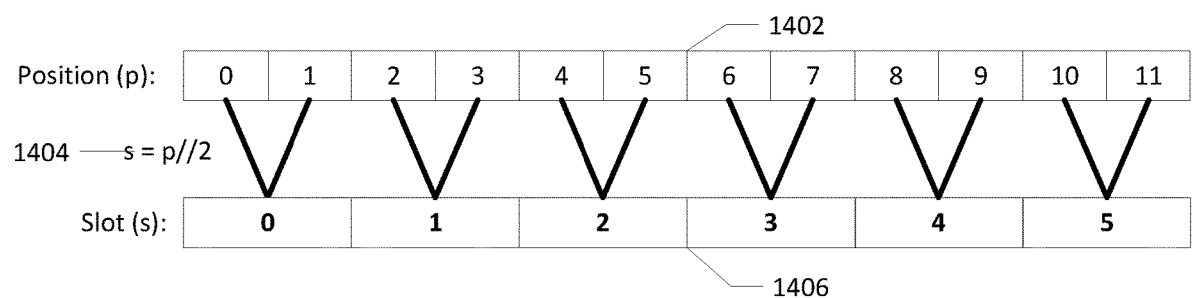
Figure 15A:
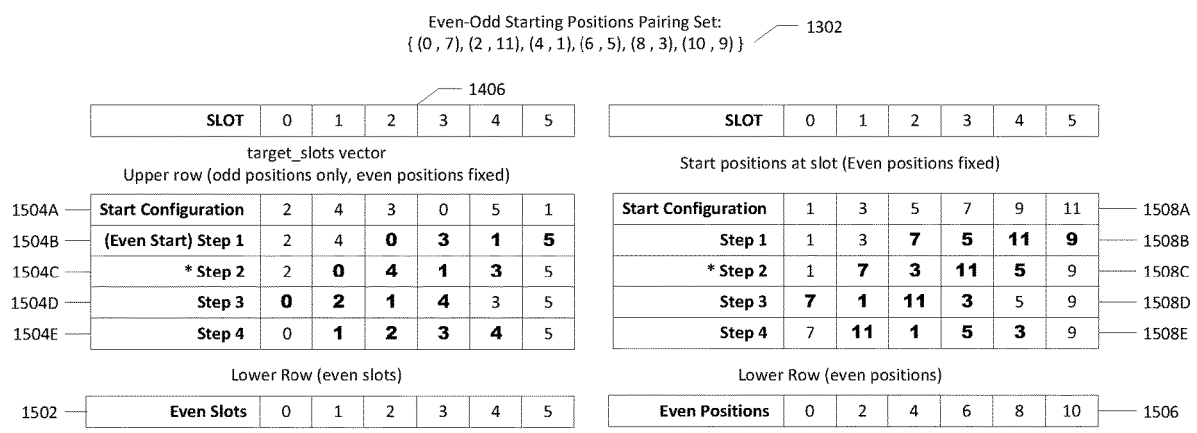
Figure 15B:
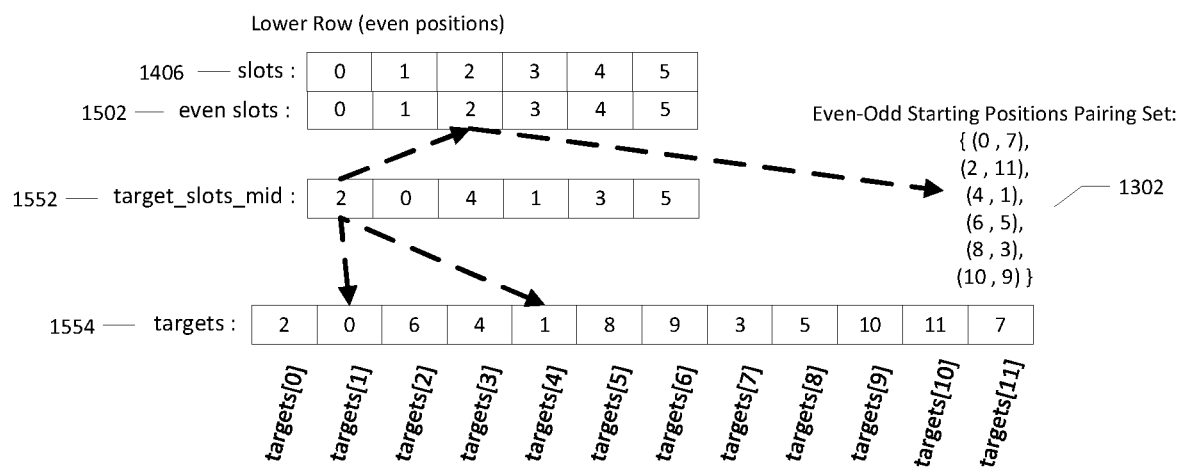
Figure 16A:
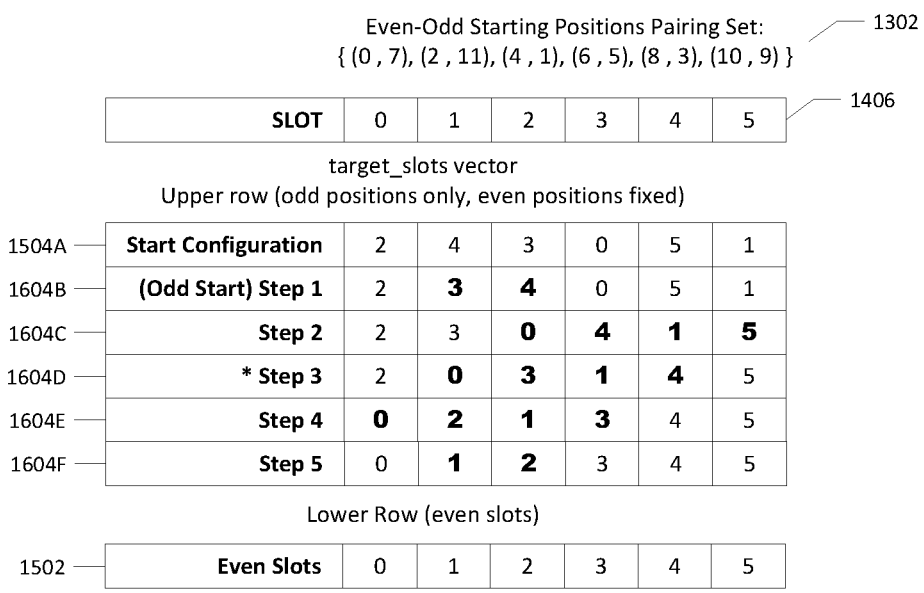
Figure 16B:
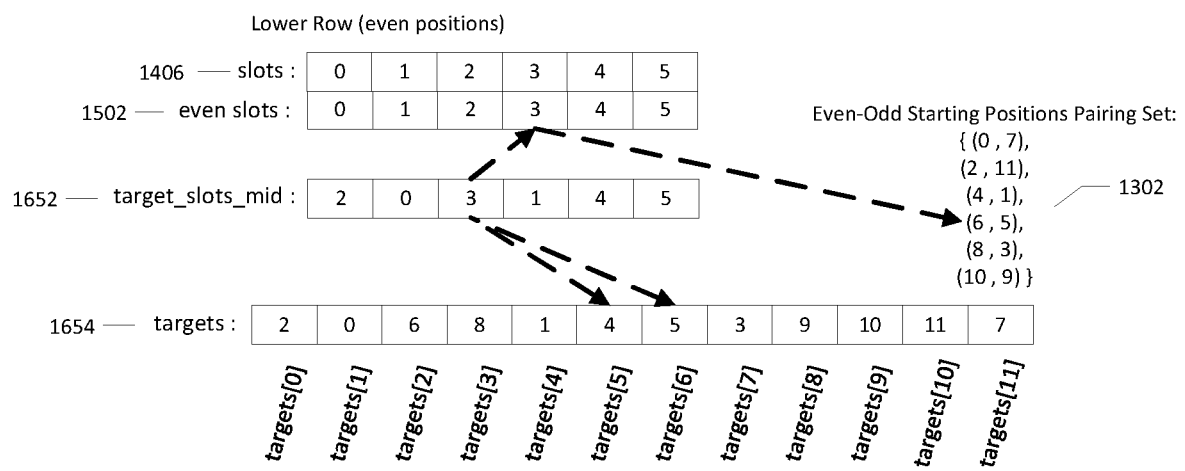
Figure 17B:
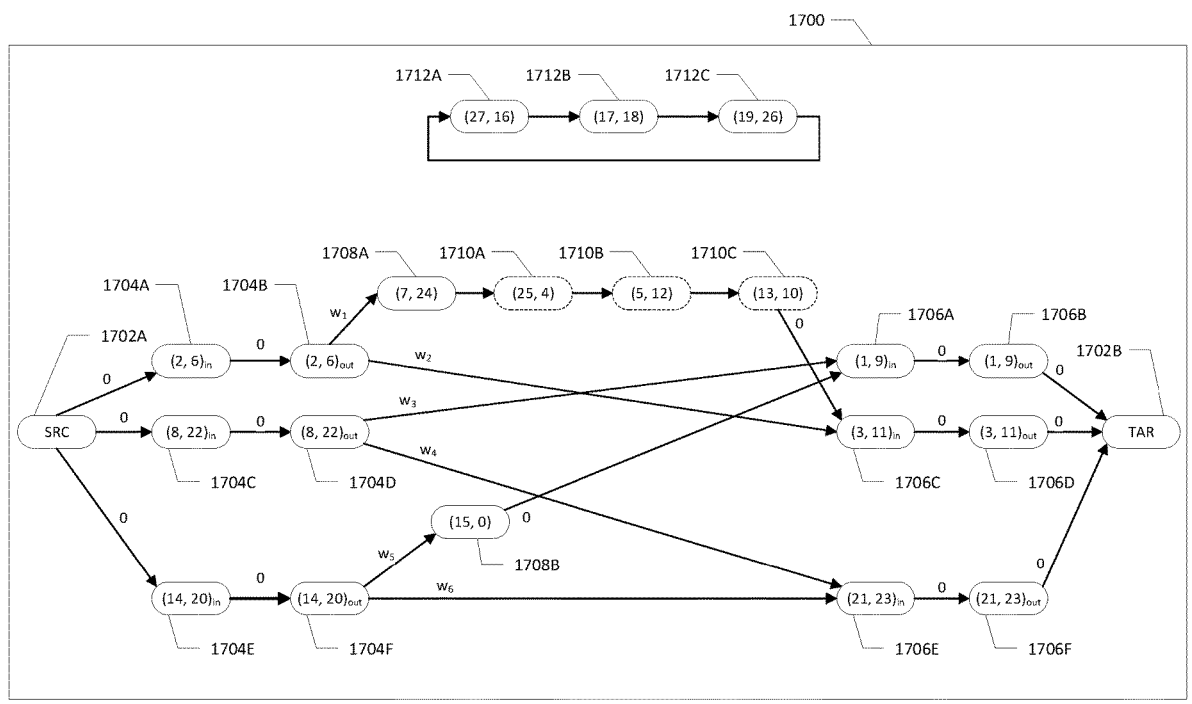
Figure 18:
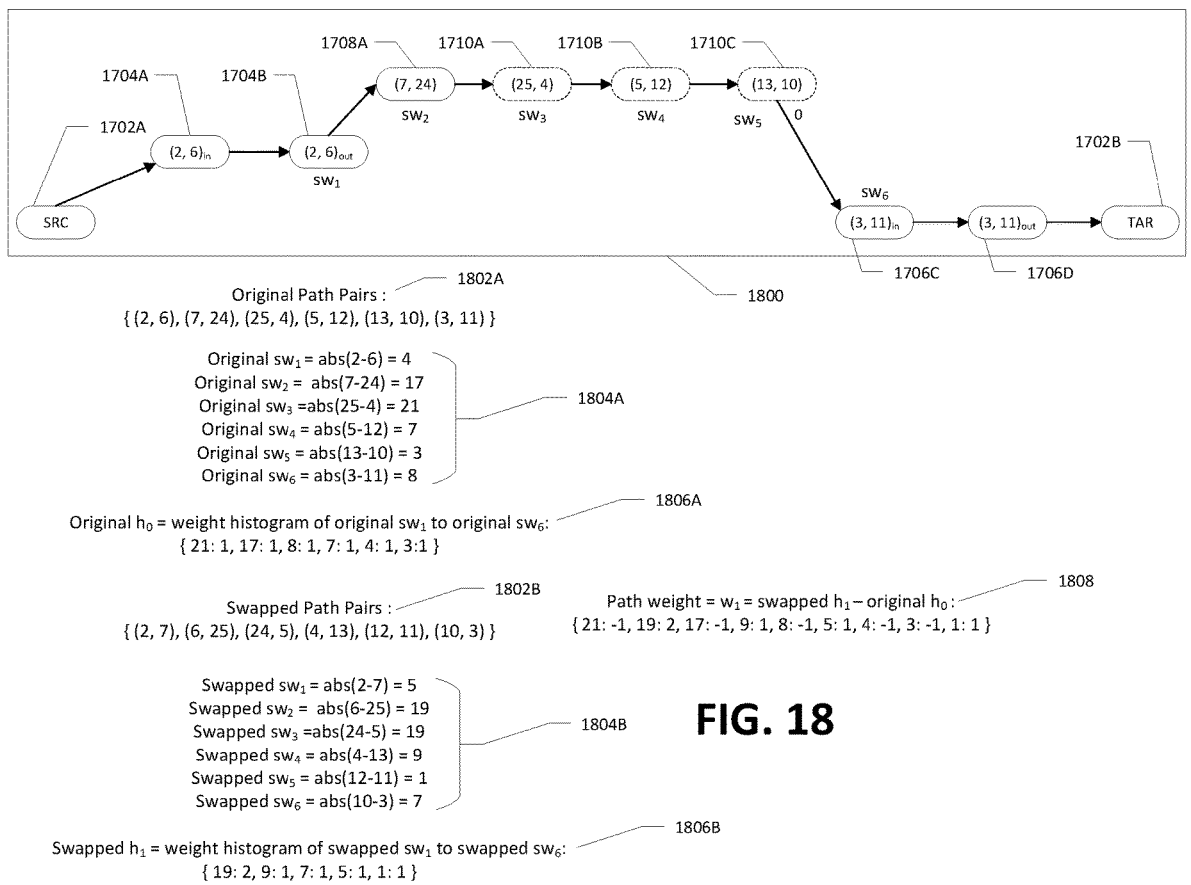
Figure 19:
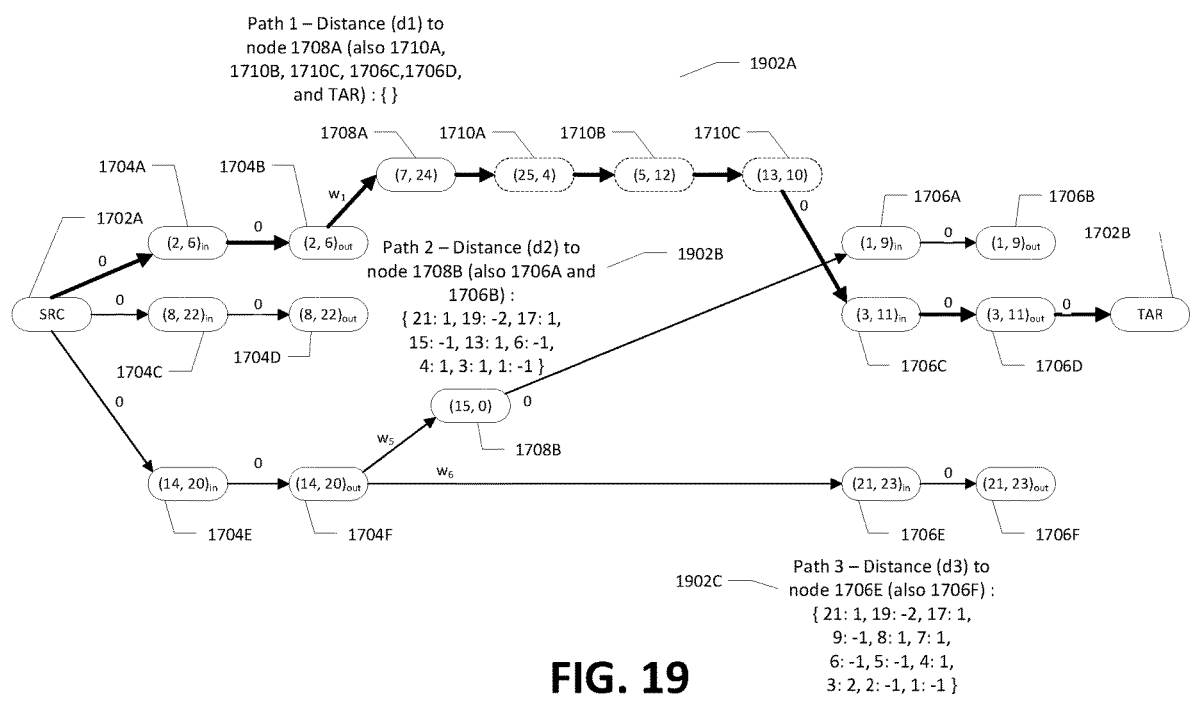
Figure 20:
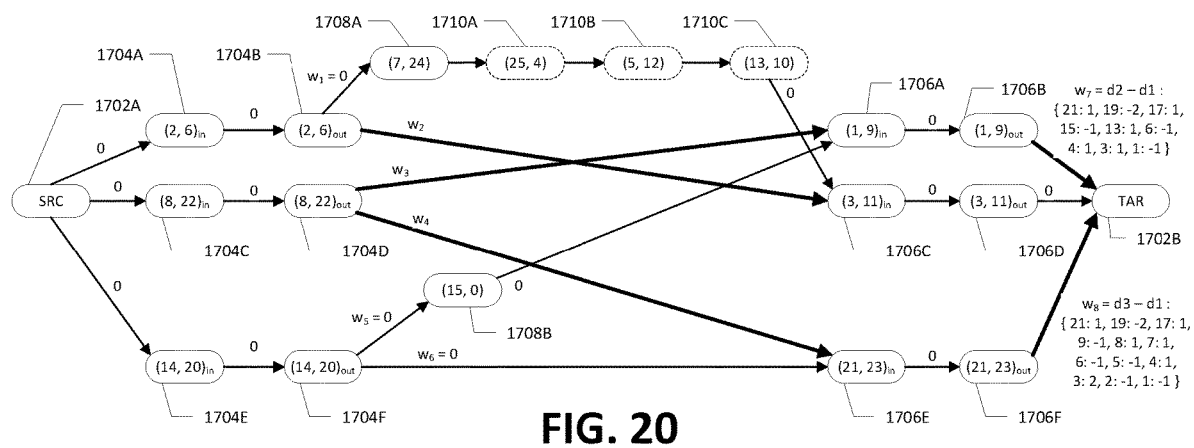
Figure 21:
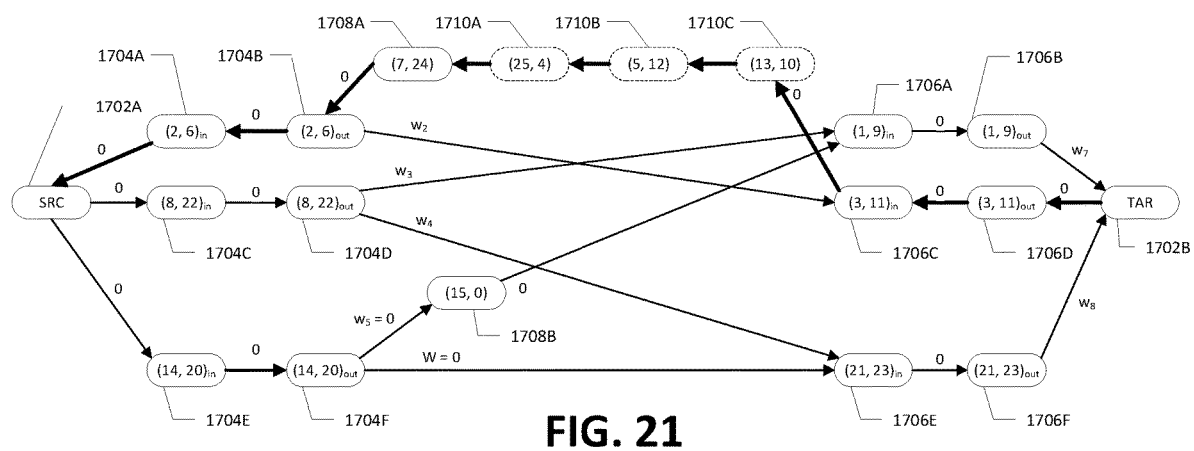
Figure 22:
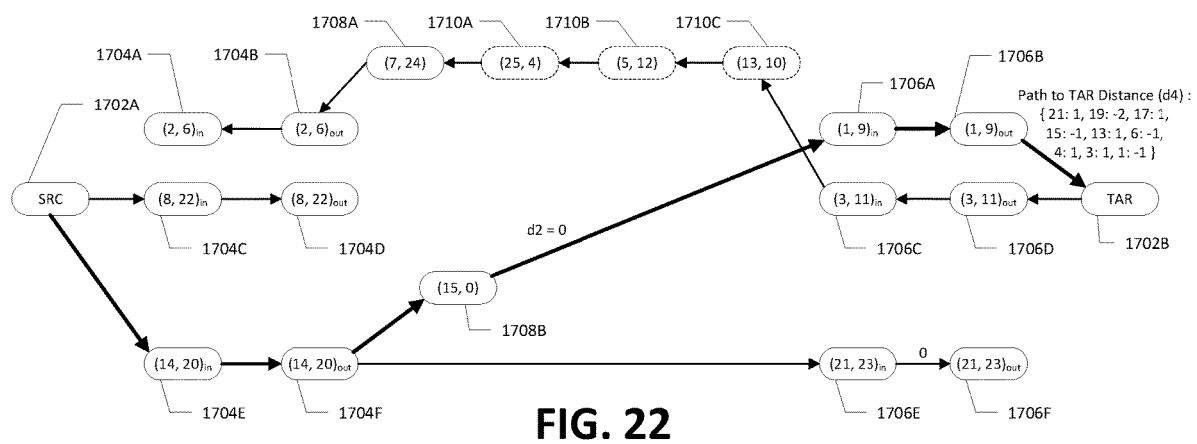
Figure 23A:
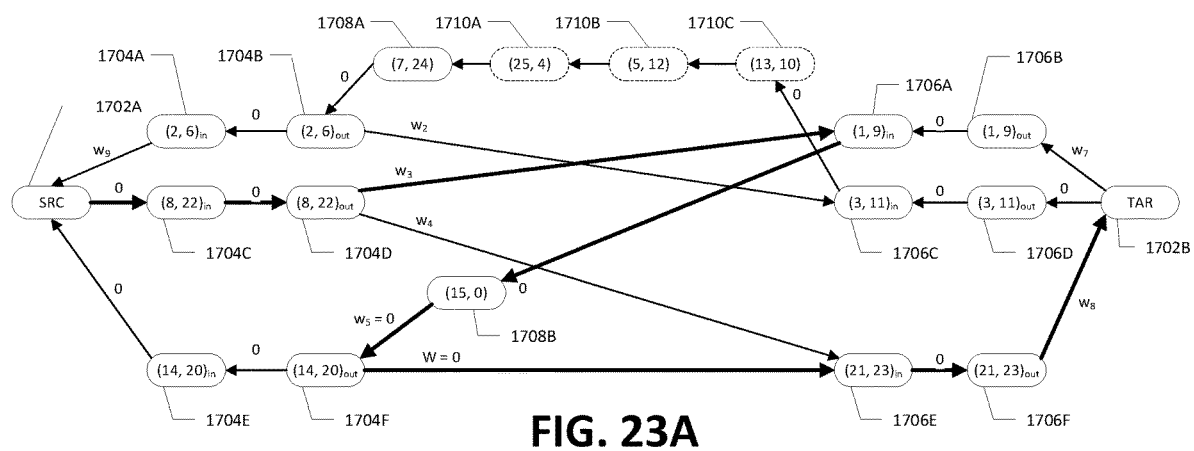
Figure 23B:
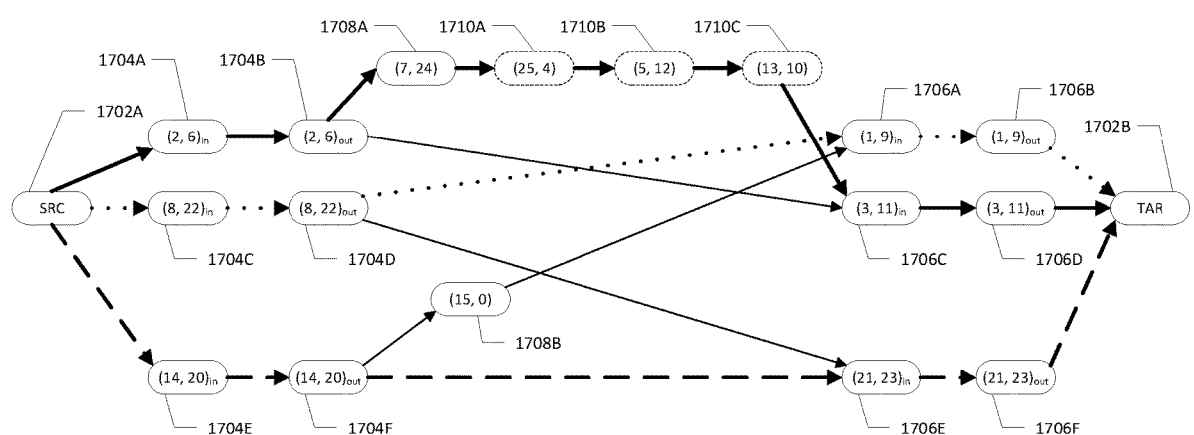
Figure 24:
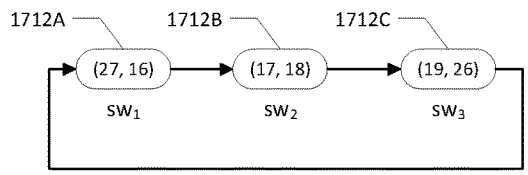
Figure 26:
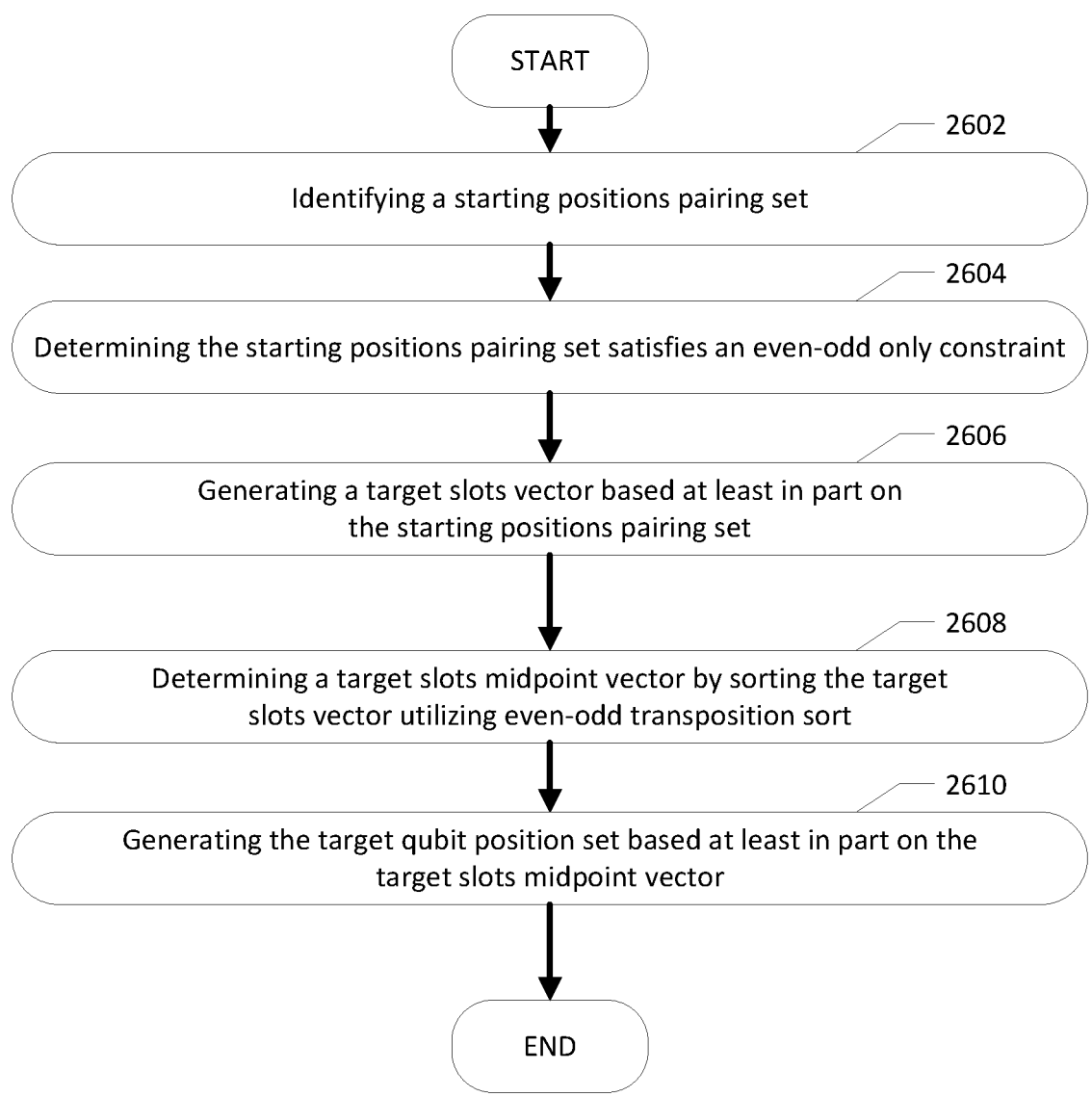
Figure 27:
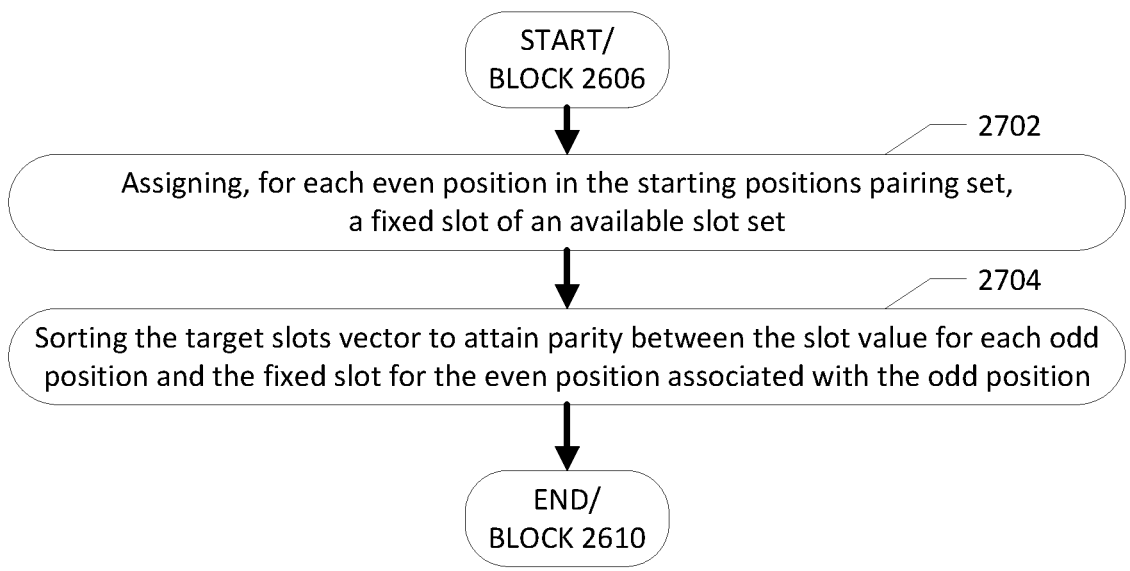
Figure 28:
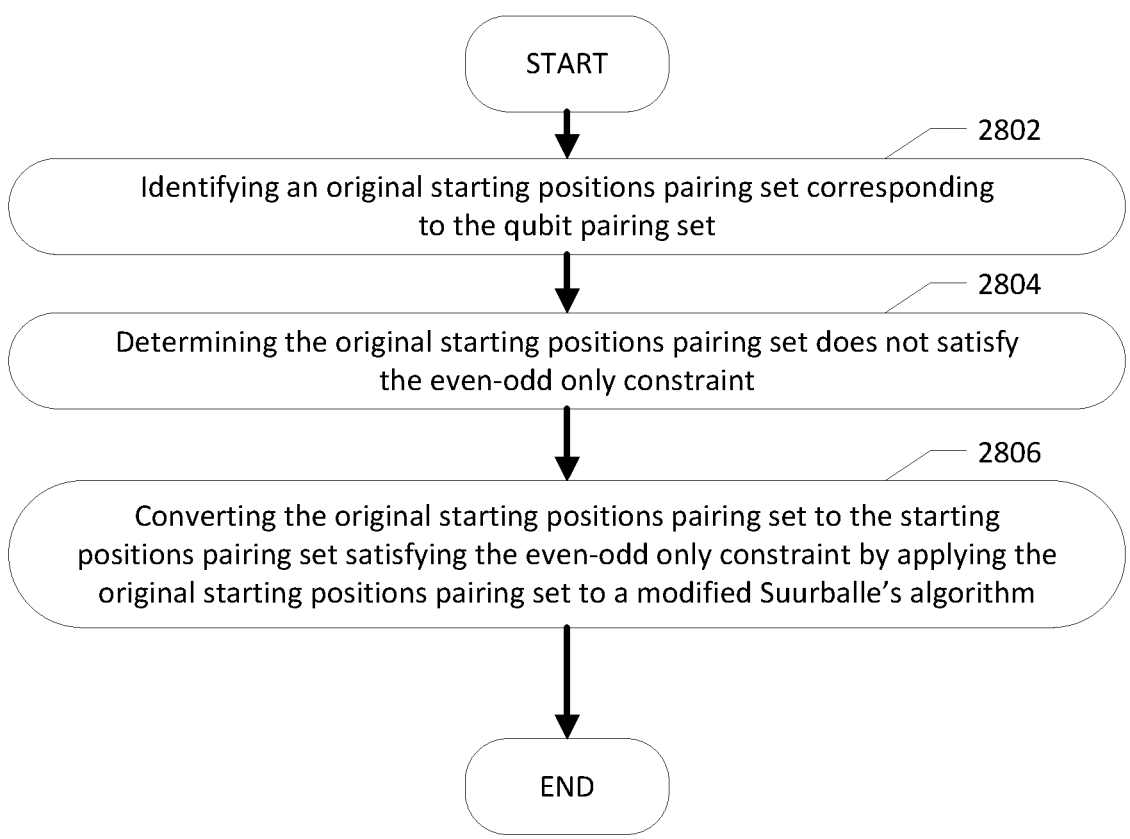
Figure 29:
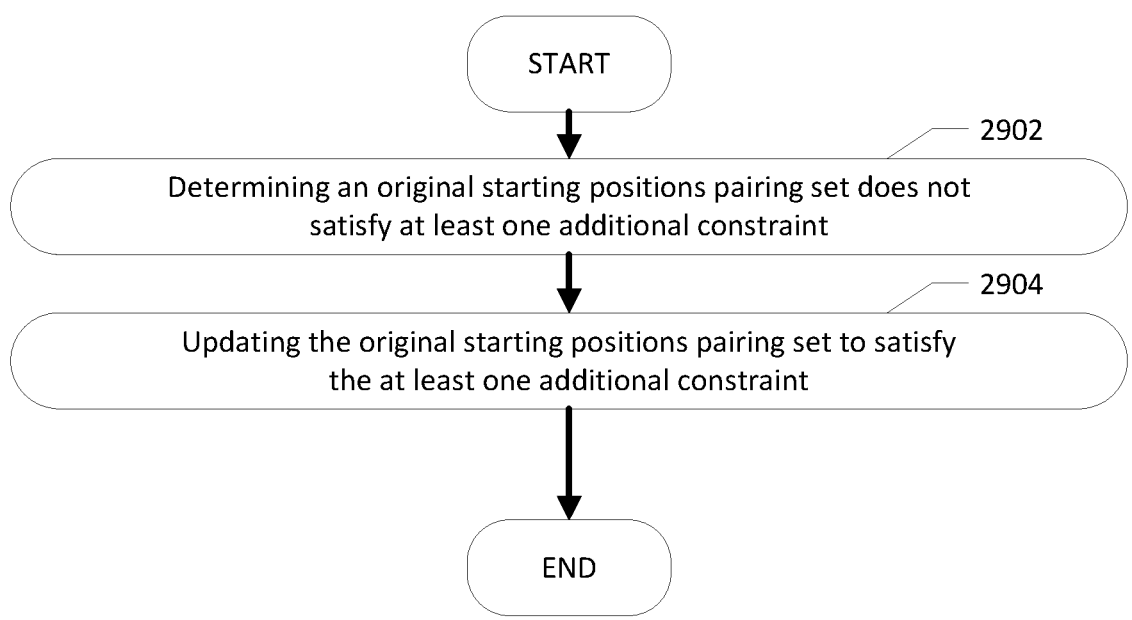
Figure 30:
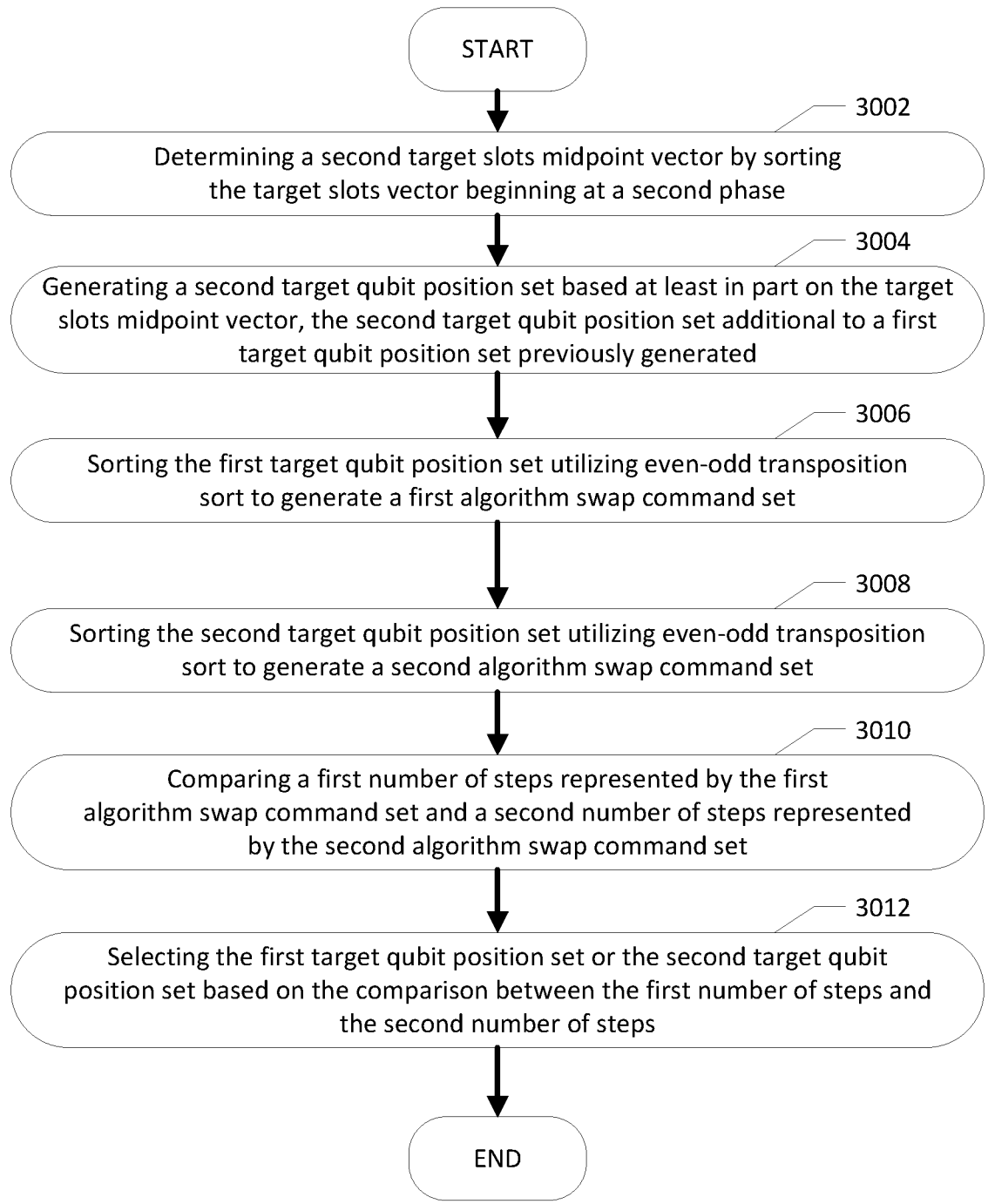

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with an example embodiment of the present disclosure;

FIG. 3 illustrates an example computing environment for compiling at least one time slice of a quantum program in a one-dimensional quantum computing environment, in accordance with at least one example embodiment of the present disclosure;

FIG. 4 illustrates another example computing environment for instruction compilation for at least one time slice in a one-dimensional quantum computing environment, in accordance with at least one example embodiment of the present disclosure;

FIG. 5 illustrates example operations of an even-odd transposition sort and a corresponding algorithm swap command set, in accordance with at least one example embodiments of the present disclosure;

FIG. 6 illustrates various configurations for an algorithm swap command set, in accordance with example embodiments of the present disclosure;

FIG. 7A illustrates an example data flow diagram of an example process for instruction compilation for at least one time slice in a one-dimensional quantum computing environment, in accordance with at least one example embodiment of the present disclosure;

FIG. 7B illustrates an example flowchart of the data flow operations in the example process for instruction compilation for at least one time slice in a one-dimensional quantum computing environment, as depicted in FIG. 7A, in accordance with at least one example embodiments of the present disclosure;

FIG. 8 illustrates additional operations of an example process for instruction compilation for at least one time slice in a one-dimensional quantum computing environment, specifically for generating an algorithm swap command set by performing an even-odd transposition sort based on at least the initial qubit position set and the target qubit position set, in accordance with at least one example embodiment of the present disclosure;

FIG. 9 illustrates additional operations of an example process for instruction compilation for at least one time slice in a one-dimensional quantum computing environment, specifically for generating an algorithm swap command set by performing an even-odd transposition sort based on at least the initial qubit position set and the target qubit position set, in accordance with at least one example embodiment of the present disclosure;

FIG. 10 illustrates additional operations of an example process for instruction compilation for at least one time slice in a one-dimensional quantum computing environment, specifically for generating a second algorithm swap command set by performing a second even-odd transposition sort, in accordance with at least one example embodiment of the present disclosure;

FIG. 11 illustrates additional operations of an example process for instruction compilation for at least one time slice in a one-dimensional quantum computing environment, specifically for identifying a target qubit position set associated with the qubit set, in accordance with at least one example embodiment of the present disclosure;

FIG. 12 illustrates an example visualization for identifying the target qubit position set for a particular qubit set, in accordance with at least one example embodiment of the present disclosure;

FIG. 13 illustrates example data associated with manipulation of an example quantum computing environment, in accordance with at least one example embodiment of the present disclosure;

FIG. 14 illustrates an example algorithmic transformation for determining a slot corresponding to each position of a position set, in accordance with at least one example embodiment of the present disclosure;

FIG. 15A illustrates a visualization of the operations for performing even-odd transposition sort of an example even-odd starting positions pairing set starting from an even phase and generating a target positions vector therefrom, in accordance with at least one example embodiments of the present disclosure;

FIG. 15B illustrates an example process for target assignment of a targets vector embodying a target qubits position vector based on a target slots midpoint vector, in accordance with at least one example embodiment of the present disclosure;

FIG. 16A illustrates a visualization of the operations for performing even-odd transposition sort of an example even-odd starting positions pairing set starting from an odd phase, in accordance with at least one example embodiments of the present disclosure;

FIG. 16B illustrates an example process for target assignment of another targets vector embodying another target qubits position vector based on another target slots midpoint vector, in accordance with at least one example embodiment of the present disclosure;

FIG. 17A illustrates a data visualization of partitioning a positions pairing set for conversion to an even-odd positions pairing set, in accordance with at least one example embodiment of the present disclosure;

FIG. 17B illustrates an example visualization of a weighted, directional graph generated corresponding to an example starting positions pairing set, in accordance with at least one example embodiments of the present disclosure;

FIG. 18 illustrates example histogram of distance weight calculations for an example path for traversing through an example directed, weighted graph, in accordance with at least one example embodiment of the present disclosure;

FIG. 19 illustrates a visualization of a first identified shortest path as part of a shortest paths graph algorithm, in accordance with at least one example embodiment of the present disclosure;

FIG. 20 illustrates a visualization of a processed portion of an example directed, weighted graph with updated weights based on an identified shortest path tree and shortest path, in accordance with at least one example embodiment of the present disclosure;

FIG. 21 illustrates a visualization of a processed portion of an example directed, weighted graph with an identified shortest path reversed, in accordance with at least one example embodiment of the present disclosure;

FIG. 22 illustrates a visualization of a second identified shortest path as part of a shortest path graph algorithm, in accordance with at least one example embodiment of the present disclosure;

FIG. 23A illustrates a visualization of a third identified shortest path as part of a shortest path graph algorithm, in accordance with at least one example embodiment of the present disclosure;

FIG. 23B illustrates a visualization of the consolidated paths of an example graph, in accordance with at least one example embodiment of the present disclosure;

FIG. 24 illustrates an example visualization of operations for processing a closed cycle path of a weighted, directed graph, in accordance with at least one example embodiments of the present disclosure;

FIG. 25 illustrates an example visualization of an original starting positions pairing set together with a corresponding initial swap command and a converted even-odd starting positions pairing set, in accordance with at least one example embodiment of the present disclosure;

FIG. 26 illustrates an example flowchart including example operations for target assignment, as part of an example process for instruction compilation for at least one time slice, in accordance with at least one example embodiments of the present disclosure;

FIG. 27 illustrates an example flowchart including example operations for target assignment, as part of an example process for instruction compilation for at least one time slice, in accordance with at least one example embodiments of the present disclosure;

FIG. 28 illustrates an example flowchart including example operations for target assignment, as part of an example process for instruction compilation for at least one time slice, in accordance with at least one example embodiments of the present disclosure;

FIG. 29 illustrates an example flowchart including example operations for target assignment, as part of an example process for instruction compilation for at least one time slice, in accordance with at least one example embodiments of the present disclosure; and FIG. 30 illustrates an example flowchart including example operations for target assignment, as part of an example process for instruction compilation for at least one time slice, in accordance with at least one example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Quantum computers manipulate qubits for use in various computing actions. In one such context, quantum computers utilize qubits as inputs to one or more logic gates configured for performing logical operations based on the states of the input qubits. Configurations of logic gates may be combined in a myriad of ways in a quantum program, for example where the quantum program is specifically configured for reaching a desired result.

One such environment in which qubits are manipulated is a one-dimensional quantum computing environment. In a one-dimensional quantum computing environment, qubit movement is constrained to a single dimension meaning that qubits can move either forward or backward along this dimension. One example of a one-dimensional quantum computing environment is where qubits are linearly arranged within a confinement apparatus of a quantum computer, for example at one or more predefined regions of an ion trap while maintaining ion positions in a well-defined order. In some such contexts, the quantum computer is configured for performing logical operations (e.g., logic gates) utilizing input qubits that are adjacent to one another. Accordingly, in the one-dimensional arrangement of qubits, only those that are positioned at adjacent positions within the qubit ordering may be input to the same logic gate. Additionally, in some such implementations, each region may be configured to enable one or more qubits to be located at that region while maintaining well-defined positions within the qubit ordering, such that no two qubits may share a single position within the ordering. Non-limiting examples of such implementations include transportable trapped ion quantum computers, such as quantum charge coupled device(s) that require physically adjacent pairs of qubits within the same gating zone (e.g., adjacent positions within the computing environment) for gating at the appropriate time slice.

The present disclosure includes embodiments for all one-dimensional quantum computing environments, regardless of various factors associated with such a quantum computing environment. For example, the present disclosure includes embodiments for all one-dimensional quantum computing environments regardless of qubit type and regardless of the particular swap operation available so long as the swap operation occurs between nearest neighbor sites (e.g., adjacent qubit position(s) in the qubit ordering) in the one-dimensional quantum computing environment. Non-limiting examples include one-dimensional arrays of superconducting qubits, quantum dot qubits, neutral atom qubits, photonic qubits, any qubit type where the adjacent swaps are quantum swap gates, one-dimensional arrays of logical qubits formed from a collection of any physical qubit type where the swap operation is a logical swap gate or swaps of batches of physical qubits between nearest neighbor blocks of qubits, one-dimensional arrays of qubits within a larger and/or higher-dimensional arrangement of qubits regardless of qubit type and swap-operation implementation, and/or the like. Thus, it should be appreciated that the disclosure should not be limited to any particular quantum computing environment, any particular one-dimensional quantum computing environment implementation, qubit implementation, swap operation implementation, and/or any combination thereof.

Additionally, in some implementations, the physical structure of the quantum computer minimizes the ability for qubits to be readily moved across long distances. For example, in the one-dimensional arrangement, qubits may be limited to movements only to regions adjacent to the qubit's current region or to the next occupied region (e.g., the next region having another qubit located therein) or the next unoccupied region (e.g., the next region not having a qubit located therein). In this regard, qubits may switch positions in a well-defined order with a qubit one position higher or one position lower in the order, such that regardless of the distance between qubits the qubits nevertheless remain in the desired, well-defined order within the one-dimensional environment. It should be appreciated that such contexts may involve a plurality of qubit swaps to facilitate movement of each qubit from a starting position to a desired position within the well-defined order of qubits. Such movements similarly may need to be performed for a plurality of qubits, for example to organize the qubits for use in executing a desired set of logic gates within a particular time slice. For example, a quantum program includes a plurality of logic gates to be performed within one or more time slices.

However, the management and movement of qubits is a resource intensive task. Each repositioning action requires both time and energy to effectuate a desired movement. Further still, the precise nature of qubit management increases the likelihood of errors resulting from qubit movement, for example qubit memory error which accumulates in increasing fashion the longer the movement takes. Accordingly, to conserve computing resources and minimize errors, it is desirable to efficiently perform qubit repositioning within the quantum computing environment. Further, conventional non-quantum computing system implementations configured for manipulating qubit positions are often significantly resource intensive, difficult to maintain, and/or otherwise not suitable for use based on restrictions in the operation of a quantum computer (e.g., to only manipulate qubits to move one region in either direction), such that improved methodologies performed by a non-quantum computer for generating a reduced number of basic operations improves the operation of non-quantum computers as well as the corresponding advantages to the operation of the quantum computer. For example, such improved methodologies reduce the use of conventional computing resources (e.g., processing resources, memory resources, networking resources, and/or the like), as compared to conventional implementations known in the art for generating such instructions for controlling the quantum computer to reach a desired result. Accordingly, effecting efficient qubit repositioning that meets the restrictions of modern day quantum computing implementations is desirable.

Embodiments of the present disclosure provide for instruction compilation for at least one time slice in a one-dimensional quantum computing environment, for example by automatically generating an algorithm swap command set. The algorithm swap command set may be efficiently generated using a sorting algorithm with data movement constrained to swapping and/or otherwise manipulating data elements between adjacent data storage sites within a one-dimensional array and storing a manipulation indicator, such as a swap indicator, for each manipulation determined to be performed. Sorting algorithms that generate swap command sets where swaps can be performed in parallel reduce the total time for qubit repositioning. One such sorting algorithm is even-odd transposition sort. For one-dimensional quantum computing environments limited to repositioning only to adjacent regions, the algorithm swap command set represents movements that can be effectuated by the quantum computer to reposition qubits to desired positions within the constraints of the quantum computer. The algorithm swap command set contains a set of parallel swap commands, each parallel swap command representing a set of swaps that can be applied at the same time in parallel to sets of adjacent qubit pairs, where the set of all qubits in the adjacent qubit pair sets for a single parallel swap command are unique (i.e. one qubit is only included in at most one swap within the parallel swap command). Further, in some contexts, a target qubit position set may be identified in a particular manner, for example based on a near-midpoint qubit open index pair for each qubit pair, to reduce the number of resulting parallel swap commands. Accordingly, the even-odd transposition sort may be executed to reduce the number of required parallel swap commands to at most N, where N represents the number of qubits of a qubit set that may require repositioning in the quantum computing environment. Additionally, assigning target qubit positions near a near-midpoint qubit open index pair for each qubit pair, and/or a single qubit for gating as a single input (which may not require repositioning), and/or otherwise may be manipulated to any position), the number of parallel swap commands can be further reduced to less than N in many cases. Additionally or alternatively, in some embodiments, slot-based target assignment is performed, resulting in a target qubit positions set with a further reduced worst-case scenario, as described herein. By generating the algorithm swap command set, and/or any corresponding instruction sets therefrom, using the even-odd transposition sort or other sorting algorithm satisfying the constraints, complexity is reduced due to the simplified nature of generating such instructions for effecting such repositioning. Additionally or alternatively, by reducing the number of parallel swap commands to be performed, some example embodiments of the present disclosure conserve computing resources and/or reduce prospective errors that may occur in the quantum computing environment. Furthermore, in some example embodiments, forward-looking processing of subsequent time slices may enable further reduction of the number of operations to be performed, for example by identifying when qubit pairs at a first (e.g., a current) time slice are adjacent while repositioning. In this regard, prior to proceeding for other qubits at a first time slice becoming adjacent, and gating may take place for said adjacent qubits at in an earlier operation. Additionally or alternatively, in some embodiments, forward-looking processing optimizations may perform selecting new target positions for said qubits that were gated early based on qubits to be gated on a second time slice or other subsequent time slice, such as to minimize the number of parallel swap commands at a second time slice. It should be appreciated that such embodiments enable repositioning of any number of qubits.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "one-dimensional quantum computing environment" refers to quantum computing hardware, software, middleware, firmware, and/or a combination thereof, wherein qubits are positioned in a one-dimensional space. In some example embodiments, a one-dimensional space may be a linear arrangement of locations. In some example embodiments, a one-dimensional quantum computing environment includes an ion trap comprising a number of one-dimensionally arranged regions, such as parallel to the longitudinal axis of the ion trap, for trapping qubits in various regions along the linear arrangement of regions within the ion trap. For example, regions may be defined such that a qubit at a particular index is located within a particular space associated with one or more other qubits (e.g., the first qubit is positioned ahead of all other qubits, the second qubit is positioned anywhere between a first qubit and a third qubit, and so on). The positions of qubits within a one-dimensional quantum computing environment may be controlled using one or more electrodes positioned along the length of the ion trap, for example by adjusting voltage(s) applied to one or more of the electrode(s) to move the ions along the one-dimensional space. In some example embodiments, a one-dimensional quantum computing environment includes a one-dimensional arrangement of logical qubits formed from a collection of physical qubits.

The term "qubit set" refers to a representation of a number of qubits within a one-dimensional quantum computing environment. In at least one example embodiment, the qubit set corresponds to a plurality of qubits trapped within the ion trap, and/or other quantum computing hardware for storing qubits, in a one-dimensional quantum computing environment. In one example embodiment, the qubit set corresponds to a plurality of logical qubits formed from a collection of physical qubits.

The term "time slice" refers to a particular instance or interval of time within which one or more computational operations is to occur within a computing environment. In at least one example embodiment, a time slice represents a time interval within which a set of quantum gate(s) is/are to be executed, which may be performed in series, in parallel, or substantially in parallel.

The term "circuit depth" refers to the number of time slices that embody execution of a particular quantum circuit. It should be appreciated that a quantum circuit embodying a quantum program may include any number of time slices depending on the operations to be performed. The term "depth-1 circuit" refers to a quantum circuit having a single time slice. In such contexts the term "time slice" and "depth-1 circuit" may be used interchangeably as synonymous.

The terms "position index" and "position" refer to electronically managed data representing a position of a qubit within a one-dimensional ordering of qubits within a one-dimensional quantum computing environment at a particular time slice. In this regarding, a position index "p" represents a qubit's position in the range [0, Q), where Q represents the number of positions in the one-dimensional quantum computing environment. The term "positions vector" refers to any vector having a vector length "L" of unique positions, where the vector length L is less than or equal to the number of positions in the one-dimensional quantum computing environment. For example, given a particular positions vector "v" of length "L" and a vector index "i" in the range [0, L), v[i] represents a unique position in the range of positions [0, Q). In some contexts, a positions vector comprises the same number of qubit positions Q (e.g., L=Q) for processing all positions in the one-dimensional quantum computing environment, and in some other contexts a positions vector comprises a smaller number of qubit positions (e.g., L<Q) for processing a subset of all the positions in the one-dimensional quantum computing environment. It should be appreciated that a one-dimensional quantum computing environment may include any number of positions for processing qubits of a qubit set.

The term "complete set of positions" and "all positions" refer to one or more data structures including representations of all positions in a one-dimensional quantum computing environment. For example, in an example context having 12 positions, "all positions" would refer to a list, set, or other data structure including data values corresponding to each of said 12 positions (e.g., a list of indexes 0 through 11 corresponding to positions 1 through 12).

The term "initial position index" refers to a particular position index for a qubit at a beginning of a time slice. The term "start positions pairing set" refers to electronically managed data representing the set of all start position pairs for a particular time slice. In some embodiments, the start positions pairing set includes pairs of initial pairing indices.

The term "target position index" refers to a particular position index for a qubit located at a corresponding position index at an end of a time slice.

The term "initial qubit position set" refers to electronically managed data representing an initial position index set for all, or a subset of, qubits embodying a qubit set. In some embodiments, an initial qubit position set is embodied by a vector having a length equal to the number of qubits in the qubit set, wherein the value at each index of the vector represents an initial position index for the qubit represented by the index of the vector.

The term "target qubit position set" refers to electronically managed data representing the target position of each current position of qubits indexed by current position. In some embodiments, the target qubit position set is embodied by a vector indexed by current position ("targets"). For example, given the current positions set ("current") and a particular indexed qubit ("q"), p1=current[q] where p1 represents the current position index of the qubit q, and further t1=targets[p1] where t1 represents the target position of the current position p1 containing qubit q for a particular time slice. The target qubit position set includes a target qubit position index for all qubits, or a subset of qubits, in a qubit set. In some embodiments, a target qubit position set is embodied by a vector having a length equal to the number of qubits in the qubit set, wherein the value at each index of the vector represents a target position index for the qubit represented by the index of the vector. In at least some embodiments, the target qubit position set includes a target position index for each qubit corresponding to an initial position index in an initial qubit position set.

The terms "bipartition," "bipartitioning," "bi-partition," and "bi-partitioning" with respect to a particular source set refer to identifying two subsets of the source set based on one or more criteria, where the two subsets are disjoint and the union of the two subsets is equivalent to the source set. The term "equally-sized subsets of a bipartition" refers to the two subsets of a bipartition where each subset comprises an equal number of elements from the source set. Non-limiting examples of equally-sized subsets of a bipartition of a complete set of positions, for example, include a first subset of positions with all even positions and a second subset of positions with all odd positions, a first subset containing the elements $\{0, 3, 4, 7, 8, 11, 12, \ldots, N-4, N-1\}$ and a second subset containing the elements $\{1, 2, 5, 6, 9, 10, \ldots, N-3, N-2\}$ out of N positions, a first subset containing the first positions of all start position pairs and the second subset containing the second positions of all start position pairs, and/or the like.

The term "gating" refers to the physical positioning of one or more qubits, and/or pairing of two qubits within a defined proximity, to enable performance of a logical gate based on the state of the one or more qubits. In this regard, a plurality of qubits may be gated for purposes of performing a number of logical gates in parallel, and/or a quantum circuit based on various gating operations performed over a series of time slices.

The term "qubit pair" refers to an unordered pair of unique qubit indices comprising a first qubit "q1" and a second qubit "q2," where the first qubit q1 and the second qubit q2 are each in the range [0, Q), and where q1 is not equal to q2 and Q represents the total number of qubits in the one-dimensional quantum computing environment. Unless specified otherwise elsewhere within this description, the order of qubits in a qubit pair does not matter, such that the qubit pair (q1, q2) is determinable as equivalent to the qubit pair (q2, q1) for purposes of processing. In some embodiments, the first qubit and the second qubit of a qubit pair are associated with one another for gating at a defined time slice. In some embodiments, a logical gate within a designed circuit identifies a qubit pair to be used in performing the logical gate. Any consistency in the storage and/or display of qubit pairs and/or qubit position indices generally throughout is provided for convenience and to enhance the understandability of the disclosure and is not meant to limit the scope or spirit of the disclosure.

The terms "qubit pairing set" and "positions pairing set" refers to an electronically managed data object comprising set of qubits and/or positions paired that represent qubit pairs marked for gating at a particular time slice, or a plurality of time slices. For example, in at least one example embodiment, a qubit pairing set including position pairs corresponding to qubit pairs for each of a plurality of time slices based on a designed quantum computing circuit of one or more logical gates to be executed.

The term "start" when used with respect to a particular time slice refers to a Q-length positions vector, where Q is the number of qubits in a qubit set maintained in a one-dimensional quantum computing environment, indexed by qubit representing the starting positions of all qubits at the beginning of the particular time slice. For example, for a vector "start" and a particular index "q," start[q] represents the starting position of qubit q for a particular time-slice, where q falls in the range [0, Q) and Q represents the number of positions in the one-dimensional quantum computing environment. The term "start position" for a particular qubit refers to the position index of the particular qubit identified from a start vector for a particular time slice, the start position index p for a start vector v and qubit q defined by start[q].

The term "current" refers to a Q-length vector, where Q is the number of qubits in a qubit set maintained in a one-dimensional quantum computing environment, indexed by that represents the current position of each qubit in the qubit set at a particular step in one or more algorithm(s) for assigning and/or manipulating qubit position(s) as described herein. In one example context, "current" refers to a vector of the current positions of all qubits at a particular step in the described process(es) for assigning a target qubit position set. For example, in some embodiments, current[q] defines the current position of qubit q from a particular qubit set. At the beginning of a particular time slice, "current" is initialized to be equivalent to the "start" vector. Throughout the permutation sequence for assigning the target qubit position set, "current" may be updated to reflect the current positions of qubits as they swap through positions of the one-dimensional quantum computing environment on their way to assigned target positions for the particular time slice. In some such contexts, "current" values are unique in the index range [0, N).

The term "position pair" refers to electronically managed data representing a pair of unique positions comprising a first position p1 and a second position p2, where the first position and first position fall within the range [0, N), where N represents the number of positions and p1 is different than p2. Unless otherwise specified herein, a position pair is unordered, such that the position pair (p1, p2) is equivalent to the position pair (p2, p1).

The term "start position pair" when used with respect to a particular time slice refers to electronically managed data representing a position pair (p1, p2) corresponding to a particular qubit pair (q1, q2) that identifies the starting position index for each of the qubits q1 and q2. The position pair (p1, p2) comprises a first position p1 representing a first start position corresponding to a first qubit q1 of the particular qubit pair in a qubit pairing set and the position pair comprises a second position p2 representing a second start position corresponding to a second qubit q2 of the particular qubit pair. A start position pair (p1, p2) corresponding to a particular qubit pair (q1, q2) is determinable from a start vector ("start") such that p1 is defined by start[q1] and p2 is defined by start[q2]. Unless otherwise specified herein, a start position pair is unordered, such that the start position pair (p1, p2) is equivalent to the start position pair (p2, p1).

The terms "even-even pair" and "ee-pair" refer to a position pair (p1, p2) where both p1 and p2 represent even position indices. In some contexts, an even-even pair represents a start position pair representing two even position indices, which may be referred to as an "even-even start position pair."

The term "odd-odd pair" and "oo-pair" refer to a position pair (p1, p2) where both p1 and p2 represent odd position indices. In some contexts, an odd-odd pair represents a start position pair representing two odd position indices, which may be referred to as an "odd-odd start position pair."

The terms "even-odd pair," "odd-even pair," "eo-pair," and "oe-pair" refer to a position pair (p1, p2) where either p1 is odd and p2 is even, or p1 is even and p2 is odd. In some contexts, an even-odd pair represents a start position pair representing one even position index and one odd position index in any order, which may be referred to as an "even-odd start position pair."

The term "even-odd start position pairing set" refers to a start positions pairing set comprising any number of start position pairs, where each position pair comprises an even-odd start position pair.

The term "slot" refers to an indexed representation corresponding to two position indices in a one-dimensional quantum computing environment. The correlation between a position and a slot is determinable based on a particular algorithm. In some embodiments, the two positions of a slot are adjacent, and two qubits occupying the same slot satisfy the adjacency requirement. For example, a slot ("s") for a particular position ("p") is determined performing integer division on the particular position by a determinable division factor, such as $p//2 == s$ where "//" represents integer division discarding remainder. In this regard, a particular slot may map to two different positions (e.g., $p1 == (s*2)$, and $p2 == (s*2)+1$).

The term "near-midpoint open index pair" refers to one or more data objects representing unassigned target position indices of a target qubit position set to be assigned for a first qubit and a second qubit of a qubit pair. In some embodiments, the near-midpoint open index pair represents two target position indices located at, and/or nearest to, the midpoint indices based on the initial position indices for the first qubit and the second qubit of the qubit pair.

The term "even-odd transposition sort" refers to a computing algorithm for sorting data values within a vector, the vector having any number of indices, by performing swaps of the data values located at adjacent indices at alternating even and odd cycles where the even cycle has lower index even and the odd cycle has lower index odd for a number of iterations. It should be appreciated that an even-odd transposition sort relies on comparing data values at adjacent indices of the vector and swapping the data values if the order of the data values does not meet a desired value ordering (e.g., if the data values are to be ascending but are not, swap). Even-odd transposition sort is also known as: even-odd sort, odd-even sort, odd-even transposition sort, brick sort, parity sort, or parallel bubble sort.

The term "even swap" refers to a swap determined to be performed between data values residing at adjacent locations in a data vector where the lower index is even as part of an even-odd transposition sort. In some embodiments, one or more even swaps are performed during an even cycle of an even-odd transposition sort.

The term "odd swap" refers to a swap determined to be performed between data values residing at adjacent locations in a data vector where the lower index is odd as part of an even-odd transposition sort. In some embodiments, one or more odd swaps are performed during an odd cycle of an even-odd transposition sort.

The term "swap indicator" refers to an electronically managed data value representing determination of a swap to be performed. In some embodiments, a swap indicator represents a first data value to indicate determination of an even swap to be performed, and a second value to indicate determination of an odd swap to be performed. In other embodiments, a swap indicator represents a first value to indicate determination of a swap to be performed, and a second value to indicate determination of no swap to be performed, for example in a circumstance where the determination as to whether the swap is an even swap or an odd swap can be derived through another manner.

The term "algorithm swap command set" refers to one or more electronically managed data objects representing all swaps determined to be performed based on an even-odd transposition sort or one or more steps thereof. In some embodiments, for example, the algorithm swap command set includes any number of swap indicators determined to be performed to sort an initial qubit position set to reflect a target qubit position set.

The term "parallel swap command" refers to one or more electronically managed data objects representing a set of swaps to be performed in parallel at the same time. In some embodiments, a parallel swap command may refer to the set of swap indicators generated from an even cycle of the even-odd transposition sort. In some embodiments, a parallel swap command may refer to the set of swap indicators generated from an odd cycle of the even-odd transposition sort.

The term "qubit manipulation instruction set" refers to one or more electronically managed data objects representing instructions for manipulating qubits based on an associated algorithm swap command set. In this regard, in some embodiments, the qubit manipulation instruction set represents one or more qubit-level operations to be performed to represent the actions embodied in a corresponding algorithm swap command set.

The term "qubit swap instructions" refers to electronically managed data representing a swap of at least a first qubit and second qubit. In this regard, a pair of qubits which are swapped have their positions interchanged such that the first qubit's final position after the swap is in the second qubit's initial position before the swap, and the second qubit's final position after the swap is in the first qubit's initial position before the swap.

The term "qubit split instructions" refers to electronically managed data representing a split of at least a first qubit and a second qubit associated with a well-defined order and initially residing in a common region into two separate adjacent regions where after the split the first qubit resides in a first region of the two separate regions and the second qubit resides in a second region of the two separate regions, and the order of the qubits is maintained in its initial well-defined order.

The term "qubit join instructions" refers to electronically managed data representing a join of at least a first qubit initially residing in a first region and a second qubit initially residing in a second, separate adjacent region into finally a common region while maintaining an initial well-defined order for the two qubits. The term "qubit join instructions" may also be referred to as "qubit merge instructions" and "qubit recombine instructions."

The term "qubit shift instructions" refers to electronically managed data representing a shift of one or more qubits residing initially in a first region to finally a second region without changing a well-defined order of the qubits in the one-dimensional quantum computing environment.

The term "hardware instruction set" refers to one or more hardware instructions performed to physically manipulate the qubits for performing the actions represented by the qubit manipulation instruction set. A non-limiting example of a hardware instruction set includes applying time-varying electric potentials to control electrodes of an ion trap and/or associated hardware, to cause the hardware to perform a desired action represented by a qubit manipulation instruction.

The term "qubit manipulation hardware" refers to computing hardware, firmware, and/or software for configuring the hardware, configured to execute one or more hardware instructions for manipulating a position of or region containing one or more qubits in a quantum computing environment. Non-limiting examples of qubit manipulation hardware includes ion traps; electrodes connected for interacting with one or more qubits positioned at one or more regions along an ion trap of a quantum computer; voltage and/or waveform generators for providing voltage signals to the electrodes; lasers and corresponding beam delivery paths used to enact gates, cooling functions, and/or measurement functions on the one or more qubits; and/or the like.

The term "adjacent" when used with respect to position indices and/or qubits located at position indices refers to two positions which differ by 1 in index. For an example two positions p1 and p2, p1 is adjacent to p2 if and only if abs(p1−p2)==1, where abs(x) of some value x is defined as the absolute value of x, representing x in a circumstance where x is greater than or equal to zero (0) and representing −x (negative x) in a circumstance where x is less than zero. Qubits located in adjacent positions at a particular time slice may be gated.

Example Computing System and Environment

FIG. 1 illustrates a block diagram of a system that may be specially configured within which embodiments of the present disclosure may operate, in accordance with at least one example embodiment of the present disclosure. The block diagram provides a schematic diagram of an example quantum computer system 100 comprising an ion trap apparatus and/or package 150, in accordance with an example embodiment. In various embodiments, the quantum computer system 100 comprises a computing entity 10 and a quantum computer 102. In various embodiments, the quantum computer 102 comprises a controller 30, a cryostat and/or vacuum chamber 40 enclosing an ion trap apparatus and/or package 150, one or more manipulation sources 60, and one or more voltage sources 50. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more ions within the ion trap of the ion trap apparatus and/or package 150. For example, in an example embodiment, wherein the one or more manipulation sources 60 comprise one or more lasers, the lasers may provide one or more laser beams to the ion trap within the cryostat and/or vacuum chamber 40 via corresponding beam paths 66 (e.g., 66A, 66B, 66C). In various embodiments, the quantum computer 102 comprises one or more voltage sources 50. For example, the voltage sources 50 may comprise a plurality of transport and/or trapping (TT) voltage drivers and/or voltage sources and/or at least one radio frequency (RF) driver and/or voltage source. The voltage sources 50 may be electrically coupled to the corresponding TT electrodes and/or RF rails for generation of the trapping potential configured to trap one or more ions within the ion trap of the ion trap apparatus and/or package 150 via the corresponding electrical leads.

In some such embodiments, the ion trap includes and/or otherwise defines one or more physical regions at which a qubit may be located, or otherwise positioned, within the ion trap. In various embodiments, the regions are arranged in a linear and/or one-dimensional arrangement along the longitudinal axis of the ion trap (e.g., defined by the RF rails of the ion trap). In at least one example context, each physical region is configured to enable storage of one or more qubits at that region while maintaining a well-defined order of the qubit positions across all regions in the ion trap. Alternatively or additionally, in some embodiments, the ion trap is configured to enable movement of regions and movement of the qubits within those regions along the ion trap. In some such embodiments, adjacent qubits within the qubit ordering may have their positions swapped to enable repositioning of qubits in the one-dimensional quantum computing environment. In this regard, a qubit located at a first position (e.g., position 0), may be swapped only with a second position located along the ion trap in a first direction (e.g., position 1). A qubit located at a second position (e.g., position 1, between positions 0 and 2) may be swappable with position 2 (in a first direction) or position 0 (in another direction, for example opposite the first direction). In some embodiments, for example, voltage signals may be applied to the electrodes (e.g., TT electrodes) of the ion trap to cause a potential experienced by the ions within the ion trap that causes one or more actions for swapping adjacent qubits to allow for such repositioning (e.g., in a swap between position 1 and position 2 in the qubit ordering, a qubit initially at position 1 becomes positioned at position 2, and the qubit at position 2 becomes positioned at position 1 in parallel and/or otherwise substantially at the same time).

In various embodiments, a computing entity 10 is configured to allow a user to provide input to the quantum computer 102 (e.g., via a user interface of the computing entity 10) and receive, view, and/or the like output from the quantum computer 102. The computing entity 10 may be in communication with the controller 30 of the quantum computer 102 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more ions within the ion trap. In various embodiments, some or all of the ions trapped within the ion trap are used as qubits of the quantum computer 102.

In some embodiments, the controller 30 is embodied by a non-quantum computer configured for performing an even-odd transposition sort, as described herein. Additionally or alternatively, in some embodiments the controller 30 is configured for generating a swap command set, qubit manipulation instruction set, and/or hardware instruction set associated with the performed even-odd transposition sort. In this regard, the controller 30 may be configured to generate appropriate instructions for controlling the quantum computer 102 in the manner desired (e.g., to reposition various qubits to desired positions). Alternatively or additionally, in some embodiments, the computing entity 10 is configured for performing the even-odd transposition sort, and/or for generating the swap command set, qubit manipulation instruction set, and/or hardware instruction set associated with the performed even-odd transposition sort. In some such embodiments, the computing entity 10 is configured to communicate some or all of the generated data (such as the swap command set, qubit manipulation instruction set, and/or hardware instruction set). In this regard, the data generated via the computing entity 10 may be utilized by the controller 30 for controlling the quantum computer 102 in the manner desired (e.g., to reposition various qubits to desired positions), such that the computing entity 10 indirectly controls at least one aspect of the quantum computer 102.

Example Apparatus of the Present Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the controller 30 is embodied by one or more computing systems, such as the apparatus 200 as shown in FIG. 2. In other embodiments, the computing entity 10 is embodied by the apparatus 200 as shown in FIG. 2. The apparatus 200 may include a processor 202, memory 204, input/output module 206, communications module 208, and/or qubit instruction processing module 210. In some embodiments, the qubit instruction processing module 210 is optional, may be embodied by one or more of the other modules, and/or may be embodied by another system associated with the apparatus 200.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to provide functionality for instruction compilation for at least one time slice in a one-dimensional quantum computing environment. In this regard, the processor 202 may be specially configured to support functionality of the controller 30. In some such embodiments, the processor 202 includes hardware, software, firmware, and/or the like, configured for generating an algorithm swap command set for gating qubits of a qubit set in appropriate positions at a given time slice. The algorithm swap command set may further be used to generate one or more intermediate instruction sets, and/or repositioning the qubits of the qubit set according to the algorithm swap command set, such as using qubit manipulation hardware (e.g., one or more electrodes). It should be appreciated that the processor 202 may be configured to perform such functionality for any number of time slices.

The apparatus 200 further includes input/output module 206. The input/output module 206 may, in turn, be in communication with processor 202 to provide output to the user and, in some embodiments, to receive an indication of a user input. The input/output module 206 may comprise one or more user interfaces, and may include a display to which user interface(s) may be rendered. In some embodiments, the input/output module 206 may comprise a web user interface, a mobile application, a desktop application, a linked or networked client device, and/or the like. In some embodiments, the input/output module 206 may also include a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the apparatus 200. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communications network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The qubit instruction processing module 210 includes hardware, software, firmware, and/or a combination thereof, configured to support instruction compilation functionality and/or corresponding qubit manipulation functionality in a one-dimensional quantum computing environment associated with the controller 30. In some embodiments, the qubit instruction processing module 210 may utilize processing circuitry, such as the processor 202, to at least a portion, or all, perform these actions. In some such embodiments, the qubit instruction processing module 210 includes hardware, software, firmware, and/or a combination thereof, for at least identifying an initial qubit position set associated with a qubit set, identifying a target qubit position set associated with the qubit set, and generating an algorithm swap command set by performing an even-odd transposition sort based on at least the target qubit position set. In some embodiments, the qubit instruction processing module 210 is further configured for receiving a quantum program comprising a qubit pairing set associated with a qubit set, and/or determining a near-midpoint open index pair for a qubit pairing set, and/or assigning, in the target position set, target position indices based at least on the near-midpoint open index pair. In some embodiments, the qubit instruction processing module 210 is further configured for identifying a second target qubit position set associated with the qubit set at a second time slice and generating a second algorithm swap command set by performing an even-odd transposition sort based on at least a second target qubit position set.

In some embodiments, the qubit instruction processing module 210 is further configured to perform target assignment (e.g. identify a target qubit position set) based on particular starting positions for a particular qubit set. In some such embodiments, the qubit instruction processing module 210 may be configured to perform near-midpoint target assignment, slot-based target assignment, and/or the like as described herein. Additionally or alternatively, in some embodiments, the qubit instruction processing module 210 is configured to perform one or more pre-processing algorithms on a start positions pairing set before performing such target assignment.

It should be appreciated that, in some embodiments, the qubit instruction processing module 210 may include a separate processor, specially configured field programmable gate array (FPGA), or a specially configured application-specific integrated circuit (ASIC).

In some embodiments, one or more of the aforementioned components is combined to form a single module. The single combined module may be configured to perform some or all of the functionality described above with respect to the individual modules. For example, in at least one embodiment, the qubit instruction processing module 210 may be combined with the processor 202. Additionally or alternatively, in some embodiments, one or more of the modules described above may be configured to perform one or more of the actions described with respect to one or more of the other modules.

Example Computing Environment of the Present Disclosure

FIG. 3 illustrates an example quantum program, for example compiled in an example computing environment for at least one time slice in a one-dimensional quantum computing environment, in accordance with at least one example embodiment of the present disclosure. In some embodiments, one or more of the illustrated elements is embodied by one or more data object(s) and/or other data values maintained by a computing system, such as the controller 30 embodied by the specially configured apparatus 200. In this regard, each illustrated element may be embodied, and/or manipulated, using hardware, software, firmware, and/or a combination thereof.

In some embodiments, a computing entity may be used to generate a quantum program 302 and/or submit the quantum program 302 for compilation and/or execution. The quantum program 302 may be written in any of a myriad of quantum computing programming languages, and embody any number of commands to be performed via a quantum computing system. In this regard, the quantum program 302 may embody user-submitted instructions to be executed via the quantum computing system, for example by first compiling the quantum program into one or more executable set of instructions that the quantum computing system can process and/or execute. In this regard, the quantum computing system may implement the quantum program by initializing any number of qubits managed by the quantum computing system, and/or performing operations using the qubits, such as logical gate operations performed using associated pairs of qubits and/or individual qubits as the inputs to the logical gate operations.

In some such embodiments, the quantum program 302 includes, and/or is embodied by, one or more sets of qubit pairs to be executed at various time slices. An example quantum program 302 is depicted, where the quantum program 302 is embodied by one or more qubit pairing set(s), each qubit pairing set comprising qubit pair(s) for qubits of a qubit set 304, to be executed at a plurality of time slices. As illustrated, the quantum program 302 is associated with a qubit set 304. The qubit set 304 includes 8 qubits, each qubit identified by a zero-based qubit index ranging from 0 to 7. Each qubit represented in the qubit set 304 may correspond to a qubit physically maintained in a corresponding quantum computing environment. Accordingly, the depicted qubit set 304 may correspond to an 8-qubit quantum computing system. It should be appreciated that, in other embodiments, any number of qubits may be utilized.

The quantum program 302 is broken down into a plurality of time slices, specifically time slices $T_k$, $T_{k+1}$, and $T_{k+2}$. Each of the time slices is associated with a qubit pairing set, the qubit pairing set comprising pairs of the qubits to be gated at the corresponding time slice. For example, as illustrated, at time slice $T_k$, the qubit pairings are embodied by qubit pair 306A that pairs qubit 0 with qubit 7, qubit pair 306B that pairs qubit 1 with qubit 2, qubit pair 306C that pairs qubit 3 with qubit 4, and qubit pair 306D that pairs qubit 5 with qubit 6 (collectively, the qubit pairs 306A-306D referred to as "qubit pairing set 306"). In this regard, each qubit pair may be associated with one or more logical gates to be executed at the time slice. For example, as illustrated, qubit pair 306C may represent qubit 3 and qubit 4 as inputs to a particular logic gate to be executed during time slice $T_k$, qubit pair 306D may represent qubit 5 and qubit 6 as inputs to another logic gate to be executed during time slice $T_{k+1}$. In this regard, the plurality of qubit pairing set(s) for each time slice may embody all qubit pairings embodying the quantum program 302. Although not depicted, it should be appreciated that in some embodiments one or more qubits is not associated with a qubit pair, such that the qubit need not be positioned adjacent to any particular qubit for the associated time slice.

Execution of a logical gate may require that the qubit pair, embodying inputs to the logical gate, be located at adjacent positions within the quantum computing environment during the corresponding time slice to enable execution of the logical gate. In this regard, the qubits may require repositioning within a quantum computing system to position the qubits of a particular qubit pair adjacent to one another for execution of a corresponding logic gate. It should be appreciated that other logic gates may only require a single qubit, thus not requiring the qubit be positioned in any particular region or any particular index in a well-defined order.

In this regard, FIG. 4 illustrates another example computing environment for instruction compilation for at least one time slice in a one-dimensional quantum computing environment, in accordance with at least one example embodiment of the present disclosure. Specifically, the example computing environment includes a plurality of data objects that may be identified, maintained, and/or utilized for positioning qubits based on a qubit pairing set for a particular time slice. The data object(s) may further be maintained by a computing system, such as the controller 30 embodied by the specially configured apparatus 200. In this regard, each illustrated element may be embodied, and/or manipulated, using hardware, software, firmware, and/or a combination thereof.

FIG. 4 specifically illustrates, for the qubit set 304, an example initial qubit position set 402 and a target qubit position set 404 for time slice k. In this regard, the initial qubit position set 402 includes an initial position index for each qubit of the qubit set. Such initial qubit position indices may correspond to the physical ordering of the qubits along an ion trap in the quantum computing system at the beginning of the time slice. In this regard, for example, data value 402A represents an initial position index for the qubit at index 0 (e.g., qubit 0 of the qubit set 304), data value 402B represents an initial position index for the qubit at index 1 (e.g., qubit 1 of the qubit set 304), data value 402C represents an initial position index for the qubit at index 2 (e.g., qubit 2 of the qubit set 304), data value 402D represents an initial position index for the qubit at index 3 (e.g., qubit 3 of the qubit set 304), and so on. In some embodiments, each qubit may be located at a default initial position index, for example defaulted to the index range {0:7} associated with the qubits. In other contexts, the initial qubit position set may be optimized such that initial qubit positions are assigned for qubits that are already adjacent to one another and to be gated in the current time slice. Additionally or alternatively still, the initial qubit position set is generated such that the number of parallel swap commands required to reposition from the initial qubit position set to the target qubit position set for one or more subsequent time slices is reduced and/or otherwise minimized. For example, the initial qubit position set for the first time slice may be generated such that the second time slice has minimal parallel swap commands required to reposition from the initial qubit position set to the target qubit position set for the second time slice. It should be appreciated that embodiments may determine and/or otherwise generate the default initial position index for each qubit in any manner such that one or more time slices are optimized to reduce, minimize, and/or otherwise eliminate swap operations between one or more qubits to reposition based on a target qubit position set.

Accordingly, the target qubit position set 404 includes a target position index for each qubit of the qubit set. Such target qubit position indices may correspond to the physical ordering of the qubits along an ion trap in the quantum computing system during and/or at the end of the time slice, for example for execution of one or more logic gates. In this regard, for example, data value 404A represents a target position index for the qubit at index 0 (e.g., qubit 0 of the qubit set 304), data value 404B represents a target position index for the qubit at index 1 (e.g., qubit 1 of the qubit set 304), data value 404C represents a target position index for the qubit at index 2 (e.g., qubit 2 of the qubit set 304), data value 404D represents a target position index for the qubit at index 3 (e.g., qubit 3 of the qubit set 304), and so on.

Accordingly, the target position index, for a particular qubit, in the target qubit position set 404 corresponds to the position within the ordering of qubits along the ion trap to which the qubit must be moved. It should be appreciated that, in some circumstances, one or more qubits may not be moved, such that the initial position index for the qubit matches the target position index for the qubit.

In some embodiments, the target qubit position set 404 is determined, for example by the apparatus 200, based on a qubit pairing set for time slice k, such as the qubit pairing set 306 as depicted and described with respect to FIG. 3. In this regard, each qubit pair may be located such that the target position indices associated with each of the qubits in the qubit pair are adjacent to one another. In other words, for example in some contexts, the data value for a first target position index corresponding to a first qubit of the qubit pair may be adjacent to the data value for a second target position index corresponding to a second qubit of the qubit pair, where the data values are at most 1 position from one another. In this regard, a target position index of value "X" is adjacent to the target position index of value "X+1" and/or "X−1," if each of such values represents a valid index.

As depicted, the target qubit position set 404 positions each qubit adjacent to a corresponding qubit of a qubit pair in the qubit pairing set 306 at time slice k, as illustrated with respect to FIG. 3. For example, as depicted in qubit pair 306A of FIG. 3, qubit 0 is paired with qubit 7, and accordingly qubit 0 is associated with a target qubit position index 404A of the value "2" while qubit 7 is associated with a target qubit position index 404H of the value "3," such that the target position indices for the qubit pair are adjacent. Similarly, as depicted in qubit pair 306B of FIG. 3, qubit 1 is paired with qubit 2, and accordingly qubit 1 is associated with a target qubit position index 404B of the value "0" while qubit 2 is associated with a target qubit position index 404C of the value "1", such that the target position indices for the qubit pair are adjacent. Similarly, as depicted in qubit pair 306C of FIG. 3, qubit 3 is paired with qubit 4, and accordingly qubit 3 is associated with a target qubit position index 404D of the value "4" while qubit 4 is associated with a target qubit position index 404E of the value "5," such that the target position indices for the qubit pair are adjacent. Similarly, as depicted in qubit pair 306D of FIG. 3, qubit 5 is paired with qubit 6, and accordingly qubit 5 is associated with a target qubit position index 404F of the value "6" while qubit 6 is associated with a target qubit position index 404g of the value "7," such that the target position indices for the qubit pair are adjacent. Accordingly, with each qubit pair of the qubit pairing set 306 located in adjacent indices (e.g., corresponding to adjacent positions in the qubit ordering along an ion trap), each qubit pair may be utilized as inputs to execute a desired logic gate.

FIG. 5 illustrates example operations of an even-odd transposition sort and a corresponding algorithm swap command set, in accordance with at least one example embodiments of the present disclosure. In this regard, the algorithm swap command set 504 corresponds to the various operations to reposition qubits from initial positions to target positions. Specifically, FIG. 5 depicts even-odd transposition sort for repositioning the qubit set 304 based on the target qubit position set 404, specifically to reposition the qubit set 304 from the initial qubit position set 402 to the target qubit position set. Utilizing the even-odd transposition sort, it should be appreciated that qubits may be sorted in at most Q parallel swaps operations, where Q represents the number of qubits in a qubit set. Further, as described herein, determination and utilization of near-midpoint indices for qubit pairs is utilized to reduce the number of parallel swap operations required to reach the target qubit position set. In this regard, utilizing near-midpoint indices may reduce the number of parallel swaps nearly in half (Q/2 swaps) regardless of the initial positions for the various qubits.

The even-odd transposition sort includes a number of operational steps 502A-502E (collectively "steps 502"). Specifically, the algorithm operates on a data vector and starts at step 502A where the data vector is loaded with an array of values having the same ordering as the target qubit position set 404, and ends at step 502E where the data vector is sorted. In some embodiments, the data vector may be loaded with the target qubit position set itself. As illustrated, the steps 502 include a plurality of swap operations for swapping qubits at adjacent position indices. As illustrated, qubits that are swapped at a particular step are illustrated using dashed (or "broken" lines).

The algorithm swap command set 504 includes a swap indicator for each swap determined for performance during the even-odd transposition sort. As should be appreciated, the steps of the even-odd transposition sort alternates determining swaps to be performed for even indices (e.g., 0, 2, 4, and 6 as illustrated) and odd indices (e.g., 1, 3, and 5, as illustrated) beginning with the even indices. It should be noted, in some embodiments, that the algorithm may begin with the odd indices and achieve the same result. Each data value at an index in the data vector is compared with the data value at the next index (e.g., each data value at index "X" is compared with data value at index "X+1"). In the illustrated example context, the data vector is first loaded with the target qubit position set 404 and is utilized as a starting point for executing the even-odd transposition sort, for example at step 502A. Subsequently, at step 502B, swap operations are determined for each of the even indices 0, 2, 4, and 6. In this regard, a swap operation may be determined for a given index when the data value at the lower index is determined to be in an unsorted order relative to the data value at the next index. For example, a swap operation (e.g., an "even swap") may be determined for an even index X when the data value located at index X+1 is less than the data value located at index X.

As illustrated, at the first step 502B, the data vector values at indices 0 and 1 are swapped. In this regard, the data value at the index 0, value "2," is determined to be in unsorted order with respect to the data value at subsequent index 1, value "0." In this regard, the value "0" is less than the value "2," and not in proper order (e.g., ascending order in the context described), thus requiring a swap to properly order the values. Accordingly, the data values for the two indices are swapped at the first step 502B. Similarly, the data value at index 6, value "7," is determined to be in unsorted order with respect to the data value at subsequent index 7, value "3." In this regard, the value "3" is less than the value "7," but not in the proper order, thus requiring a swap. Accordingly, the data values for the two indices are swapped at the first step 502B. These swaps are recorded as swap indicators in the corresponding indices in the algorithm swap command set 504. Specifically, the left index of the swap is indicated as a "L" and the right index of a swap is indicated as a "R," for each determined swap. Such swaps end the first step 502B for the even indices.

In this regard, the data vector may represent the data values for the qubit position indices as they are manipulated via execution of the even-odd transposition sort. It should be appreciated that, as described, the data vector may be loaded based on the target qubit position set and thereby manipulated (e.g., based on swap commands) until the data vector is properly sorted. Once the data vector is properly sorted, the even-odd transposition sort may terminate, and processing for a new time slice may begin as described herein. Additionally or alternatively, the data vector may be processed during intermediary steps for any of a myriad of purposes, for example to optimize based on forward-looking analysis of the various qubits as described herein. For subsequent time slices, it should be appreciated that upon completion of a slice, for example at time slice k, the qubits of the qubit set have specific current positions. In this regard, such current positions at the end of a time slice may be utilized as initial qubit position indices for the subsequent (k+1) time slice, and in some embodiments may be used to derive the target qubit position set for the subsequent (k+1) time slice so as to optimize the number of required swap operations. In this regard, the algorithm may continue in this manner for any number of time slices, for example up to K time slices where K is the circuit depth.

The process continues in analogous fashion for the odd indices of the data vector. For example, a swap operation (e.g., an "odd swap") may be determined for an odd index X when the data value at index X+1 is less than the data value at index X. For example, at the second step 502C, the data value at index 1, value "2," is determined to be unsorted with respect to the data value at the subsequent index 2, value "1." In this regard, the value "1" is less than the value "2," but is not in the proper order, thus requiring a swap. Accordingly, the data values for the two indices are swapped at the second step 502C. Similarly, the data value at index 5, value "6," is determined to be unsorted with respect to the position index value at index 6, value "3." In this regard, the value "3" is less than the value "6," but is not in the proper order, thus requiring an additional swap. Accordingly, the data values at the two indices are swapped at the second step 502C. Corresponding swap indicators are stored in at the corresponding indices in the algorithm swap command set for each determined swap. Such swaps end the second step 502C for the odd indices.

The process continues for the third step 502D, at which the data value at index 4, value "5," is swapped with the data value at index 5, value "3." A corresponding swap indicator is subsequently stored to the algorithm swap command set 504. The process then continues for the fourth step 502E, at which the data value at index 3, value "4," is swapped with the data value at index 4, value "3." A corresponding swap indicator is subsequently stored to the algorithm swap command set. After the fourth step 502E, the data values are in the proper order, and the even-odd transposition sort is complete. Accordingly, the algorithm swap command set 504 represents the swaps necessary to reposition the qubits according to the target qubit position set 404. In this regard, the algorithm swap command indicator may be processed to perform the corresponding swaps associated with swap indicators therein, for example by generating one or more intermediate instruction sets and/or executing such instructions.

FIG. 6 illustrates various configurations for an algorithm swap command set, in accordance with example embodiments of the present disclosure. Such configurations include algorithm swap command set 504, which utilizes a first swap indicator to indicate a left index to be swapped, and a second swap indicator to indicate a right index to be swapped. In this regard, the swap indicators may be processed to determine whether a qubit is to be swapped left or right.

FIG. 6 further includes a first alternative algorithm swap command set 602. The algorithm swap command set indicates the lower index of each swap with a swap indicator equal to 1. In this regard, a corresponding system may process the first alternative algorithm swap command set 602 to identify each swap based on the swap indicators, and perform a swap for the index at which the swap indicator is located together with the subsequent index. In so doing, the right swap indicator need not be stored within the first alternative algorithm swap command set 602. In other embodiments, it should be appreciated that an algorithm swap command set may be generated that includes a swap indicator at the right index for each swap, such that a swap may be performed for the index at which the swap indicator is located together with the previous index (e.g., index "X" and index "X-1").

FIG. 6 further includes a second alternative algorithm swap command set 604. The algorithm swap command set 604 utilizes knowledge regarding the even-odd transposition sorting algorithm to reduce the amount of data that requires storage. Specifically, in this regard, the algorithm swap command set 604 stores swap indicators at a corresponding position based on whether the row represents an even index phase or an odd index phase. In the example context as depicted with respect to FIG. 5, for example, the first step 502B is performed for even indices, thus the first row of the algorithm swap command set 604 corresponds to even indices of the position index set being processed. Accordingly, index 0 of the first row of the algorithm swap command set 604 corresponds to the first even index of the position index set (e.g., index 0) being processed, where index 1 of the first row of the algorithm swap command set 604 corresponds to the second even index of the position index set (e.g., index 2) being processed, where index 2 of the first row of the algorithm swap command set 604 corresponds to the third even index of the position index set (e.g., index 4) being processed, and where index 3 of the first row of the algorithm swap command set 604 corresponds to the fourth even index of the position index set (e.g., index 6) being processed. Subsequently, the second step 502C is performed for odd indices, thus the second row of the algorithm swap command set 604 corresponds to odd indices of the position index set being processed. Accordingly, index 0 of the second row of the algorithm swap command set 604 corresponds to the first odd index of the position index set (e.g., index 1) being processed, where index 1 of the second row of the algorithm swap command set 604 corresponds to the second odd index of the position index set (e.g., index 3) being processed, and so on. This process may continue as the subsequent steps are performed, with the stored swap indicators alternating between representing swaps for even indices and swaps for odd indices. Accordingly, based on at least a determined and/or predetermined starting value (e.g., the first step performed for even indices, for example), the value of the row of the algorithm swap command set 604 being processed may be used to determine whether the row corresponds to swap indicators for even indices, or swap indicators for odd indices. In this regard, the data size of the algorithm swap command set 604 may be reduced.

Example Data Flow and Processes of the Disclosure

Having described example systems, apparatuses, and computing environments associated with embodiments of the present disclosure, example data flows and corresponding flowcharts including various operations performed by the above described apparatuses and/or systems will now be discussed. It should be appreciated that each of the flowcharts depicts an example computer-implemented process that may be performed by one or more of the above described apparatuses, systems, and/or devices, for example using one or more of the components described herein. The blocks of each process may be arranged in any of a number of ways, as depicted and described herein. In some such embodiments, one or more blocks of a first process may occur in-between one or more blocks, or otherwise operate as a sub-process, of a second process. Additionally or alternatively, the process may include some or all of the operations described and/or depicted, including one or more optional blocks in some embodiments. In regards to the below described flowcharts, one or more of the depicted blocks may be optional in some, or all, embodiments of the present disclosure. Optional blocks are depicted with broken (or "dashed") lines. Similarly, it should be appreciated that one or more of the operations of each flowcharts may be combinable, replaceable, and/or otherwise altered as described herein.

FIG. 7A illustrates an example data flow diagram of an example process for instruction compilation for at least one time slice in a one-dimensional quantum computing environment, in accordance with at least one example embodiment of the present disclosure. Specifically, as illustrated, FIG. 7A depicts operational data flow between various devices and/or systems, specifically a controller 30, a computing entity 10, and the remaining components of the quantum computer 102 (e.g., the manipulation sources 60 and/or voltage sources 50). It should be appreciated that the operations may be described from the perspective of any of the devices and/or systems depicted.

FIG. 7B illustrates an example flowchart of the data flow operations in the example process for instruction compilation for at least one time slice in a one-dimensional quantum computing environment, as depicted in FIG. 7A, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

At optional operation 702, the apparatus 200 receives a quantum program comprising at least one qubit pairing set associated with a qubit set. For example, the apparatus 200 includes means, such as the qubit instruction processing module 210, input/output module 206, communications module 208, processor 202, and/or the like, or a combination thereof, for receiving a quantum program comprising at least one qubit pairing set associated with a qubit set. In some such embodiments, the apparatus 200 receives the qubit program from a computing entity, such as the computing entity 10. In this regard, the computing entity 10 may be utilized to input and/or generate the quantum program, for example utilizing one or more programming languages configured for compilation and/or implementation via a quantum computer. In this regard, the quantum program may include and/or be embodied by one or more qubit pairing set(s) to be executed via the quantum computer, for example at various time slices. In some such embodiments, a qubit pairing set corresponds to various qubit pairs to be utilized as inputs for one or more logic gates at a particular time slice. In this regard, all qubits of a qubit set (e.g., having a predetermined number of qubits maintained by a quantum computer) may be associated with a qubit pair of the qubit pairing set at each time slice to associate two qubits for positioning at adjacent positions within the quantum computer, for example by moving paired qubits to adjacent regions within an ion trap of the quantum computer.

At operation 704, the apparatus 200 identifies an initial qubit position set associated with the qubit set. For example, the apparatus 200 includes means, such as the qubit instruction processing module 210, input/output module 206, communications module 208, processor 202, and/or the like, or a combination thereof, for identifying an initial qubit position set associated with the qubit set, and initialize a current position set with the initial qubit position set. In some embodiments, the apparatus 200 identifies an initial qubit position set that has qubit pairings for the first time slice adjacent to each other such that no qubit repositioning is required for the first time slice. In addition, the initial qubit position set may also be chosen such that the number of parallel swap commands required to reposition qubits for the second time slice is minimized. In other embodiments, an initial qubit position set may be identified based on one or more previously executed qubit repositioning. For example, in at least one context, the initial qubit position set corresponds to a target qubit position set for a previous time slice. In this regard, the current position set may represent the well-defined order of the qubits as currently positioned based on initialization of the apparatus, and/or based on repositioning of the cubits during one or more previous time slices.

At operation 706, the apparatus 200 identifies a target qubit position set associated with the qubit set. For example, the apparatus 200 includes means, such as the qubit instruction processing module 210, input/output module 206, communications module 208, processor 202, and/or the like, or a combination thereof, for identifying a target qubit position set associated with the qubit set. In some embodiments, the target qubit position set corresponds to target position indices for each qubit in the qubit set during a particular time slice. In this regard, the qubits may each require repositioning from an initial position index associated with the qubit in the initial qubit position set to the target position index associated with the qubit in the target qubit position set to enable execution of one or more logic gates based on qubit pairs, for example of a qubit pairing set for the time slice. In this regard, the target qubit position set may include adjacent target position indices for qubits to be input to a single logic gate. In some embodiments, the target qubit position set is based on the initial qubit position set for the current time slice. In this regard, the apparatus 200 processes the initial qubit position set to optimize the target qubit position set, so as to reduce the number of required parallel swap commands. One example context of such optimization is using a near mid-point open index pairings for qubit pairs as described herein. In other embodiments, the target qubit position set is generated agnostic with respect to the initial qubit position set.

In some embodiments, a data vector is initialized based on the indices in the target qubit position set. In this regard, the data vector may be manipulated as various steps of an even-odd transposition sort are performed, such that intermediary indices are determinable at each step and reflected as updates in the data vector. In some embodiments, the target qubit position set embodies the data vector.

At operation 708, the apparatus 200 generates an algorithm swap command set by performing an even-odd transposition sort based on at least the target qubit position set. For example, the apparatus 200 includes means, such as the qubit instruction processing module 210, input/output module 206, communications module 208, processor 202, and/or the like, or a combination thereof, for generating an algorithm swap command set by performing an even-odd transposition sort based on at least the target qubit position set. For example, the even-odd transposition sort may be performed to generate swap indicators for repositioning qubits from the positions indicated by the initial qubit position set to the positions indicated by the target qubit position set. For example, each swap determined in the even-odd transposition sort may cause generating of a swap indicator for inclusion in the algorithm swap command set. Accordingly, the algorithm swap command set may be processed to generate corresponding instructions for repositioning the qubits of the qubit set for executing corresponding logic gates, for example logic gates embodying a quantum program and represented in a qubit pairing set for a current time slice.

In this regard, in some embodiments, the even-odd transposition sort manipulates a data vector to reposition from the target qubit position set (to which the data vector is initialized) until the data vector is properly sorted. The data vector may embody each intermediate step as swap operations are performed and marked as described herein. In some such embodiments, the data vector may be processed as described herein at each swap for optimizations, forward-looking determinations, and/or the like. It should be appreciated that once a data vector is properly sorted from a target qubit position set, the apparatus may determine processing for the current time slice is complete.

In some embodiments, a loop may be formed based on the operations 704, 706, and 708 for a plurality of time slices, as described herein. In this regard, the generated swap commands indicated via performance of the even-odd transposition sort for a particular time slice may embody an algorithm swap command subset for that particular time slice—where the full algorithm swap command set embodies swap operations for all time slices of a quantum program. In this regard, for subsequent iterations, the initial qubit position set identified for a subsequent time slice may comprise updating the current position set based on the swap operations represented in an algorithm swap command subset for the previous time slice. As such, the qubits are indicated as beginning from the positions to which they were repositioned during the previous time slice. Subsequently, the target qubit position set for the subsequent time slice may be determined, in some embodiments based on the initial qubit position set and in other embodiments using any of a myriad of target position assigning algorithms as described herein. In this manner, each iteration of the even-odd transposition sorts may be utilized to generate an algorithm swap command subset based on at least the target qubit position set for each time slice. Upon completion of each iteration of the even-odd transposition sort, the resulting algorithm swap command subset for the time slice may be added to a data object embodying an algorithm swap command set for the full quantum circuit. Accordingly, once processing for all time slices (e.g., {0:(K−1)} time slices, where K is the total number of time slices) is complete, each algorithm swap command subset corresponding to each time slice would have been added to the full algorithm swap command set, such that the full algorithm swap command set embodies all swap operations required for the quantum circuit.

At optional operation 710, the apparatus 200 generates, based on at least the algorithm swap command set, a qubit manipulation instruction set. For example, the apparatus 200 includes means, such as the qubit instruction processing module 210, input/output module 206, communications module 208, processor 202, and/or the like, or a combination thereof, for generating, based on at least the algorithm swap command set, a qubit manipulation instruction set. In this regard, the qubit manipulation instruction set may correspond to a series of actions that may be compiled for execution via one or more components of a quantum computer to perform the swaps corresponding to the swap indicators of the algorithm swap command set. For example, the qubit manipulation instruction set may include one or more qubit swap instructions, qubit split instructions, qubit join instructions, qubit shift instructions, and/or any combination thereof. It should be appreciated that, in some embodiments, additional, alternatively, and/or a subset of instructions may be included in the qubit manipulation instruction set.

At optional operation 712, the apparatus generates a hardware instructions set based on at least the qubit manipulation instruction set. For example, the apparatus 200 includes means, such as the qubit instruction processing module 210, input/output module 206, communications module 208, processor 202, and/or the like, or a combination thereof, for generating a hardware instruction set based on at least the qubit manipulation instruction set. In this regard, the hardware instruction set may correspond to one or more physical manipulations of components of the quantum computer, for example quantum computer 102, to effect the actions represented by the qubit manipulation instruction set. For example, the hardware instruction set may represent one or more voltages to be applied to various electrodes used to effect an ion trap, and/or the qubits stored at regions thereof. It should be appreciated that the hardware instruction set may include predetermined voltages to be applied that correspond to each of qubit swap instructions, qubit split instructions, qubit join instructions, and/or qubit shift instructions.

At optional operation 714, the apparatus 200 executes the hardware instructions set using qubit manipulation hardware includes means, such as the qubit instruction processing module 210, input/output module 206, communications module 208, processor 202, and/or the like, or a combination thereof, for executing the hardware instructions set using qubit manipulation hardware. In some such embodiments, the qubit manipulation hardware may include any number of hardware components configured for effecting the repositioning of qubits in the quantum computer, for example one or more electrodes and/or the like. For example, in some embodiments, the qubit manipulation hardware includes voltage sources 50 and electrodes of the ion trap. By executing the hardware instruction set, the apparatus 200 is configured to reposition the qubit set to the positions represented in the target qubit position set by physically executing the swaps represented in the algorithm swap command set through any number of hardware-level operations.

FIG. 8 illustrates additional operations of an example process for instruction compilation for at least one time slice in a one-dimensional quantum computing environment, specifically for generating an algorithm swap command set by performing an even-odd transposition sort based on at least the initial qubit position set and the target qubit position set, in accordance with at least one example embodiment of the present disclosure. In this regard, the example process as illustrated may be performed by one or more specially configured systems such as a controller 30, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a quantum computer, and/or a computing entity, to facilitate one or more of the operations of the process depicted in FIG. 8.

The illustrated process begins at operation 802. In some embodiments, the process begins after one or more of the operations depicted and/or described with respect to one of the other processes described herein. For example, in some embodiments as described, the process begins after execution of operation 706. In this regard, the process may replace or supplement one or more blocks depicted and/or described with respect to one of the other processes described herein. For example, in some embodiments as depicted, the process depicted with respect to FIG. 8 supplants, supplements, and/or otherwise replaces the operation depicted and described with respect to operation 708. Additionally or alternatively, as depicted, upon completion of the process depicted in FIG. 8 and/or one or more operations associated therewith, flow may return to one or more operations of another process, for example to optional operation 710 as depicted.

At operation 802, the apparatus 200 stores, in a data object representing the algorithm swap command set, a first swap indicator for each even swap determined from the even-odd transposition sort and storing, to the data object representing the algorithm swap command set, a second swap indicator for each odd swap determined from the even-odd transposition set. For example, the apparatus 200 includes means, such as the qubit instruction processing module 210, input/output module 206, communications module 208, processor 202, and/or the like, or a combination thereof, for storing, in a data object representing the algorithm swap command set, a first swap indicator for each even swap determined from the even-odd transposition sort, and storing, to the data object representing the algorithm swap command set, a second swap indicator for each odd swap determined from the even-odd transposition sort. In this regard, the data object stores indicators for all swaps performed as part of the even-odd transposition sort. By storing a first swap indicator for even swaps and a second swap indicator for odd swaps, the data object generated may be parsed to differentiate between even phase and odd phase without additional data stored and/or without prior knowledge regarding the even-odd transposition sort.

FIG. 9 illustrates additional operations of an example process for instruction compilation for at least one time slice in a one-dimensional quantum computing environment, specifically for optimizing timing of gating operations for qubits that are positioned adjacent to one another before completion of an even-odd transposition sort, in accordance with at least one example embodiment of the present disclosure. In this regard, the example process as illustrated may be performed by one or more specially configured systems such as a controller 30, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a quantum computer, and/or a computing entity, to facilitate one or more of the operations of the process depicted in FIG. 9.

The illustrated process begins at operation 902. In some embodiments, the process begins after one or more of the blocks depicted and/or described with respect to one of the other processes described herein. For example, in some embodiments as described, the process begins after execution of operation 706. In this regard, the process may replace or supplement one or more blocks depicted and/or described with respect to one of the other processes described herein. For example, in some embodiments as depicted, the process depicted with respect to FIG. 9 supplants, supplements, and/or otherwise replaces the operation depicted and described with respect to operation 708. Additionally or alternatively, as depicted, upon completion of the process depicted in FIG. 9 and/or one or more operations associated therewith, flow may return to one or more operations of another process, for example to optional operation 710 as depicted.

At operation 902, the apparatus 200 determines, while executing the even-odd transposition sort, a second qubit pair for gating at the first time slice is associated with a first position index and a second position index, the first position index and the second position index representing adjacent position indices. For example, the apparatus 200 includes means, such as the qubit instruction processing module 210, input/output module 206, communications module 208, processor 202, and/or the like, or a combination thereof, for determining, while executing the even-odd transposition sort, a second qubit pair for gating at the current time slice has been positioned in adjacent indices before the even-odd transposition sort is completed (e.g., before placing the qubits in the final desired order). In this regard, the second qubit pair may represent a first qubit of the qubit set and a second qubit of the qubit set that are similarly to be utilized as inputs for a logic gate to be performed at the first time slice (e.g., the current time slice) together with other qubit pairs (and/or individual qubits) for gating. In this regard, the first position index and second position index may indicate that the qubits of the second qubit pair will be adjacent during an intermediate stage of repositioning from the initial qubit position set to the target qubit position set. It should be appreciated that such intermediate determinations may be identified for any number of qubit pairs, such that the execution of logic gates using qubit pairs that are adjacent before they reach their target qubit position indices may be identified for any number of qubit pairs such that instructions may be generated to perform those logic gates early (e.g., before the even-odd transposition sort is completed).

At operation 904, the apparatus 200 stores at least one command to perform a logical operation based on at least the second qubit pair. For example, the apparatus 200 includes means, such as the qubit instruction processing module 210, input/output module 206, communications module 208, processor 202, and/or the like, or a combination thereof, for storing at least one command to perform a logical operation based on at least the second qubit pair. In this regard, the apparatus 200 may store a first command to perform the logical operation. In at least one example context, the apparatus 200 performs the logical operation by executing the logic gate utilizing the qubits of the second qubit pair as input. Additionally or alternatively, the apparatus 200 may store the same command. In this regard, by performing the logical operation early, the apparatus 200 may not be required to re-execute the logical operation at the completion of the even-odd transposition sort, and/or may not be required to continue to reposition the qubits of the second qubit pair to adjacent positions for such purposes during the current time slice. Accordingly, such early execution may conserve execution power, processing power, and/or both, which may be further improved based on whether such a circumstance is determined for multiple qubit pairs.

At optional operation 906, the apparatus 200 includes means, such as the qubit instruction processing module 210, input/output module 206, communications module 208, processor 202, and/or the like, or a combination thereof, for determining a first updated target qubit position index for a first qubit of the second qubit pair. In some such embodiments, the first updated target qubit position index for the first qubit is determined based on a third qubit pair comprising at least the first qubit for gating at a second time slice. In this regard, the target qubit position index for the first qubit of the second qubit pair may be updated since the logical operation may be performed when the second qubit pair becomes adjacent earlier than termination of the even-odd transposition sort for the current time slice. For example, because the qubit no longer is required to be positioned adjacent to the second qubit of the second qubit pair at the end of the current time slice, the target qubit position index associated with the first qubit of the second qubit pair may be updated (e.g., to the first updated target qubit position index) such that the qubit is closer in proximity and/or otherwise adjacent to another qubit for gating during execution of the next time slice. It should be appreciated that the apparatus 200 may similarly process data associated with the second time slice to determine the qubit pair that includes the first qubit at the second time slice, such that the first qubit may be positioned closer to another qubit for which it will be gated in the second time slice. In some embodiments, the apparatus 200 may regenerate the entirety of the target qubit position set for all qubits to further reduce the number of swaps required for the current time slice and future time slice(s) (e.g., the subsequent time slice).

At optional operation 908, the apparatus 200 includes means, such as the qubit instruction processing module 210, input/output module 206, communications module 208, processor 202, and/or the like, or a combination thereof, for determining a second updated target qubit position index for a second qubit of the second qubit pair. In some such embodiments, the second updated target qubit position index for the second qubit is determined based on a fourth qubit pair comprising at least the second qubit for gating at the second time slice. It should be appreciated that, in some contexts, the fourth qubit pair may be the same as the third qubit pair. It should be appreciated that the second updated target qubit position index associated with the second qubit of the second qubit pair may be determined in a manner similar to that described with respect to the first qubit of the second qubit pair in operation 906. For example, the target qubit position index for the second qubit of the second qubit pair may be updated since the logical operation that utilizes this qubit (e.g., the logical gate) may be performed when the second qubit pair becomes adjacent earlier than termination of the even-odd transposition sort for the current time slice. Similarly, the target qubit position index associated with the second qubit of the second qubit pair may be updated (e.g., to the second updated target qubit position index) such that the second qubit is closer in proximity and/or otherwise adjacent to another qubit for gating during execution of the next time slice. It should be appreciated that the apparatus 200 may similarly process data associated with the second time slice to determine the qubit pair that includes the second qubit at the second time slice, such that the second qubit may be positioned closer to another qubit for which it will be gated in the second time slice.

It should be appreciated that the process described with respect to FIG. 9 may be repeated for any number of qubit pairs for a given time slice. For example, in some embodiments, only one qubit pair becomes adjacent before termination of the even-odd transposition sort. In other embodiments, no qubit pairs may become adjacent before termination of the even-odd transposition sort. In yet other embodiments still, all qubit pairs may become adjacent before termination of the even-odd transposition sort. It should further be appreciated that in circumstances where all qubit pairs may be executed before termination of the even-odd transposition sort (e.g., due to adjacent positioning between the two qubits of the qubit pair during intermediary steps of the even-odd transposition sort), the apparatus 200 may be configured to terminate the even-odd transposition sort early and/or begin execution of processing with respect to a subsequent time slice.

FIG. 10 illustrates additional operations of an example process for instruction compilation for at least one time slice in a one-dimensional quantum computing environment, specifically for generating a second algorithm swap command set by performing a second even-odd transposition sort, in accordance with at least one example embodiment of the present disclosure. In this regard, the example process as illustrated may be performed by one or more specially configured systems such as a controller 30, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a quantum computer, and/or a computing entity, to facilitate one or more of the operations of the process depicted in FIG. 10.

The illustrated process begins at operation 1002. In some embodiments, the process begins after one or more of the operations depicted and/or described with respect to one of the other processes described herein. For example, in some embodiments as described, the process begins after execution of operation 714. In this regard, the process may replace or supplement one or more operations depicted and/or described with respect to one of the other processes described herein. For example, in some embodiments as depicted, the process depicted with respect to FIG. 10 supplants, supplements, and/or otherwise replaces the operation depicted and described with respect to FIG. 7. Additionally or alternatively, as depicted, upon completion of the process depicted in FIG. 10 and/or one or more operations associated therewith, flow may end or return to one or more operations of another process. For example, in some embodiments, the process depicted with respect to FIG. 10 occurs after execution of operation 708, and flow returns to optional operation 710 upon completion of the process depicted with respect to FIG. 10.

At operation 1002, the apparatus 200 identifies a second target qubit position set associated with the qubit set at a second time slice. For example, the apparatus 200 includes means, such as the qubit instruction processing module 210, input/output module 206, communications module 208, processor 202, and/or the like, or a combination thereof, for identifying a second target qubit position set associated with the qubit set at a second time slice. In some embodiments, the second target qubit position set is identified based on the current qubit position set as updated from the target qubit position set for the previous time slice. In other words, as the time slice progresses to a subsequent time slice, the position indices for the qubits may be determined based on where such qubits ended up positioned from the previous time slice. In a manner similar to the first time slice, the second time slice may be associated with execution of one or more logic gates for implementing a quantum program. Such logic gates may each utilize a qubit pair as input, for example where all qubit pairs for the time slice are embodied by a second qubit pairing set. The second target qubit position set may be based on such qubit pairs. For example, in some such embodiments, the second target qubit position set represents a determined set of target position indices, where each qubit in the qubit set is assigned a target position index that is adjacent to a second target position index for a second qubit with which the qubit is paired. Accordingly, when repositioned based on the second target qubit position set, each qubit pair may be located at adjacent regions for input to a single logic gate. It should be appreciated that, in some embodiments, one or more qubits is not associated with a pair and may be utilized as a single input to a logical operation at one or more time slice(s).

At operation 1004, the apparatus 200 generates a second algorithm swap command set by performing a second even-odd transposition sort, for example based on at least the second target qubit position set. In this regard, the second even-odd transposition sort may reposition the qubits to their target qubit position indices as indicated for execution of the logical operations during the second time slice. For example, the apparatus 200 includes means, such as the qubit instruction processing module 210, input/output module 206, communications module 208, processor 202, and/or the like, or a combination thereof, for generating a second algorithm swap command set by performing a second even-odd transposition sort based on at least a second initial qubit position set and the second target qubit position set. In some such embodiments, the second initial qubit position set is embodied by a first target qubit position set for a first and/or previous (e.g., immediately preceding) time slice. In this regard, the second algorithm swap command set may include swap indicators for repositioning the qubit set from the second initial qubit position set to the second target qubit position set. For example, the second algorithm swap command set may represent swap indicators for repositioning the qubits from regions associated with a first target qubit position set (e.g., during a first time slice) to adjacent regions to enable qubit pairs to be input to at least one corresponding logic gate.

In some embodiments, the apparatus 200 is configured for performing one or more additional actions based on at least the second algorithm swap command set. For example, in some embodiments, the apparatus 200 includes means, such as the qubit instruction processing module 210, input/output module 206, communications module 208, processor 202, and/or the like, or a combination thereof, for generating, based on at least the second algorithm swap command set, a second qubit manipulation instruction set. The apparatus 200 pay perform such actions in a similar manner to that as described above with respect to optional operation 710. In this regard, the second qubit manipulation instruction set may include one or more qubit swap instructions, qubit split instructions, qubit join instructions, qubit shift instructions, and/or the like, or any combination thereof, that map be compiled for execution to reposition the qubit set according to the second algorithm swap command set. Additionally or alternatively, in some embodiments, the apparatus 200 includes means, such as the qubit instruction processing module 210, input/output module 206, communications module 208, processor 202, and/or the like, or a combination thereof, for generating a second hardware instruction set based on at least a second qubit manipulation instruction set. The apparatus 200 may perform such actions in a similar manner to that as described above with respect to optional operation 712. In this regard, the second hardware instruction set may represent one or more voltages to be applied to qubit manipulation hardware, for example various electrodes, to effect repositioning of the qubit set within an ion trap. Additionally or alternatively still, in some embodiments, the apparatus 200 includes means, such as the qubit instruction processing module 210, input/output module 206, communications module 208, processor 202, and/or the like, or a combination thereof, for executing the second hardware instructions set using qubit manipulation hardware. The apparatus 200 may perform such actions in a similar manner to that as described with respect to operation 714. In this regard, by executing the second hardware instructions set, the apparatus 200 may reposition the qubit set to positions corresponding to the second target qubit position set by executing the swaps represented in the second algorithm swap command set.

FIG. 11 illustrates additional operations of an example process for instruction compilation for at least one time slice in a one-dimensional quantum computing environment, specifically for identifying a target qubit position set associated with the qubit set, in accordance with at least one example embodiment of the present disclosure. In this regard, the example process as illustrated may be performed by one or more specially configured systems such as a controller 30, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a quantum computer, and/or a computing entity, to facilitate one or more of the operations of the process depicted in FIG. 11.

The process depicted and described with respect to FIG. 11 provides an optimization for assigning target qubit position indices in a manner that reduces or minimizes the number of required parallel swap commands for repositioning qubits to be adjacent for gating as desired. It should be appreciated that the particular process defines a specific exemplary target qubit position index assignment algorithm. In other embodiments, one or more alternative and/or additional target qubit position index assignment algorithm(s) may be implemented. Indeed, it should be appreciated that such algorithms may vary with respect to the level of complexity without deviating from the scope and spirit of this disclosure.

The illustrated process begins at operation 1102. In some embodiments, the process begins after one or more of the operations depicted and/or described with respect to one of the other processes described herein. For example, in some embodiments as described, the process begins after execution of operation 704. In this regard, the process may replace or supplement one or more operations depicted and/or described with respect to one of the other processes described herein. For example, in some embodiments as depicted, the process depicted with respect to FIG. 11 supplants, supplements, and/or otherwise replaces the operation depicted and described with respect to FIG. 7. Additionally or alternatively, as depicted, upon completion of the process depicted in FIG. 11 and/or one or more operations associated therewith, flow may end or return to one or more operations of another process, for example returning to operation 708 as depicted.

At operation 1102, the apparatus 200 determines, for each of the at least one qubit pair for gating at the first time slice and starting with a qubit pair having a greatest position distance based on at least a first initial positioned index for a first qubit of the qubit pair and a second initial position index for a second qubit of the qubit pair, a near-midpoint open index pair. For example, the apparatus 200 includes means, such as the qubit instruction processing module 210, input/output module 206, communications module 208, processor 202, and/or the like, or a combination thereof, for determining, for each of the at least one qubit pair for gating at the first time slice and starting with a qubit pair having a greatest position distance based on at least a first initial position index for a first qubit of the qubit pair and a second initial position index for a second qubit of the qubit pair, a near-midpoint open index pair. In at least some such embodiments, the near-midpoint open index pair for a particular qubit pair is based on at least the first initial position index and the second initial position index for the qubits of the qubit pair. In some such embodiments, the apparatus 200 may be configured for determining a position distance for the qubits of each qubit pair at a particular time slice. In this regard, the position distance for each qubit pair may be determined based on the difference between the first initial position indices for the first qubit of the qubit pair and the second qubit of the qubit pair, such as represented in an identified initial qubit position set for the time slice. For example, if a first qubit of the qubit pair is associated with a first initial position index of the value "1" and the second qubit of the qubit pair is associated with a second initial position index of the value "7," the position distance may be determined to be "6" (e.g., 7 minus 1). Similarly, if a second qubit pair includes a first qubit associated with a first initial position index of the value "2" and a second qubit associated with a second initial position index of the value "4," the position distance may be determined to be "2" (e.g., 4 minus 2).

In some embodiments, the apparatus 200 is configured for determining the position distance for all qubit pairs at a particular time slice, for example as indicated by a qubit pairing set. Accordingly, the apparatus may subsequently assign target position indices for qubit pairs in descending order, such that the qubit pair associated with the greatest position distance is assigned at each step. If no qubit pair has the greatest position distance (e.g., there is a tie between one or more qubit pairs having equal position distances), the apparatus 200 may proceed to assign positions to qubit pairs in order, randomly, and/or using any other selection algorithm. With reference to the qubit pairs of the qubit pairing set 306 as illustrated in FIG. 3, for example, the qubit pair 306A is associated with a position distance having the value "7" (e.g., 7 minus 0), the qubit pair 306B is associated with a position distance having the value "1" (e.g., 2 minus 1) as is each of the qubit pair 306C (e.g., 4 minus 3 to equal 1) and the qubit pair 306D (6 minus 5 to equal 1). Accordingly, the apparatus 200 may determine the qubit pair 306A is associated with the greatest position distance, and thus assign target qubit position indices for the qubit pair 306A first. The apparatus 200 may subsequently determine each of the remaining qubit pairs 306B-306D is associated with the same position distance, and thus assign target position indices in any order (e.g., in ascending order based on the initial qubit position indices, and/or descending order, and/or the like).

In some such embodiments, the apparatus 200 is configured for determining a near-midpoint open index pair for each qubit pair associated with a given time slice. For a given qubit pair, the near-midpoint open index pair may represent a first target position index for the first qubit of the qubit pair and a second target position index for the second target position index of the qubit pair. The target position index for each qubit may not be assigned to another qubit (e.g., is "open" for assignment) at a previous step. In this regard, the apparatus 200 may determine a midpoint between the initial position indices for the qubit pair, and determine the nearest adjacent target position indices of a target qubit position set that remains unassigned. Returning to the example qubit pairing set 306 illustrated with respect to FIG. 3, starting with the qubit pair 306A, the apparatus 200 may determine indices having the values "3" and "4" as possible midpoint indices. In some embodiments, the apparatus 200 may shift each qubit pair to be indexed such that the near-midpoint open index pair begins on an even index, for example to enable the maximum number of qubit pairs to be positioned if necessary. In some such embodiments, the apparatus 200 is configured for attempting to shift the indices to lower indices first, and subsequently determine if such lower indices remain unassigned (for example, by searching for such indices in the target qubit position set) before attempting to shift the indices to the immediately higher indices. In this regard, the apparatus 200 may determine the near-midpoint open index pair having the values of "2" and "3," for example as depicted. In other embodiments, the apparatus 200 is configured for attempting to shift the indices to higher indices first, and subsequently determine if such higher indices remain unassigned before attempting to shift the indices to the immediately lower indices. In some such embodiments, the apparatus 200 may determine the near-midpoint open index pair having the values of "4" and "5."

At operation 1104, the apparatus 200 determines, for assigning, in the target qubit position set, the first target position index and the second target position index based on at least the near-midpoint open index pair. For example, the apparatus 200 includes means, such as the qubit instruction processing module 210, input/output module 206, communications module 208, processor 202, and/or the like, or a combination thereof, for determining, for assigning, in the target qubit position set, the first target position index and the second target position index based on at least the near-midpoint open index pair. For example, the apparatus 200 may associate, in the target qubit position set, the first target position index of the near-midpoint open index pair with the first qubit of the qubit pair. Additionally, the apparatus 200 may associate, in the target qubit position set, the second target position index of the near-midpoint open index pair with the second qubit of the qubit pair. By assigning such indices within the target qubit position set, the apparatus 200 may perform subsequent checks with the target qubit position set to prevent assigning the indices to another qubit at a future step.

Upon assigning target position index "2" and target position index "3," such indices may not be subsequently be assigned to another qubit. Accordingly, in some embodiments, the apparatus 200 may continue to perform the operations 1102 and/or 1104 for any number of qubit pairs. For example, the apparatus 200 may continue to determine another near-midpoint open index pair for the next qubit pair of a qubit pairing set. In some embodiments, the apparatus selects qubit pair 306B next as all remaining qubit pairs have the same position distance and, in some such embodiments, the apparatus 200 may proceed in ascending order for the qubits of the qubit set.

FIG. 12, for example, depicts an example visualization for identifying the target qubit position set 404 for the qubit set 304 in accordance with at least one example embodiment of the present disclosure, for example based on the qubit pairing set as depicted and described with respect to FIG. 3. It should be appreciated that each iteration of the process depicted with respect to FIG. 11 may result in another assignment of target position indices in the target qubit position set 404, as depicted with respect to FIG. 12. The qubit pair 306B includes qubit 1 and qubit 2, which are associated with initial position indices "1" and "2" that are already adjacent. However, the target position index "2" is already assigned as described. Accordingly, the apparatus 200 may attempt to shift the indices to lower and/or higher indices, while minimizing the required distances the qubits are required to move. In this regard, the apparatus 200 may determine the lower indices "0" and "1" remain unassigned, and thus may proceed to assign such indices as target position indices for the qubit pair 306B.

Similarly, for qubit pair 306C, the qubits of the qubit pair are assigned initial qubit position indices having the value "3" and "4," and the apparatus 200 may determine such qubits are already adjacent (e.g., having a position distance of "1"). The apparatus 200 may attempt to position the qubits at a near-midpoint open index pair starting at the nearest unassigned even index, for example at "2" and "3." However, the apparatus 200 subsequently may determine that such indices have already been assigned, for example by searching for such indices in the target qubit position set and identifying such indices are already associated with qubits 0 and 7 (e.g., qubit pair 306A). The apparatus 200 may subsequently attempt to shift the near-midpoint open index pair to higher indices, for example having the values "4" and "5," and determine that such indices remain unassigned.

Accordingly, the apparatus 200 may subsequently assign, in the target qubit position set, the first target position index having the value "4" to the qubit 3, and the second target qubit position index having the value "5" to the qubit 4, based on at least the near-midpoint open index pair and the assigned indices in the target qubit position set. Similar actions may be performed for the qubit pair 306D, with respect to indices "4" and "5" (as lower indices to the initial position indices for qubits 5 and 6) already being assigned. Accordingly, the apparatus 200 may subsequently assign, in the target qubit position set, the first target position index having the value "6" to the qubit 5, and the second target qubit position index having the value "7" to the qubit 6, based on at least the near-midpoint open index pair. Having completed assigning target position indices within the target qubit position set, the apparatus 200 may continue to process the target qubit position set as described.

Example Alternative Processes for Target Qubit Position Assignment

Some embodiments implement one or more alternative process(es) for assigning target positions, for example embodied in a target qubit position set. In this regard, utilizing near-midpoint open index pairs may be utilized in whole or in part in some embodiments. In other embodiments, one or more alternative algorithms are implemented to identify and/or otherwise generate the target qubit position set. Non-limiting examples of such alternative embodiments are described with respect to the remaining FIGS. 13-25. In some embodiments, the apparatus 200 is configured to perform the various operations of the processes described herein with respect to such remaining figures.

In some embodiments, target assignment is performed based on two equally sized subsets of an equal bipartition of a complete set of positions. In this regard, the complete set may include elements of a first subset and elements of a second subset, where the number of elements in each subset is equivalent, the two subsets are disjoint, and the union of the two subsets is the complete set. Elements of a given starting positions pairing set (e.g., representing elements to be gated at a particular time slice) may be paired from each of the bipartition subsets, such that a first element of a given starting positions pair from the starting positions pairing set exists from the first bipartition subset and a second element of the given starting positions pair from the starting positions pairing set exists from the second bipartition subset. For example, the first position may exist in the first bipartition subset and the second position may exist in the second bipartition subset. One such example of equally-sized subsets of a bipartition comprises a first subset containing the first positions all start position pairs and the second subset containing the second positions of all start position pairs. The two subsets of the bipartition may further meet an adjacency requirement. In this regard, pairs of adjacent positions form slots (i.e. slot s in [0, N/2) contains adjacent positions $\{2*s, 2*s+1\}$) and may have one position of the slot in the first subset and the other position of the slot in the second subset. One such example of equally-sized subsets of a bipartition of a complete set meeting an adjacency requirement comprises partitioning a set of positions into an even set of positions and an odd set of positions, where each starting position pair comprises an even position and an odd position. It should be appreciated that any of a myriad of alternative algorithms for partitioning a complete set of positions into two equally-sized subsets with or without meeting an adjacency requirement based on a particular classification, characteristic, or other determination may be performed to generate the equally-sized subsets of a bipartition of the complete set. It should be appreciated that, in some embodiments, any valid mapping from first positions in the first bi-partitioned subset to any unique second position in the second bi-partitioned subset is valid. In other embodiments, mappings are considered valid only in instances where an adjacency requirement is also met, requiring each position in the first bi-partitioned subset to have at least one adjacent position in the second bi-partitioned subset.

A vector of target slot assignments (target_slots vector) for such bipartition subsets may then be generated. In some embodiments, each position in one of the subsets (e.g., the first bipartition subset or the second bipartition subset) is assigned a fixed slot of an available slot set. The target_slots vector may subsequently be assigned the slot corresponding to the other position in the second bipartition subset. The target_slots vector may subsequently be sorted to attain parity between the slot value for each position in the second subset of the bipartition with the corresponding slot for the first position in the first subset of the bipartition. Example embodiments are provided herein that bipartition the starting positions into a first subset comprising even positions and a second subset comprising odd positions having slots formed out of a pair of adjacent positions, one from the even subset and one from the odd subset. It should be appreciated, however, that such other methodologies of partitioning a set of positions into equally sized subsets may be utilized and do not deviate from the scope and spirit of this disclosure.

FIG. 13 depicts example data associated with manipulation of an example quantum computing environment in accordance with at least one example embodiment of the present disclosure. The example data depicted in FIG. 13 is processed in the example implementations depicted in the subsequent FIGS. 14, 15A, 15B, 16A, and 16B. As depicted, an example qubit set 1302 is processed for purposes of explanation and understanding. The example qubit set 1302 comprises a qubit count ("Q") of 12 qubits. In this regard, the qubit set 1302 comprises qubits indexed 0 through 11, representing the 12 total qubits. The qubit set 1302 may correspond to a position set that comprises positions indexed by the integer range [0, 1, . . . Q−1], which corresponds to 12 positions wherein the qubits of the qubit set 1302 may be arranged. It should be appreciated, as described herein, that the qubit set 1302 is exemplary and in other embodiments the qubit set 1302 may include any number of qubits.

FIG. 13 further depicts an example positions vector 1304. The positions vector comprises 12 positions, which matches the number of qubits in the qubit set 1302. In this regard, each qubit from the qubit set 1302 may be positioned at any one of the position indices depicted as part of the position vector 1304. For example, in some embodiments at a first time slice, each qubit may be located at the position corresponding to the qubits depicted numerical index (e.g., qubit 1 at position 1, qubit 2 at position 2, qubit 3 at position 3, and so on). As time slices are processed, qubits may be repositioned throughout the various positions of the position set 1304. In this regard, the position vector 1304 may represent a current vector representing the positions of each qubit in the qubit set 1302 as such qubits are processed for a particular time slice.

FIG. 13 further depicts an example even-odd starting positions pairing set 1306 based on starting positions for the various qubits of the qubit set 1302. In some example contexts, the even-odd starting positions pairing set 1306 comprises several position pairs embodying pairs between the current positions indices for particular qubits to be gated at the particular time slice to be processed. The position pairs are subject to at least one constraint requiring the two elements of each position pair be in different subsets of the two equally-sized subsets of a bipartition of the set of all positions, for example the bipartition into even and odd positions. In the example depicted, such bipartitioning imposes an even-odd constraint, such that the even-odd starting positions pairing set 1306 results in an even-odd starting positions pairing set that includes each even-odd pair of two starting positions to be gated at the next time slice. In this regard, each even-odd position pair in the even-odd starting positions pairing set 1306 comprises an even starting position index paired with an odd starting position index, such that the even-odd constraint is satisfied for each position pair of qubits. In other contexts, the even-odd starting positions pairing set 1306 may not satisfy the even-odd constraint, for example where the starting positions pairing set 1306 includes one or more even-even position pairs comprising a first even position index paired with a second even position index, or where the even-odd starting positions pairing set 1306 includes one or more odd-odd position pair comprising a first odd position index paired with a second odd position index. In some such circumstances, a qubit pairing set comprising at least one even-even position pair or at least one odd-odd position pair may be converted to including all even-odd position pairs that satisfy the even-odd constraint. The conversion to a positions pairing set that satisfies the even-odd constraint may be performed utilizing one or more pairing set conversion algorithms as described herein, for example as described herein with respect to FIGS. 17A, 17B, and 18-25.

FIG. 14 depicts an example algorithmic transformation for determining a slot corresponding to each position of a position set. As depicted, FIG. 14 includes determinations of the slots assigned to each of the positions in the position set 1402. The position set 1402 includes twelve total positions indexed from the integer range [0, 12) (e.g., where the integer range [X, Y) embodies the integer set {X, X+1, . . . , Y−1}, such as {0, 1, . . . , N−1}). In this regard, the positions may correspond to the available positions described with respect to the example computing environment of FIG. 13.

Each position in the position set 1402 to a corresponding slot based on a particular slot determination algorithm. As depicted, the slot determination algorithm comprises integer division by two, such that a slot ("s") is defined by p//2, where p//2 represents integer division (e.g., discarding remainder) of the position ("p") by 2. In this regard, the position index 0 maps to slot index 0, as 0//2=0, and position index 1 similarly maps to slot index 0, as 1//2=0. Similarly, position index 2 maps to slot index 1, as 2//2=1, and position index 3 similarly maps to slot index 1, as 3//2=1. Such slot assignments continue for the remaining positions, such that each even position 2n is mapped to a slot similarly mapped to the subsequent odd position 2n+1. In this regard, adjacent pairs of indices are mapped to the same, shared slot. Qubit indices and/or position indices for such qubits may be assigned to a particular slot index, and such slot indices similarly permutated as described herein for purposes of target position assignment as described herein, for example with respect to FIGS. 15-16. The resulting target assignment yields all start positions pairs in the various slots such that each start position pair becomes adjacent and thus may be gated.

FIG. 15A depicts an example visualization of an example process for target assignment of start position pairs by determining a target positions vector for a particular time slice. The example process may be performed in accordance with any of the embodiments described herein. For example, in some embodiments, the apparatus 200 is configured to perform the operations of the described process in advance of generating an algorithm swap command set as described herein, for example as described herein with respect to FIGS. 5-11.

The example processes described for target assignment described with respect to FIGS. 15A, 15B, 16A, and 16B rely on one or more underlying assumptions. For example, example processes described for target assignment described with respect to FIGS. 15A, 15B, 16A, and 16B rely on the underlying assumption that the starting positions pairing set to be processed is even. Additionally or alternatively for example, the example processes described for target assignment described with respect to FIGS. 15A, 15B, 16A, and 16B rely on the underlying assumption that the starting positions pairing set to be processed is full in that it includes all positions. Additionally or alternatively for example, the example processes described for target assignment described with respect to FIGS. 15A, 15B, 16A, and 16B rely on the underlying assumption that the starting positions pairing set embodies an even-odd starting positions pairing set (e.g., only comprising eo-pairs). Some embodiments may perform one or more processes to check whether a starting positions pairing set meets each underlying assumption before initiating processing of the starting positions pairing set via the processes described with respect to FIGS. 15A, 15B, 16A, and 16B. In some embodiments, in circumstances where the embodiment (e.g., the apparatus 200) determines that one or more of the underlying assumptions is not met, the embodiment may initiate one or more pre-processing algorithms to update the starting positions pairing set to satisfy each of the underlying assumptions. Non-limiting examples of pre-processing algorithms for updating the starting positions pairing set to satisfy these underlying assumptions are described in the next section and with respect to FIGS. 17A, 17B, 18A, 18B, and 19-25.

The target positions vector is derived from a starting positions pairing set, for example which may be determined from a qubit pairing set derived for the particular time slice and the current positions of such qubits at the beginning of the particular time slice. In this regard, the starting positions pairing set may represent pairs of the current position indices at the beginning of the time slots comprising qubits that are to be gated during the particular time slice. In this regard, embodiments of the present disclosure process the starting positions pairing set to generate target positions that locate the qubits, such that each first qubit is relocated from its starting positions to new positions adjacent to a corresponding position including a second qubit with which the first qubit is paired for gating.

The example process is performed for a start positions pairing set that includes all positions in [0, N), where N is the number of starting positions, and N is even. The example process is further performed for a start positions pairing set where each position pair satisfies an even-odd constraint. For example, the even-odd starting positions pairing set 1302 may represent the positions pairing set for the next time slice to be processed, and it satisfies both the assumptions that the all positions are accounted for (e.g., [0, N) where N is 12), N is even, and all position pairs are eo-pairs. As depicted, the even-odd start positions pairing set 1302 comprises a full even-odd start positions pairing set sorted in increasing order of the even start position for each pair, with each even start position being the first start position in the pair, such that the resulting even-odd start positions pairing set 1302 has the form $\{(0, o_0), (2, o_1), (4, o_2), \ldots, (N-2, o_{N/2-1})\}$, where the $o_k$ is the odd start position paired with even position 2k for k in the range [0, N/2). In some contexts where one or more of these assumptions is not met, for example the start positions pairing set includes an ee-pair or an oo-pair, the start positions pairing set may be pre-processed to meet such assumptions before the described process to determine the target positions vector for the particular time slice begins, as described herein.

The example process for determining a target positions vector for a particular time slice is analogous to a problem of target assignment utilizing two rows. The even positions reside in a lower row (e.g., a second row), and the odd positions reside in the upper row (e.g., a first row). The rows are manipulated with the target goal of finding a common target column for each start position pair in the even-odd start positions pairing set 1302. To accomplish this goal, either row may be fixed and the other may be manipulated to be in the same column as the corresponding paired even start position in the fixed row. For example purposes, FIG. 15 is depicted and described from the perspective of keeping the even start positions fixed in the lower row and manipulating the odd start positions in the upper row. It should be appreciated that the process may similarly be performed by setting the odd positions as fixed and manipulating the even positions.

Each odd start position, $o_k$, is assigned to column k of N/2 columns in the upper row. Next, even-odd transposition sort is performed on the upper row to generate a parallel swap command set for the upper row. The generated parallel swap command set permutes the upper row such that all odd starting positions reside in the same column as their fixed even-paired counterpart in the lower row. As a factor of utilizing even-odd transposition sort, such operations may be completed within N/2 parallel swap commands for the N/2 positions within the row.

Once the qubits are permuted such that the qubit pairs are in a common column across the two rows, performing the same swap operations to both rows will maintain the common-column-property, thus satisfying the constraint that the qubit pair remains in a common-column with the qubit in its fixed pair position. Reversal of the swap commands applied to the upper row, for example, simply undoes its permutation by causing the upper row to move backwards along the path it followed (e.g., towards its starting position), while application of said swap commands to the lower row as well will cause the lower row to move in the same manner to maintain the common-column-property. In this regard, starting from the beginning (e.g., without sorted position assignments), an implementation may apply the first half of the parallel swap commands on the upper row and the second half of the parallel swap commands in reverse on the lower row to cause the qubit pairs to arrive at the same target column in no more than (N//2+1)//2 parallel swap commands. As such, by assigning target positions to the upper row based on the lower row starting positions, performing even-odd transposition sort on the upper row targets vector, and finding the location of the targets vector values at the mid-point of the sort, the mid-point locations may be used as the target positions for both the upper and lower rows to reduce the total number of parallel swap commands utilized to position the qubits for gating.

The operations depicted and described perform an analogous process on a linear array of positions by treating the even positions as the lower row and the odd positions as the upper row. Embodiments construct a targets vector comprising slots of length N/2, which may be referred to as a "target_slots" vector indexed by slot "s." Each slot "s" is associated with an adjacent pair of positions {2s, 2s+1}, with the lower position 2s representing the even position of an even-odd starting position pair. Given a position p, the corresponding slot may be determined by a slot determination algorithm, for example the slot determination algorithm 1404 where s=p//2 as depicted and described with respect to FIG. 14.

Some such embodiments initialize the vector "target_slots" such that:

target_slots[$o_s$//2]=s for all s in the range [0, N/2).

Utilizing this initialization, each odd start position is assigned the slot where its paired even start position resides. Thus, the resulting target_slots vector is initialized in a manner that pairs the various positions identified in the corresponding even-odd starting positions pairing set by positioning the odd position to the slot of its fixed even counterpart for the time slice being processed.

Such embodiments further perform even-odd transposition sort on the target_slots vector to generate a parallel swap command sequence of length M, where M<=N/2. The parallel swap command sequence is embodied by a parallel swap command set that represents each swap performed in executing the even-odd transposition sort. It should be appreciated that the parallel swap command set representing the swap commands for sorting the target_slots vector may be embodied in any of a myriad of manners indicating performed left swaps and/or right swaps, as described herein.

The resulting target_slots vector may be utilized to generate a new vector "target_slots_mid," which represents the location of each position at the mid-point for completion of the even-odd transposition sort. In this regard, embodiments may apply the first (M+1)//2 parallel swap commands to the target_slots vector to generate the target_slots_mid vector, where target_slots_mid[$o_s$//2] is the slot where odd start position $o_s$ resides at the mid-point of the even-odd transposition sort. Embodiments then assign the pair of sorted start positions, for example represented by the vector resulting from sorted((2s, $o_s$)), to the pair of target positions (2*target_slots_mid[$o_s$//2], 2*target_slots_mid[$o_s$//2]+1). Such assignment represents the slot where the odd position would reside if the odd positions were sorted alone. Next, embodiments perform even-odd transposition sort on the targets vector representing the target qubits pairing set for all positions to generate the steps to sort the qubits to their proper positions for purposes of processing the particular time slice.

The target_slots vector may be sorted starting from either the even phase or the odd phase as the first phase for purposes of determining the targets vector for use in determining the parallel swap command set. It should be appreciated that, in some embodiments, even-odd transposition sorts are performed utilizing each of the even phase and the odd phase as the start phase. The targets vector generated from sorting the target_slots vector beginning with the even phase may differ from the targets vector generated from sorting the target_slots vector beginning with the odd phase. However, one of the resulting targets vectors may be computationally more efficient than the other in implementation via the one-dimensional quantum computing environment (e.g., when sorted in the manner described herein as a target qubits position set for instruction compilation via a subsequent even-odd transposition sort). In this regard, embodiments may execute a first subsequent even-odd transposition sort on the first targets vector generated from a first target_slots_mid vector in phase with a first phase of sort (e.g., associated with beginning with the even sort phase), and a first number of steps in the first resulting algorithm swap command set determined. Similarly, embodiments may execute a second subsequent even-odd transposition sort on the second targets vector generated from a second target_slots_mid vector in phase with a second phase of sort (e.g., associated with beginning with the odd sort phase), and a second number of steps in the second resulting algorithm swap command set determined. The number of steps associated with each of the resulting algorithm swap commands sets (e.g., corresponding to beginning sorting the target_slots vector in different phases of sort) may be compared to determine which contains fewer steps. Embodiments may select the resulting targets vector with the fewest steps to sort to reduce the computational resources required to perform the sort the qubits in the one-dimensional quantum computing environment, as the expenditure of conventional computing resources to generate efficient swap algorithms is preferred as less time consuming, costly, and error prone than expenditure of quantum computing resources in the one-dimensional quantum computing environment.

As illustrated in FIG. 15A, the described algorithm described is performed for the example even-odd starting positions pairing set 1302 as depicted and described herein. The even positions are assigned to slots in the lower row, represented by the even slots vector 1502. The even slots vector 1502 corresponds to the six slots depicted and described with respect to the slot vector 1406, which correspond to the 12 positions of the one-dimensional quantum computing environment depicted and described with respect to FIGS. 13 and 14. For purposes of understanding, a vector of even positions 1506 is depicted that corresponds to the even slots vector 1502.

Embodiments initialize the target_slots vector to a starting configuration 1504A. The odd positions are assigned a slot from the slots vector 1406, for example based on the slot determination algorithm s=p//2, to generate the start configuration of the target_slots vector for the upper row associated with the odd positions. The resulting start configuration is then utilized to begin the even-odd transposition sort of the target_slots vector, for example at the even phase as depicted. For purposes of understanding, a vector of starting configuration positions 1508A is depicted that represents the start configuration of the slot allocations in the target_slots vector 1504A. Similarly, for purposes of understanding, each of the steps of the even-odd transposition sort performed for the target_slots vector are depicted in steps 1504B-1504E, and the corresponding steps of the even-odd transposition sort for the positions corresponding to such slots are depicted in 1508B-1508E.

The embodiments permute the target_slots vector utilizing even-odd transposition sort. As depicted, the target_slots vector is fully sorted in 4 steps. At step 1504B, the target_slots vector is swapped based on the even phase to swap the slots assigned to targets_vector at indices 2 and 3, and to swap indices 4 and 5. As described, such indices are swapped as the higher-order index includes a first value lower than the second value at the lower-order index. The embodiments continue the even-odd transposition sort at an odd phase at step 1504C, where indices 1 and 2 of the target_slots vector are swapped, and indices 3 and 4 of the target_slots vector are swapped. The embodiments then continue the even-odd transposition sort at another even phase at step 1504D, where indices 0 and 1 of the target_slots vector are swapped, and indices 2 and 3 of the target_slots vector are swapped. The algorithm then completes at the next odd phase at step 1504E, where indices 1 and 2 of the target_slots vector are swapped, and indices 3 and 4 of the target_slots vector are swapped, thus resulting in the fully sorted target_slots vector. The fully sorted target_slots vector depicted at step 1504E is arranged such that the common-column property applies to each slot of the target_slots vector for each qubit pair in the even-odd starting positions pairing set 1302. The embodiments may generate a swap command set representing the swap commands resulting from the operations of the even-odd transposition sort.

In this regard, the value of target_slots[s] before sorting commenced represents the destination of slot s (e.g., the odd position represented by slot s in embodiments where the even positions are fixed) to bring it to the slot occupied by its even position counterpart designated in the even-odd starting positions pairing set 1302. Similarly, upon completion of the even-odd transposition sort for sorting the target_slots vector based on permuting the odd positions, the resulting swap command set may be applied in reverse order to the even positions to bring the qubits residing at the even positions to the slot where the corresponding paired odd position originally was located. In this regard, the mid-point step of the even-odd transposition sort may be identified to generate the target_slots_mid vector by applying only the first $(M+1)//2$ parallel swap commands, where M is the length of the parallel swap command sequence generated based on the completed even-odd transposition sort. The mid-point step in FIG. 15 comprises step 1504C, as indicated by the asterisk (*), which corresponds to the target_slots_mid vector having the values of [2, 0, 4, 1, 3, 5]. This target_slots_mid vector corresponds to the positions at the mid-point step indicated by 1508C, and the corresponding even positions corresponds to the positions indicated by the corresponding slot in the even positions vector 1506. The target_slots_mid vector associated with the mid-points step may then be utilized to generate the final targets vector for all positions by assigning the pair of start positions sorted $((2s, o_s))$ to the pair of target positions (2*target_slots_mid$[o_s//2]$, 2*target_slots_mid$[o_s//2]$+1) represented by the slot where the odd position would reside if the odd positions were sorted alone.

As illustrated, the even-odd transposition sort is similarly performed associated with the even-odd starting positions pairing set 1302, the slot vector 1406, and the even slots vector 1502 depicted in FIG. 16A. As such, the starting configuration 1504A and the even slots vector 1502 remain the same for purposes of beginning the even-odd transposition sort. The first step, however, begins with an odd phase at step 1604B of the even-odd transposition sort.

As depicted in FIG. 16A, the target_slots vector is fully sorted in 5 steps when beginning at the odd phase. At step 1604B, the target_slots vector is swapped based on the odd phase to swap the slots assigned to targets_vector at indices 1 and 2, resulting in the updated targets_vector [2, 3, 4, 0, 5, 1]. As described, such indices are swapped as the higher-order index includes a first value lower than the second value at the lower-order index. The embodiments continue the even-odd transposition sort at an even phase at step 1604C, where indices 2 and 3 of the target_slots vector are swapped, and indices 4 and 5 of the target_slots vector are swapped, resulting in the updated targets_vector [2, 3, 0, 4, 1, 5]. The embodiments then continue the even-odd transposition sort at another odd phase at step 1604D, where indices 1 and 2 of the target_slots vector are swapped, and indices 3 and 4 of the target_slots vector are swapped, resulting in the target_slots vector [2, 0, 3, 1, 4, 5]. The embodiments then continue the even-odd transposition sort at another even phase at step 1604E, where indices 0 and 1 of the target_slots vector are swapped, and indices 2 and 3 of the target_slots vector are swapped, resulting in the updated target_slots vector [0, 2, 1, 3, 4, 5]. The algorithm then completes at the next odd phase at step 1604F, where indices 1 and 2 of the target_slots vector are swapped, resulting in the fully sorted target_slots vector.

FIG. 15B depicts an example generation of the targets vector corresponding to the target_slots_mid vector resulting from the operations depicted and described with respect to FIG. 15A. The slots vector 1406 is vertically aligned with the corresponding indices of the even slots vector 1502 and targets_slots_mid vector 1552 for purposes of description. Further as depicted, the targets vector 1554 is generated from the target_slots_mid vector 1552, which embodies the current values of the target_slots vector at the mid-point step 1504C in FIG. 15A. For purposes of explanation and understanding, target assignment is described sequentially based on the order of the slot indices at each index of the target_slots_mid vector 1552. It should be appreciated that in some implementations, target assignment is performed sequentially in any order, in parallel, simultaneously, and/or the like.

At index 0 the target_slots_mid vector 1552 refers to slot 2 of the corresponding position pairs (e.g., target_slots_mid[0]==2). The position pair destined for the second slot can be identified from the even-odd starting positions pairing set 1302 can be identified, such as via lookup or calculation. For example, since we have left the even indices fixed, embodiments may identify the pair comprising the even position corresponding to identified slot 2 as the pair (4, 1), because slot s==2 maps to even position 2s==4. Some such embodiments may perform one or more lookups to determine even position 2s==4 resides in the start position pair (4, 1). Accordingly, the targets vector indices at 4 and 1 will be assigned the values for the positions corresponding to slot 0 (e.g., positions 0 and 1). In some embodiments, as described herein, the order of the pair is not restrictive, such that the pair (4, 1) is equivalent to the pair (1, 4). Such flexibility enables the target positions corresponding to slot 0 (e.g., positions 0 and 1) to be assigned in either order to the corresponding indices 1 and 4. To reduce the worst-case scenario of the number of swaps to be performed in the subsequent even-odd transposition sort of the targets vector 1554, the lower index of the pair (4, 1) in the targets vector is assigned corresponding to the lower indexed position corresponding to slot 0, and the higher index of the pair (4, 1) is assigned the higher index of the position corresponding to slot 0. For example in the embodiment depicted, the targets vector at index 1 is assigned the lower position of slot 0 (e.g., targets[1]=0), and the targets vector at index 4 is assigned the higher position of slot 0 (e.g., targets[4]=1).

This process is similarly performed for each index of the target_slots_mid vector 1552 to complete the target assignment in the targets vector 1554 resulting therefrom. For example, at index 1 the target_slots_mid vector 1552 refers to slot 0 of the corresponding position pairs (e.g., target_slots_mid[1]==0), which corresponds to the position pair (0, 7). The indices 0 and 7 of the targets vector 1554 are assigned the values of the positions corresponding to slot 1 such that the lower index of the position pair is assigned the lower position represented by slot 1. Accordingly, as slot 1 indexes positions 2 and 3, the lower targets index 0 is assigned the value 2 (e.g., targets[0]=2) and the higher targets index 7 is assigned the value 3 (e.g., targets[7]=3).

For purposes of brevity, subsequent assignment for slots 2, 3, 4, and 5 follow the same operations, and thus repeated description is omitted.

In some embodiments, the even-odd transposition sort of the target_slots vector is performed starting at both the even phase and the odd phase to determine which of the starting phases leads to completion of the even-odd transposition sort in fewer steps. FIG. 16A depicts steps for performing even-odd transposition sort of the example even-odd starting positions pairing set starting from an odd phase, in accordance with at least one example embodiments of the present disclosure. The even-odd transposition sort is performed similar to the manner described herein, instead starting with swapping pairs with a lower odd index. The steps 1602B-1602F are performed, resulting in a second mid-point vector generated at the third step 1604C of [2, 0, 3, 1, 4, 5]. As depicted, the target_slots_mid vector resulting from the even-odd transposition sort beginning at the odd phase in FIG. 15B differs from the target_slots_mid vector resulting from the even-odd transposition sort beginning at the even phase in FIG. 15A.

It should be appreciated that the different target_slots_mid vector resulting from the even-odd transposition sort beginning in the odd phase similarly results in a different targets vector embodying a target qubit position set for further processing. For example, FIG. 16B depicts an example visualization of target assignment of the target_slots_mid vector generated at the mid-point step of the even-odd transposition sort beginning at the odd phase as depicted and described in FIG. 16A.

As depicted in FIG. 16B, the target_slots_mid vector 1652 results at the mid-point step of the even-odd transposition sort of the target_slots vector as depicted and described with respect to FIG. 16A. The target_slots_mid-point vector 1652 begins in the same manner as the target_slots_midpoint vector 1552 depicted and described with respect to FIG. 15A, with both target_slots_midpoint vectors referring to slot 2 at index 0 and referring to slot 0 at index 1. Accordingly, both targets vector 1554 and targets vector 1654 are assigned positions 0, 1, 2, and 3 at the same indices. However, the target_slots_midpoint vector 1552 differs from the target_slots_midpoint vector 1652 at index 2, as target_slots_midpoint vector 1552 refers to slot 4 and target_slots_midpoint vector 1652 refers to slot 3. Accordingly, as depicted in FIG. 15B, the indices of the targets vector 1554 assigned target positions 4 and 5 (which correspond to slot 2) are the indices of the positions in the pair (8, 3), which corresponds to slot 4 referred to in target_slots_mid vector 1552 at index 2. Specifically, the lower index of the pair is assigned the lower position corresponding to slot 2, thus targets vector index 3 is assigned 4 and targets vector index 8 is assigned 5. Alternatively, as depicted in FIG. 16B, the indices of the targets vector 1654 assigned target positions 4 and 5 are the indices of the positions in the pair (6, 5), which corresponds to slot 3 referred to in target_slots_mid vector 1652 at index 2. Specifically, the lower index of the pair is assigned the lower position corresponding to slot 2, thus targets vector index 5 is assigned 4 and targets vector index 6 is assigned 5. In this regard, the resulting targets vector 1654 that corresponds to the odd phase differs from the resulting targets vector 1554 that corresponds to the even phase.

Such target vectors may similarly take a different number of steps to sort via even-odd transposition sort. Thus, embodiments of the present disclosure may perform a subsequent even-odd transposition sort on each of the targets vector 1554 and the targets vector 1654 and the corresponding algorithm swap command sets for each determined, with each new phase of sort in the algorithm swap command set representing a step for purposes of comparison. Such embodiments may subsequently compare the number of steps required to sort each of the targets vector, and select the targets vector corresponding to the lesser number of steps to sort as the target qubits position set for further processing, for example as described with respect to FIGS. 3-11. The lesser steps to sort is selected to reduce the required time and amount of quantum computing resources expended to perform the swaps required to position the qubits from their initial positions to their target positions.

Embodiments may perform even-odd transposition sort of the target_slots vector starting from the odd phase upon completion of the even-odd transposition sort starting from the even phase described with respect to FIGS. 15A and 15B. Alternatively or additionally, in some embodiments, even-odd transposition sort starting with the odd phase is performed first, and subsequently the even-odd transposition sort starting with the even phase is performed as described with respect to FIGS. 15A and 15B.

Embodiments may compare the number of steps for the even-odd transposition sort beginning with the even phase to the number of steps for the even-odd transposition sort beginning with the odd phase. The implementation that resulted in the fewer number of steps may be selected, and the target_slots_mid vector for the selected implementation may be determined and/or further processed as described herein. In the example depicted, the sort beginning with an even phase resulted in 4 steps to fully sort the target_slots vector, whereas the sort beginning with an even phase resulted in 5 steps to fully sort the target_slots vector. In this example context, such embodiments select the even-odd transposition sort beginning at the even phase for further processing, and thus will determine the target_slots_mid vector based on the swap commands generated from performing the even-odd transposition sort beginning with the even phase. In circumstances where the even-odd transposition sort resulted in lesser steps (e.g., where beginning with the even phase resulted in 6 steps, for example based on a different even-odd starting positions pairing set), the target_slots_mid vector would be determined from the midpoint step represented by step 1604D of the even-odd transposition sort beginning with the odd phase as depicted in FIG. 16. The target_slots_mid vector determined from the selected implementation of the even-odd transposition sort may then be utilized to determine the targets vector corresponding to the final target positions for each starting position as described herein with respect to FIG. 15, and subsequently processed as the target qubit positions set as described herein with respect to FIGS. 5-11. Selecting the implementation that corresponds to the fewer number of steps minimizes the amount of computational resources needed to complete the swapping of qubits to their target positions in the one-dimensional quantum computing environment.

Example Operations for Pre-Processing a Starting Position Pairing Set for Target Assignment As described herein, a starting position pairing set may satisfy various underlying assumptions before being processed for target assignment in a target qubit position set. It should be appreciated that such underlying assumptions each embody a constraint that must be met before further target assignment can be performed for a particular starting positions set. In this regard, the apparatus 200, for example, may retrieve, receive, or otherwise identify a starting positions set and perform one or more checks for such assumptions and/or initiate pre-processing to ensure such assumptions are met in serial or in parallel with checks and/or pre-processing for other assumptions.

In some embodiments, the starting positions pairing set to be processed for target assignment is subject to an evenness constraint requiring the number of positions in the starting positions pairing set to be even. In some such embodiments, the starting positions pairing set is processed to convert the set to include an even number of positions. In a circumstance where the original starting positions pairing set comprises an odd number of positions, such embodiments generate a new arbitrary position acting as a vacancy position. The new, arbitrary position may be sorted in the same manner with other positions, and the resulting targets vector would have an assignment to the vacancy and provide the vacancy position as an available target for other starting positions or itself. In some embodiments, the new arbitrary position is appended to the list of available positions. In other embodiments, the new arbitrary position is prepended to the list of available positions, and the list of positions shifted to have minimum index 0. In yet other embodiments, the new arbitrary position is inserted in the middle of the list of available starting positions with the portion of the starting positions right of insert shifted such that the list of starting positions occupies the index range [0, N) where N is even. In some embodiments, the targets vector may remove the new arbitrary position associated with a vacancy to generate a targets vector valid for an odd set of positions. In other embodiments, the targets vector may accept the vacancy as-is without removal. Any and all combinations generated and/or otherwise performed by such embodiments result in an updated starting positions pairing set that is a valid representation of overcoming the evenness constraint on the total number of positions.

In some embodiments, the starting positions pairing set to be processed for target assignment is subject to a fullness constraint requiring the pairs to include all positions in a set of available positions. The fullness constraint further requires evenness as described above, and thus a starting positions pairing set may be processed to address the evenness constraint before addressing the fullness constraint. In some embodiments, an unused positions set is identified from the starting positions pairing set that includes all positions not represented in the starting positions pairing set. The unused positions set is sorted such that the positions therein are ordered. The unused positions are subsequently paired in sorted order (e.g., such that the first unused position at index zero of the sorted unused positions is paired with the second unused position at index 1 of the sorted unused positions, the third unused position at index 2 of the sorted unused positions is paired with the fourth unused position at index 3 of the sorted unused positions, and so on) to generate a new positions pair set based on the ordered unused positions. The new positions pair set comprises position pairs utilizing the unused positions that ensures the required travel distance of each position pair is minimized. The new position pairs set is added to the original starting positions pairing set to generate an updated starting positions pairing set, and the updated starting positions pairing set is subsequently processed irrespective of which pairs were previously considered unused.

In some embodiments, the starting positions pairing set may similarly be pre-processed to ensure that an even-odd only constraint requiring only even-odd position pairs exist in the starting positions pairing set is satisfied. In this regard, some embodiments (for example the apparatus 200) initiate such pre-processing operations in response to determining a starting positions pairing set includes at least one ee-pair and/or oo-pair. FIGS. 17A, 17B, and 18-25 depict example data and operations for associated with pre-processing a starting positions pairing set to satisfy an even-odd only constraint. The even-odd only constraint may rely on underlying assumptions embodied by the evenness and fullness constraints described herein. Thus, a starting positions pairing set not satisfying both of such constraints may be further pre-processed to ensure such constraints are met before further pre-processing to satisfy the even-odd only constraint.

FIG. 17A depicts an example process to partition a positions pairing set (e.g., a starting positions pairing set) for conversion to an even-odd positions pairing set (e.g., an even-odd starting positions pairing set), in accordance with at least one example embodiments of the present disclosure. An example starting positions pairing set 1752 is depicted. The example starting positions pairing set 1752 satisfies other underlying assumptions (e.g., is full and even), however it includes multiple ee-pairs and oo-pairs.

In some embodiments, for example the apparatus 200, the starting positions pairing set 1752 is partitioned into an ee-pair set 1754A, an oo-pair set 1754B, and an eo-pair set 1754C. Such embodiments generate the ee-pair set 1754A comprising only the ee-pairs partitioned from the starting positions pairing set 1752. Similarly, such embodiments generate the oo-pair set 1754B comprising only the oo-pairs partitioned from the starting positions pairing set 1752. Similarly, such embodiments generate the eo-pair set 1754C comprising only the eo-pairs partitioned from the starting positions pairing set 1752. Some embodiments perform a check for each positions pair in the starting positions pairing set 1752 of each position in the pair to determine whether the positions pair embodies an ee-pair, an oo-pair, or an eo-pair. Such embodiments partition the positions pair in the proper set of the ee-pair set 1754A, oo-pair set 1754B, or eo-pair set 1754C accordingly based on the results of the check (e.g., ee-pairs in the ee-pair set 1754A, and the like). Upon performing such partitioning for each pair in the starting positions pairing set 1752, the ee-pairs set 1754A, oo-pairs set 1754B, and eo-pairs set 1754C comprise all positions pairs to be further processed. It should be appreciated that the starting positions pair set 1752 satisfying other underlying assumptions, such as fullness and evenness constraints, will include the same number of ee-pairs and oo-pairs, such that the ee-pair set 1754A and the oo-pair set 1754B will include the same number of position pairs therein.

Each ee-pair has a path to an oo-pair formed out of adjacent oe-pairs, where the sequence of oe-pairs to reach the oo-pair may have zero length. In general, this path has the form 1756, which may include any number of adjacent eo-pairs from ee-pair to oo-pair. In the depicted format, the second element of each pair is even and is adjacent to the first element of the successive pair. The ee-pair may be adjacent to the oo-pair directly, and in this case the sequence of oe-pairs has zero length. An example path with oe-pairs is (2, 6)→(7, 24)→(25, 4)→(5, 12)→(13, 10)→(11, 3). In this example, the first pair (2, 6) is an ee-pair; the second element of the first pair (6) is even and adjacent to the first element of the second pair (7), which is odd. Continuing, the second element (24) of the pair (7, 24) is adjacent to the first element 25 of the successive pair (25, 4), and the second element of (4) of the pair (25, 4) is adjacent to the first element (5) of the successive pair (5, 12), and so on. The last pair (3, 11) is an oo-pair, and thus swapping with an even position from the preceding pair results in a new oe-pair. In this regard, performing parallel swap of the second element of every pair with the first element of its successive pair in the path results in a transformed pair set of {(2, 7), (6, 25), (24, 5), (4, 13), (12, 11), (10, 3)}, which comprises entirely eo-pairs. An example where the ee-pair is adjacent to the oo-pair directly comprises the path (6, 2)→(3, 11). Such a path includes no oe-pairs, and thus has an oe-pair path of zero length. In this regard, swapping the second element of the first pair (2) with the first element of the second pair (3), which are adjacent, results in the transformed pair set {(6, 3), (2, 11)|, which comprises entirely eo-pairs.

Such paths are formed out of adjacent pairs. In some embodiments, the adjacent pairs are restricted to be consistent with the first phase of the even-odd transposition sort to be used to generate the algorithm swap command set comprising parallel swap commands for the target qubit position set to be processed. For example, embodiments may determine the first phase of the even-odd transposition sort to be used to generate the algorithm swap command set (e.g., based on user input, hardware configuration of the one-dimensional quantum computing environment, and/or the like). The first phase of sort being even corresponds to a parallel swap command that swaps adjacent positions where the lower index is even. In such circumstances where the first phase of the even-odd transposition sort is even, then even position (e) can only swap with the odd position o where o=e+1. Similarly, in circumstances where the first phase of sort is odd, even position e can only be swapped with odd position o where o=e−1.

Some such embodiments construct paths from each pair of positions from the bipartitioned subsets (e.g., ee-pair to oo-pair) that are consistent with the constraint based on the first phase of sort. In this regard, it should be appreciated that in circumstances where the first phase of sort is even, the pairs adjacent to the ee-pair (e1, e2) that satisfy the restriction imposed by the first phase of sort are the pairs having odd elements e1+1 and e2+1, and accordingly there exists only two such pairs. Similarly, it should be appreciated that in a circumstance where the first phase of sort is odd, the allowable pairs adjacent to the ee-pair (e1, e2) are the pairs having odd elements e1−1 and e2−1. In such circumstances, two such pairs satisfying this constraint exist if neither e1 nor e2 are zero. However, in circumstances where either e1 or e2 is zero, only one such pair exists that satisfies the applicable constraint. Accordingly, there are two paths out of every ee-pair to a corresponding oo-pair in a circumstance where the first phase of sort is even, and 1 or two paths in a circumstance where the first phase of sort is odd. Similarly, it should be appreciated that there are two pairs into every oo-pair if the first phase of sort is even, and 1 or two paths in a circumstance where the first phase of sort is odd. Each intermediate oe-pair in a path from an ee-pair to an oo-air has only a single input and a single output (e.g., the preceding adjacent pair of a first element and the successive adjacent pair of a second element).

In addition to oe-pairs that serve as intermediary pair in any path from an ee-pair to an oo-pair, one or more eo-pairs may form a closed cycle of the form $oe_1 \rightarrow oe_2 \rightarrow oe_N$, where $oe_N$ is adjacent to $oe_1$. In a circumstance where the first phase of sort is odd, then an oe-pair containing the even position (e) where e=0 or the odd position (o) where o=Q−1, where Q is the number of positions, is excluded from either the ee-to-oo paths or the closed cycles of oe-pairs.

The ee-pair set 1754A is utilized to determine a set of pair-disjoint paths from such ee-pairs to the oo-pairs present in the oo-pair set 1754B. Given the ee-pair set 1754A including N total ee-pairs, embodiments determine a set of N pair-disjoint paths from such ee-pairs to the oo-pairs in the oo-pair set 1754B. The paths are used to form a single step parallel swap command by swapping the second element of every pair in the path with the first element of the successive pair, so long as one exists. By forming a single step parallel swap command that accomplishes such a transformation, the starting positions pairing set 1752 may be converted to including entirely eo-pairs in a minimized number of algorithmic steps, thus reducing the time, amount of quantum computing resources, and cost for performing such a conversion in the one-dimensional quantum computing environment.

In some embodiments, a graph is formed to identify and/or analyze the paths between the positions of the first bipartition subset and the positions of the second bipartition subset (e.g., ee-pairs and oo-pairs). In this regard, embodiments may identify the paths between ee-pairs and oo-pairs via the graph, and select any such paths to generate a parallel swap command that converts the starting positions pairing set to satisfy the constraint of having each start position pair with a first element from a first subset of the bipartition of all positions and a second element from a second subset of the bipartition of all positions. In some embodiments, any of a myriad of path analysis and/or selection algorithms may be utilized to select such paths arbitrarily, randomly, and/or the like. Additionally or alternatively, some such embodiments identify and/or process paths in the generated graph to determine the resource costs and/or otherwise the efficiency advantages of each path for converting from the ee-pairs and oo-pairs to eo-pairs, such that the paths resulting in efficiency improvements (e.g., minimization of the worst-case scenario, or any reduction in the worst-case scenario or average scenario).

Based on a starting positions pairing set, which may include all ee-pairs, all oo-pairs, and zero or more eo-pairs that are adjacent and swappable, embodiments may convert an arbitrary pair set to one that satisfies the constraint that each element of a start position pair be from a different subset of the bipartition, for example the even-odd only constraint (e.g., a set that comprises only eo-pairs). For example, some such embodiments process the various paths utilizing efficient shortest path algorithms, such as a modified version of Suurballe's node-disjoint total shortest path algorithm and/or similar algorithms, to identify the paths that reduce the worst-case scenario of efficiency for converting from ee-pairs and oo-pairs to all eo-pairs when considering all ee-pairs. It should be appreciated that the modified Suurballe's algorithm embodies one example implementation of such a methodology for identifying chains of start position pairs (e.g., paths), and the histogram of distances described herein is one of many cost metrics that may be usable. Other embodiments implement other graph theory algorithms and/or modified versions of graph theory algorithms that identify paths from the constructed graph. The modified Suurballe's algorithm may be utilized in circumstances to minimize the worst-case distance associated with such path traversals. In other circumstances, an alternative path analysis and/or path selection algorithm may be implemented, for example that selects the first path(s) identified, selects an arbitrary or otherwise random path, selects a shortest path identified based on another weighting metric, and/or the like. For example, in some embodiments, ease of implementation may be prioritized while reducing overall worst-case as opposed to minimizing the worst-case, and thus an alternative algorithm for analyzing paths may be selected.

FIG. 17B depicts an example weighted, directional graph generated corresponding to an example starting positions pairing set in accordance with at least one example embodiments of the present disclosure, Specifically, FIG. 17B depicts an example weighted, directional graph 1700 generated corresponding to the starting positions pairing set 1752 depicted and described with respect to FIG. 17A. In some such embodiments, the embodiments utilize the ee-pairs set 1754A, the oo-pairs set 1754B, and the eo-pairs set 1754C to generate the weighted, directional graph 1700 ("graph 1700").

The graph 1700 comprises two nodes for each ee-pair in the ee-pairs set 1754A, specifically an input node and an output node. As depicted, for example, the ee-pair (2, 6) is associated with ee-input node 1704A and ee-output node 1704B, ee-pair (8, 22) is associated with ee-input node 1704C and ee-output node 1704D, and ee-pair (14, 20) is associated with ee-input node 1704E and ee-output node 1704F. Similarly, the graph 1700 comprises two nodes for each oo-pair in the oo-pairs set 1754B. As depicted, for example, the oo-pair (1, 9) is associated with oo-input node 1706A and oo-output node 1706B, oo-pair (3, 11) is associated with oo-input node 1706C and oo-output node 1706D, and the oo-pair (21, 23) is associated with the oo-input node 1706E and the oo-output node 1706F.

Embodiments generate the graph 1700 comprising zero-weight directed edges from each input node to the corresponding output node, for example from input node 1704A to 1704B, 1706A to 1706B, 1704C to 1704D, 1706C to 1706D, and the like. The graph 1700 is further generated comprising a single source node depicted as SRC node 1702A ("src 1702A") and a single target node depicted as TAR node 1702B ("tar 1702B"). Src 1702A is associated with a zero-weight directed edge to each of the ee-input nodes 1704A, 1704C, and 1704E corresponding to one of the ee-pairs. Similarly, each oo-output node 1706B, 1706D, and 1706F corresponding to one of the oo-pairs is associated with a zero-weight directed edge to tar 1702B. For each ee-output node 1704B, 1704D, and 1704F, one to two paths to oo-nodes exist. Similarly, for each oo-input node 1706A, 1706C, and 1706E, one to two incoming paths from each ee-output node 1704B, 1704D, and 1704F exists.

In some embodiments, for paths having zero eo-nodes in between ee-pairs and oo-pairs, a single weighted directed edge from the ee-output node to the oo-input node is generated that represents the total cost of traversing the path from the ee-pair to the oo-pair. For example, ee-output node 1704B associated with the ee-pair (2, 6) is directly connected via a single weighted edge to oo-input node 1706A associated with the oo-pair (3, 11), as such pairs include immediately adjacent indices. Alternatively or additionally, in some embodiments, for paths having one or more oe-nodes in between ee-pairs and oo-pairs, a weighted directed edge is created from the ee-output node to the oe-node associated with the first oe-pair in the chain of one or more oe-pairs, where the weighted edge is assigned the weight for all nodes traversed in the chain of one or more oe-pairs to reach a corresponding oo-pair. A zero-weighted edge then is created from the oe-node associated with the first oe-pair to the oo-input node corresponding to the oo-pair swappable with the initial ee-pair. For example, node 1704B associated with the ee-pair (2, 6) is connected to node 1708A associated with the oe-pair (7, 24). In this path, subsequent intermediate oe-nodes must be traversed through until a corresponding oo-node is reached. For example, embodiments may determine that intermediate node 1710A must be traversed through corresponding to swapping the oe-pair (25, 4) with (7, 24), subsequently intermediate node 1710B must be traversed through corresponding to swapping the oe-pair (5, 12) with the oe-pair (25, 4), subsequently intermediate node 1710C must be traversed through corresponding to swapping the oe-pair (13, 10) with the oe-pair (5, 12) until we reach an oe-pair that may be swapped with one of the oo-pairs, namely with the oo-pair (3, 11) corresponding to oo-input node 1706C. In this regard, in some such embodiments the intermediate nodes 1710A-1710C may be optional, and instead the weighted edge between the ee-output node 1704B and the intermediate node 1708A corresponding to the first oe-pair may be weighted as $w_1$ where $w_1$ includes the weights for each subsequent portion of the path, further allowing the intermediate node 1708A to be directly connected with the oo-input node 1706C. In yet other embodiments, the individual intermediate nodes 1710A-1710C are maintained in the graph independently and their individual weights are similarly maintained independently.

In some embodiments, for paths with a sequence of one or more intermediate oe-pairs, the first oe-pair is included in the path with a weighted directed edge from the ee-output node to the oe-node, with a corresponding weight representing the total path weight from ee-to-oo pair. In this regard, the weight from the ee-node to the eo-node may be generated from the weights of all subsequent eo-nodes. In other embodiments, the graph includes the full path intact, including all intermediate nodes connected by weighted edges comprising the weight for each individual node, as describe herein.

The graph 1700 further comprises a sub-graph comprising nodes forming a closed cycle path. As depicted, the graph 1700 comprises nodes 1712A corresponding to oe-pair (27, 16), node 1712B corresponding to oe-pair (17, 18), and node 1712C corresponding to oe-pair (19, 26), Such nodes are each associated with a directed node that connects the node to the node associated with the adjacent position in the swap sequence. Some embodiments process such closed cycle paths independently from the remainder of the graph 1700, for example as described herein with respect to FIGS. 24 and 25. In this regard, it should be appreciated that the pairs corresponding to the nodes of the closed cycle path are not utilized in the paths from any given ee-pair to any given oo-pair.

In some embodiments, the non-zero weights from an ee-node to the first path node represents the total cost of the swap of the even position in all pairs along the path with its adjacent odd position in the next pair in the path. The total cost is measured as a differential histogram of distances of the pairs after the swaps are initiated relative to the pairs before the swaps are initiated. In this regard, given a set of pairs $\{(p_{a,1}, p_{b,1}), (p_{a,2}, p_{b,2}), \ldots, (p_{a,N}, p_{b,N})\}$, embodiments determine the histogram of distances as the number of times each distance $abs(p_{a,k}-p_{b,k})$ occurs for each k in the range $\{1, 2, \ldots N\}$.

FIG. 18 depicts example histogram of distances weight calculations for an example path for traversing through an example graph, in accordance with at least one example embodiment of the present disclosure. Specifically, FIG. 18 depicts calculations of histograms of distances representing the weights of an example path 1800 of the graph 1700. The path comprises nodes 1702A, 1704A, 1704B, 1708A, 1710A, 1710B, 1710C, 1706C, 1706D, and 1702B, which corresponds to the set of pairs 1802A, comprising {(2,6), (7,24), (25,4), (5,12), (13,10), (11,3)}. The distance for each segment of the path is determined by the absolute value of the difference between the two positions in the pair, or in other words abs(p1−p2) where p1 is the first position in the pair and p2 is the second position in the pair. Thus, for the set of pairs 1802, the corresponding distance calculations are indicated as original $sw_1$ to original $sw_6$ respectively in the set of distance calculations 1804A. As depicted, the set of pairs 1802A is associated with the set of distance calculations 1804A comprising {abs(2−6), abs(7−24), abs(25−4), abs(5−12), abs(13−10), abs(11−3)} respectively, yielding the values {4, 17, 21, 7, 3, 8}. The corresponding histogram of distances 1806A is generated by mapping each occurrence of a particular value in the set of distance calculations 1804A to the histogram, thus yielding {3:1, 4:1, 7:1, 8:1, 17:1, 21:1} where each element "x:y" represents the occurrence of the value x in the set of distance calculations 1806A for y number of times (e.g., the value 3 occurs one time, the value 4 occurs one time, the value 7 occurs 1 time, the value 8 occurs 1 time, the value 17 occurs 1 time, and the value 21 occurs one time). The histogram of distances 1806A embodies a histogram of distances for the original pairs in the set 1802A, and may be referred to as $h_0$.

Some embodiments subsequently generate histogram of distances for the position pairs embodying the path after swaps of the pairs have been performed. As depicted, the swapped set of pairs is represented by 1802, comprising {(2, 7), (6, 25), (24, 5), (4, 13), (12, 11), 10, 3)}. The distance for each segment of the swapped path is again determined using the absolute values of the differences between the two positions in the swapped pair. Thus, for the set of swapped pairs 1802B, the corresponding distance calculations are indicated as swapped sw1 to swapped sw6 respectively in the set of distance calculations 1804B for the set of swapped pairs 1802B. As depicted, the set of swapped pairs 1802B is associated with the set of distance calculations 1804B comprising {abs(2−7), abs(6−25), abs(24−5), abs(4−13), abs(12−11), abs(10−3)} respectively, yielding the values {5, 19, 19, 9, 1, 7}. The corresponding histogram of distances 1806B is generated by mapping each occurrence of a particular value in the set of distance calculations 1804B for the set of swapped pairs 1802B to the histogram, thus yielding {19:2, 9:1, 7:1, 5:1, 1:1} (e.g., the value 19 occurs 2 times, the value 9 occurs 1 time, the value 7 occurs 1 time, the value 5 occurs 1 time, and the value 1 occurs 1 time).

Utilizing the histogram of distances for each of the set of pairs 1802A and 1802B, the resulting distances may be compared between the set of original position pairs 1802A and the set of swapped position pairs 1802B. Each distance represents a worst-case measure of efficiency for swapping the positions of the pairs into adjacency. By comparing the histogram of distances for a given path, the worst-case scenarios of each path may be directly identified and/or compared. For example, the histogram of distances 1806A includes a largest (e.g., worst-case) distance of 21 with a second worst-case of 17, whereas the histogram of distances 1806B includes a largest (e.g., worst-case) distance of 19, with a second worst-case of 19 again. In this regard, the original set of position pairs 1802A presents a worst case scenario that is worse than the corresponding worst case scenario for the swapped set of position pairs 1802B.

The histogram of distances 1806A for the set of original position pairs 1802A (e.g., before any swap) and the histogram of distances 1806B for the set of swapped position pairs 1802B (e.g., after the swaps) may be utilized to differential histogram of distances relative to the transformation from original to swapped position pairs. For example, the differential histogram of distances 1808 corresponding to the path 1800 is determinable by subtracting the h0 from h1 (e.g., differential histogram of distances 1808=histogram of distances 1806B corresponding to the set of swapped position pairs 1802B−histogram of distances 1806A corresponding to the set of original position pairs 1802A). As depicted, the differential histogram of distances 1808 resulting therefrom comprises {21:−1, 19:2, 17:−1, 9:1, 8:−1, 5:1, 4:−1, 3:−1, 1:1}.

The differential histogram of distances represents the relative improvement to the worst-case scenario for performing even-odd transposition sort (in a circumstance where the differential histogram of distances includes a maximum distance value that is counted a negative number of times), or represents the relative cost to the worst-case scenario for performing even-odd transposition sort (in a circumstance where the differential histogram of distances includes a maximum distance value that is counted positive number of times), by swapping the original position pairs in the manner described by the path. In this regard, histograms of positive integer values (e.g., positive distances) are comparable and orderable by comparing largest values first using the following procedure. Given a histogram h, the number of times a value v is counted is given by h[v]. If v does not exist in the histogram (e.g., comprising the map), then h[v]==0. No value v exists in the map having h[v]==0, and in some embodiments such values are removed from the map. Subsequently, in some embodiments, the ordering operator< ("less than") is defined on two histograms h1 and h2 such that h1<h2 is true if, and only if, the following procedure yields true:
 1. Determine the max values v1 and v2 such that h1[v1]!=0 and h2[v2]!=0 (a!=b means a is not equal to b)
 2. If v1 does not exist and v2 does not exist, return false
 3. If v2 does not exist, return true if h1[v1]<0 and return false otherwise
 4. If v1 does not exist, return true if h2[v2]>0 and return false otherwise
 5. If v1<v2, return true if h2[v2]>0 and return false otherwise
 6. If v1>v2, return true if h1[v1]<0 and return false otherwise
 7. If v1==v2, return true if h1[v1]<h2[v2] and return false if h1[v1]>h2[v2]
 8. If v1==v2==0, return false
 9. Update v1 and v2 to be the values having h1[v1]!=0 and h2[v2]!=0 and v1 is strictly smaller than its previous value and v2 is strictly smaller than its previous value and repeat steps 2-9 until termination.

Further, in addition to the above process, in some embodiments histograms are comparable to zero. In a circumstance where the max value vmax=max (v|v>0 and h[v]!=0) in the histogram is not zero, then the histogram h>0 if and only if h[vmax]>0 and h<0 if and only if h[vmax]<0. A histogram with no positive zero values is considered zero, which may be equivalent to the empty map.

In some embodiments, histograms can be added. For example, given two histograms h1 and h2, then h=h1+h2 has elements h[v]=h1[v]+h2[v] for all v in either h1 or h2.

Additionally or alternatively, it should be appreciated that, in some embodiments, histograms can be subtracted. For example, given two histograms h1 and h2, then h=h1−h2 has elements h[v]=h1[v]−h2[v] for all v in either h1 or h2).

Additionally or alternatively, in some embodiments, histograms can be negated. For example, given h1, h=−h1 has elements h[v]=−h1[v] for all v in h1.

Histograms having each of such properties enable use in various graph theory algorithms. For example, histograms having each of the above properties enables such histograms to be utilized as weights in the directed graphs described herein, for example with respect to the directed graph 1700 and such properties are leveraged to enable the graph to be processed via Suurballe's algorithm as described herein.

In this regard, the differential histogram of distances 1808 is assigned as the weight $w_1$ in the graph 1700 for the path as depicted. Embodiments may similarly determine the weights of the remaining paths $w_2$, $w_3$, $w_4$, $w_5$, and $w_6$ as depicted. Utilizing the same methodology used to calculate $w_1$, the following weights may be determined:

$w_1$: {21:−1, 19:2, 17:−1, 9:1, 8:−1, 5:1, 4:−1, 3:−1, 1:1};
$w_2$: {9:1, 8:−1, 4:−1, 3:1};
$w_3$: {14:−1, 13:1, 8:−1, 7:1};
$w_4$: {15:1, 14:−1, 2:−1, 1:1};
$w_5$: {15:−1, 13:1, 9:1, 8:−1, 6:−1, 5:1};
$w_6$: {7:1, 6:−1, 3:1, 2:−1}.

In some embodiments, the weights are re-weighted to eliminate negative weights from consideration. In some such embodiments, to re-weight the graph, the minimum of the determined weights emitting from any of the ee-output nodes is subtracted from each weight (e.g., the minimum of $w_1$ to $w_6$ is subtracted from each of the weights $w_1$ to $w_6$). Such re-weighting does not affect the relative total weights across all paths, and thus maintains the prioritization of each path with respect to one another. Additionally, by re-weighting to ensure the weights only reflect positive weights, additional shortest path algorithms that require such conditions as an underlying property—such as Dijkstra's efficient shortest path algorithm—may be utilized as part of the algorithm for determining the total minimum weight across multiple paths of the graph 1700, for example as a subroutine in the implementation of Suurballe's algorithm for processing the graph 1700.

As depicted, for example, the minimum weight ($w_{min}$) is $w_1$. Thus, after re-weighting, such embodiments determine the modified weights as:

$w_1 = w_1 − w_{min}$: { }
$w_2 = w_2 − w_{min}$: {21:1, 19:−2, 17:1, 5:−1, 3:2, 1:−1}
$w_3 = w_3 − w_{min}$: {21:1, 19:−2, 17:1, 14:−1, 13:1, 9:−1, 7:1, 5:−1, 4:1, 3:1, 1:−1}
$w_4 = w_4 − w_{min}$: {21:1, 19:−2, 17:1, 15:1, 14:−1, 9:−1, 8:1, 5:−1, 4:1, 3:1, 2:−1}
$w_5 = w_5 − w_{min}$: {21:1, 19:−2, 17:1, 15:1, 13:1, 6:−1, 4:1, 3:1, 1:−1}
$w_6 = w_6 − w_{min}$: {21:1, 19:−2, 17:1, 9:−1, 8:1, 7:1, 6:−1, 5:−1, 4:1, 3:2, 2:−1, 1:−1}

The fully weighted and constructed graph 1700 may subsequently be processed utilizing one or more graph theory algorithms to determine a shortest total path. In some embodiments, Suurballe's multiple paths shortest total path algorithm modified to perform based on weights embodied by a differential histogram of distances is utilized, as described herein, to find the paths from the ee-pairs of the ee-pairs set 1754A to oo-pairs of the oo-pairs set 1754B. In this regard, using the differential histogram of distances as weights, the implementation of Suurballe's algorithm will find the collection of paths from ee-to-oo that minimize the worst-case distance during a single step of parallel swap commands generated by these paths. In other words, in some embodiments, the modified Suurballe's algorithm is executed to generate a single step algorithm swap command (e.g., can be done in one phase of even-odd transposition sort) that tends to reduce the distance of the modified pairs it generates starting with the worst-case distance as its highest priority.

It should be appreciated that some embodiments utilize histogram of distances to minimize the worst-case total parallel swap commands. As described, the histogram of distances enables determination of the worst-case cost (or benefit) to a particular path and/or otherwise performing a particular path of swaps. In circumstances where the worst-cases between two paths are tied, effects to the next-worst-case can be determined to continue to attempt to identify whether a swap effectuates a reduction in the overall worst-case total number of parallel swap commands. Other embodiments, however, may utilize other metrics for weighting edges of the graph 1700 as depicted without deviating from the scope and spirit of this disclosure. For example, in other embodiments, ease of implementation may be a factor such that the weight for a given edge is preferred to be simplistic to implement rather than most efficient. In this regard, a simple average, sum, or other calculation may be utilized to generate weights rather than the histogram of distances as depicted. Alternatively, a value representing only the worst-case (e.g., without values corresponding to next-worst-cases) may be utilized as edge weights to attempt to reduce the worst-case total number of swaps, even if not minimized, without incurring additional complexities in implementing the histogram of distances.

Example visualizations of intermediary steps in execution of the modified Suurballe's algorithm based on histogram of distances are depicted in FIGS. 19 to 23. In this regard, the modified Suurballe's algorithm begins with a first operation by finding the shortest path tree from the src node 1702A to all nodes in the graph 1700. Since all weights in the graph 1700 are non-negative, Dijkstra's algorithm (or similar shortest path algorithms) may be implemented for such purposes. In this regard, Dijkstra's algorithm returns both the shortest path tree from the src node 1702A to all graph nodes and the distance (i.e. the sum of all weights along the path) from the source node to all graph nodes along the tree paths. In some embodiments, the edges traversed are recorded from the src node 1702A to the tar node 1702B for subsequent processing. As depicted, the path from src 1702A to tar 1702B is embodied by the traversal from src 1702A to ee-input node 1704A to ee-output node 1704B to intermediary node 1708A to oo-input node 1706C (optionally through intermediary eo-nodes 1710A-1710C) to oo-output node 1706D and finally to tar 1702B. FIG. 19 depicts a visualization of the first identified shortest path tree with the shortest path from src 1702A to tar 1702B identified in bold.

Each graph node is associated with a particular distance (e.g., the shortest distance) from the src node 1702A to the particular node. For example, distance d1 of 0 (e.g., an empty map) is the distance from src node 1702A to pair node (7, 24) 1708A, distance d2 of {21:1, 19:−2, 17:1, 15:−1, 13:1, 6:−1, 4:1, 3:1, 1:−1} equivalent to $w_5$ is the distance from src node 1702A to pair node (15, 0) 1708B, and distance d3 of {21:1, 19:−2, 17:1, 9:−1, 8:1, 7:1, 6:−1, 5:−1, 4:1, 3:2, 2:−1, 1:−1} equivalent to $w_6$ is the distance from src node 1702A to pair node (21, 23) 1706E. Because the other weights are zero after these particular nodes, d1 represents the distances to nodes 1710A, 1710B, 1710C, 1706C, 1706D, and 1702B. Similarly, d2 represents the distances to nodes 1706A and 1706B, and d3 represents the distance to node 1706F. Such distances to all nodes in the graph (of which d1, d2, and d3 are examples) are utilized in re-weighting the edges of the graph 1700 as described further herein.

Upon identification of the shortest path tree, in a second operation, the graph weights from each node (u) to subsequent node (v) are updated according to the following:

$$\text{weight}(u \to v) = \text{weight}(u \to v) + \text{dist}(u) - \text{dist}(v),$$

where dist(x) is the distance from src node 1702A to node x in the shortest path tree. FIG. 20 depicts a visualization of the processed portion of the graph 1700 with updated weights based on the shortest path tree and shortest path identified as depicted and described above with respect to FIG. 19. As depicted, all weights contained in the shortest path are updated to have zero weight. Edges not in the shortest path tree (depicted in FIG. 20 as bolded) are updated accordingly, including edges previously having a zero weight. As depicted, for example, weights $w_7$ and $w_8$ become non-zero and have the following values. Similarly, $w_2$, $w_3$, and $w_4$ are updated to have the following values:

$w_2$: {21:1, 19:−2, 17:1, 5:−1, 3:2, 1:−1}
$w_3$: {15:1, 14:−1, 9:−1, 7:1, 6:1, 5:−1}
$w_4$: {15:1, 14:−1, 7:−1, 6:1, 3:−1, 1:1}
$w_7$=d2−d1: {21:1, 19:−2, 17:1, 15:−1, 13:1, 6:−1, 4:1, 3:1, 1:−1}
$w_8$=d3−d1: {21:1, 19:−2, 17:1, 9:−1, 8:1, 7:1, 6:−1, 5:−1, 4:1, 3:2, 2:−1, 1:−1}

Upon completion of re-weighting the edges in the graph 1700, in a third operation, embodiments reverse the direction of the shortest path found in the most-recent performed operation for finding the shortest path tree, as depicted and described with respect to FIGS. 18 and 19. FIG. 21 depicts a visualization of the processed portion of the graph 1700 with the first identified shortest path reversed as depicted and described with respect to FIG. 18. As depicted, the newly reversed edges are depicted in bold. Based on the previously performed re-weighting, the weights for all edges along the reversed path remain zero.

The algorithm then completes this iteration and continues by finding the next shortest path tree in the modified graph 1700, recording the edges of the shortest path from src 1702A to tar 1702B, re-weighting the graph, and reversing the shortest path for the newly found shortest path until the desired number of shortest paths are determined (e.g., the number of ee-pairs in the ee-pairs set 1754A). In the final iteration, it should be appreciated that some embodiments may not re-weight the graph nor reverse the shortest path.

With respect to the ongoing example depicted and described with respect to FIGS. 17A and 17B, FIG. 22 depicts the next shortest path tree identified during the second iteration of Suurballe's algorithm. The shortest path from src 1702A to tar 1702B is similarly depicted in bold. Further, as depicted in FIG. 22, the shortest path is associated with a distance d4 of {21:1, 19:−2, 17:1, 15:−1, 13:1, 6:−1, 4:1, 3:1, 1:−1}. This distance d4 is similarly utilized to update the edges of the previously-updated graph 1700 in the manner described herein. Subsequently, the edges of the path depicted in FIG. 22 are reversed as well in the manner described herein, and a final iteration begins. For purposes of brevity, the intermediate steps for re-weighting the graph and reversing the path are omitted, as they follow the same process depicted and described with respect to FIGS. 20 and 21.

FIG. 23A depicts the final shortest path tree identified during the third and final iteration of Suurballe's algorithm given an ee-pairs set 1704A having three ee-pairs. The shortest path from src 1702A to target 1702B is similarly depicted in bold. The depicted shortest path traverses an edge reversed due to a path traversed in a previous iteration, specifically between oo-input node 1706A associated with the oo-pair (1, 9) and intermediate node 1708B associated with the oe-pair (15, 0), as well as between intermediate node 1708B associated with the oe-pair (15, 0) and ee-output node 1704F associated with the ee-pair (14, 20).

Upon completing all iterations and finding all shortest path trees, embodiments consolidate the paths by removing all edges traversed in both directions the same number of times from the set of all edges traversed in all paths. As described in the ongoing example herein, edges associated with traversing from the oo-input node 1706A associated with the oo-pair (1, 9) to the intermediate node 1708B associated with the oe-pair (15, 0), and from the intermediate node 1708B associated with the oe-pair (15, 0) to ee-output node 1704F associated with the ee-pair (14, 20), are traversed in the reverse directions in the third path identified and previously traversed in the forward direction in the second path identified. Thus, such edges are removed from the set of edges. The remaining set of edges form a set of node-disjoint paths from src to tar with the property that the total sum of weights along all paths is a minimum weight. For purposes of processing at this stage, embodiments ignore the src node 1702A and tar node 1702B. The result is the unique pair-disjoint paths from each ee-pair to an oo-pair.

FIG. 23B illustrates a visualization of the consolidated paths for the example graph 1700, in accordance with at least one example embodiment of the present disclosure. For example, with respect to the ongoing example for processing the starting positions pairing set 1752, the set of paths comprises:

{Path 1: (2, 6)→(7, 24)→(25, 4)→(5, 12)→(13, 10)→(3, 11),
Path 2: (8, 22)→(1, 9)
Path 3: (14, 20)→(21, 23)}

The swaps indicated in each path forms a set of swap commands that may be performed within a single phase of even-odd transposition sort.

In some embodiments, to further improve the worst-case scenario, embodiments further process each closed cycle path individually to determine if swapping the pairs represented in the closed cycle path reduces the differential cost of the newly formed pairs relative to the original pairs (e.g., thus improving the overall worst-case scenario efficiency for such sorting).

FIG. 24 depicts an example visualization of processing a closed cycle path in accordance with at least one example embodiments of the present disclosure. As described herein, the closed cycle path comprises nodes 1712A, 1712B, and 1712C corresponding to the oe-pairs (27, 16), (17, 18), and (19, 26) respectively representing the original pairs set 2402A. In this regard, the closed cycle path is formed as each pair is adjacent to one another, and the last element in the last pair is also adjacent to the first element of the first pair and consistent with the phase of sort to be performed (e.g., the even phase, as depicted, but in other implementations odd phase is first phase of sort). In this regard, should the embodiment determine that the pairs in the closed cycle path should be swapped, every even position swaps with its next adjacent odd position in the cycle, including the last pair cycling back to the first pair. In this regard, the original pairs set 2402A may be swapped to generate the corresponding swapped pairs set 2402B.

The weights associated with the elements of the closed cycle path may be determined in the same manner to those discussed above with respect to the remainder of the graph 1700. As depicted, the original set of pairs 2402A for the closed cycle path is associated with the set of distance calculations (e.g., weights) comprising {abs(27−16), abs(17−18), abs(19−26)} respectively, yielding the values {11, 1, 7}. The corresponding histogram of distances 2406A is generated by mapping each occurrence of a particular value in the set of distance calculations 2404A to the histogram, thus yielding {11:1, 7:1, 1:1}. The histogram of distances 2406A for the original set of pairs 2402A may be referred to as ho within the context of this FIG.

The histogram of distances is similarly determined for after the swaps are performed (e.g., for the set of swapped pairs 2402B). As depicted, the swapped set of pairs is represented by 2402B, comprising {(26, 17), (16, 19), (18, 17)}. The distance for each segment of the swapped path is again determined utilizing the absolute values of the differences between the two positions in the swapped pair. Thus, the corresponding set of distance calculations 2406B for the set of swapped pairs 2402B are indicated as swapped sw1 to swapped sw3, comprising {abs(26−17), abs(16, 19), abs(18−27)} respectively, yielding the values {9, 3, 9}. The corresponding histogram of distances 2406B is generated by mapping each occurrence of a particular value in the set of distance calculations 2404B for the set of swapped pairs 2402B to the histogram, thus yielding {9:2, 3:1} (e.g., the value 9 occurs 2 times, the value 3 occurs one time). This histogram corresponding to the swapped set of pairs 2402B may be referred to as h1.

Utilizing the histogram of distances for each of the set of pairs 2402A and 2402B, a resulting differential histogram of distances 2408 corresponding to the closed cycle path is determinable by subtracting the histogram $h_0$ from $h_1$ (e.g., differential histogram of distances 2408=histogram of distances 2406B−histogram of distances 2406A). As depicted, the differential histogram of distances 2408 resulting therefrom comprises {11:−1, 9:2, 7:−1, 3:1, 1:−1}.

From this differential histogram of distances 2408, embodiments can determine that h<0 because the maximum value (11) has a negative count, making the path's overall improvement to the worst-case scenario beneficial. Thus, some such embodiments determine it is beneficial to perform such swaps, and will include such swap commands in the single step parallel swap command generated therefrom.

It should be appreciated that each closed cycle path may be processed individually. In this regard, in a circumstance where multiple independent closed cycle paths are identified, some such embodiments may process each closed cycle path to determine whether the closed cycle path results in an improvement (e.g., negative h) or cost. Each closed cycle path resulting in an improvement to the worst-case scenario may be processed as part of the single-stage parallel swap command generated.

FIG. 25 depicts an example visualization of an original starting positions pairing set, corresponding initial swap command, and a converted even-odd starting positions pairing set. In particular, FIG. 25 depicts the initial swap command generated for the original starting positions pairing set 1702 via the process depicted and described with respect to FIGS. 17A, 17B, and 18-24.

The initial swap command set 2504 includes all swaps included in the identified consolidated graph of shortest paths determined utilizing the modified Suurballe's algorithm implementation described herein. As depicted and described, such paths included a single-phase swap command consistent with the even phase (for example) of even-odd transposition sort comprising {(4, 5), (6, 7), (8, 9), (10, 11), (12, 13), (20, 21), (24, 25)}. The closed cycle path depicted and described with respect to FIG. 24 further was determined to yield improvements to the worst-case scenario, and thus {(16, 17), (18, 19), (26, 27)} swaps are further included in the set, yielding {(4, 5), (6, 7), (8, 9), (10, 11), (12, 13), (16, 17), (18, 19), (20, 21), (24, 25), (26, 27)}. In this regard, the initial swap command set 2504 includes all single-phase swaps that minimize the worst-case distance. Some embodiments herein may generate an algorithm swap command set that cause performance of the swaps indicated in the initial swap command set 2504 in a first step before sorting the starting positions pairing set 1702.

For example, the initial swap command converts the original starting positions pairing set 1702 into the even-odd starting positions pairing set 2506. The even-odd pairing set thus satisfies all requirements for target assignment via any of the processes described herein, for example with respect to FIGS. 15A, 15B, 16A, and 16B. In this regard, the even-odd starting positions pairing set 2506 may thus subsequently be utilized for target assignment.

In some embodiments, the initial swap command is applied to the targets vector (e.g., the target qubits position set) resulting from target assignment to undo the initial swap command needed to convert from an arbitrary starting positions pairing set (which includes any number of ee-pairs and oo-pairs) to the even-odd starting positions pairing set. The resulting targets vector after re-applying the initial swap command is subsequently sorted utilizing even-odd transposition sort, as described herein, to identify the algorithm swap command set that represents the steps to sort the targets vector.

In some embodiments, as described herein, this process may be performed twice, once using even phase as the first phase of the even-odd transposition sort on the odd-only positions (e.g., embodied in the target_slots vector) and once using odd phase as the first phase of the even-odd transposition sort on the odd-only positions embodied in the target_slots vector. As described, both target vectors are sorted to obtain the steps to sort, and the targets vector with the smaller steps to sort may be selected.

FIG. 26 illustrates an example flowchart of operations for target assignment, for example in an example process for instruction compilation for at least one time slice, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

The illustrated process begins at operation 2602. In some embodiments, the process begins as the first operation of any process. In other embodiments, the process begins after one or more of the operations depicted and/or described with respect to one of the other processes described herein. For example, in some embodiments as described, the process begins after execution of operation 704. In this regard, the process may replace or supplement one or more blocks depicted and/or described with respect to one of the other processes described herein. Additionally or alternatively, in some embodiments, upon completion of the process depicted in FIG. 26, the process ends. Alternatively, in other embodiments, flow may return to one or more of the operations of another process, for example the operation 706.

At operation 2602, the apparatus 200 identifies a starting positions pairing set. For example, the apparatus 200 includes means, such as the qubit instruction processing module 210, input/output module 206, communications module 208, processor 202, and/or the like, or a combination thereof, for identifying a starting positions pairing set. The starting positions pairing set may include the position pairs for qubits to be gated at a particular time slice, for example as determined from a quantum circuit. The starting positions pairing set may be in any of a myriad of formats, for example eo-exclusive, arbitrary (may include ee- or oo-pairs), and/or the like.

At operation 2604, the apparatus 200 determines the starting positions pairing set satisfies an even-odd only constraint. For example, the apparatus 200 includes means, such as the qubit instruction processing module 210, input/output module 206, communications module 208, processor 202, and/or the like, or a combination thereof, for determining the starting positions pairing set satisfies an even-odd only constraint. In some embodiments, the apparatus 200 iterates through the starting positions pairing set and tests whether each position pair includes an even position and an odd position, thus embodying an eo-pair.

At operation 2606, the apparatus 200 generates a target slots vector based at least in part on the starting positions pairing set. For example, the apparatus 200 includes means, such as the qubit instruction processing module 210, input/output module 206, communications module 208, processor 202, and/or the like, or a combination thereof, for generating a target slots vector based at least in part on the starting positions pairing set. In some embodiments, the apparatus 200 generates the target slots vector utilizing a particular slot determination algorithm, as described herein. In some embodiments, the apparatus 200 fixes even slots (and/or even positions) and assigns the target slots vector to odd slots and/or positions. In other embodiments, the apparatus 200 fixes odd slots (and/or odd positions) and assigns the target slots vector to even slots and/or positions.

At operation 2608, the apparatus 200 determines a target slots midpoint vector by sorting the target slots vector utilizing even-odd transposition sort. For example, the apparatus 200 includes means, such as the qubit instruction processing module 210, input/output module 206, communications module 208, processor 202, and/or the like, or a combination thereof, for determining a target slots midpoint vector by sorting the target slots vector utilizing even-odd transposition sort. In some embodiments, the even-odd transposition sort is utilized to sort the target slots vector and identify the target slots midpoint vector in the manner described herein with respect to FIGS. 13, 14, 15A, 15B, 16A, and 16B.

At operation 2610, the apparatus 200 generates the target qubit position set based at least in part on the target slots midpoint vector. For example, the apparatus 200 includes means, such as the qubit instruction processing module 210, input/output module 206, communications module 208, processor 202, and/or the like, or a combination thereof, for generating the target qubits position set based at least in part on the target slots midpoint vector. For example, in some embodiments, the apparatus 200 assigns values to the indices of the target qubit positions set embodying a targets vector based on the values in the target slots midpoint vector. Non-limiting examples of such target qubit position set generation are described herein with respect to FIGS. 15A, 15B, 16A, and 16B.

FIG. 27 illustrates an example flowchart of operations for target assignment, for example in an example process for instruction compilation for at least one time slice, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

The illustrated process begins at operation 2702. In some embodiments, the process begins as the first operation of any process. In other embodiments, the process begins after one or more of the operations depicted and/or described with respect to one of the other processes described herein. For example, in some embodiments as described, the process begins after execution of operation 2606. In this regard, the process may replace or supplement one or more blocks depicted and/or described with respect to one of the other processes described herein. Additionally or alternatively, in some embodiments, upon completion of the process depicted in FIG. 27, the process ends. Alternatively, in other embodiments, flow may return to one or more of the operations of another process, for example the operation 2610.

At operation 2702, the apparatus 200 assigns, for each even position in the starting positions pairing set, a fixed slot of an available slot set. For example, the apparatus 200 includes means, such as the qubit instruction processing module 210, input/output module 206, communications module 208, processor 202, and/or the like, or a combination thereof, for assigning, for each even position in the starting positions pairing set, a fixed slot of an available slot set. The slots may be assigned utilizing a particular slot determination algorithm. Alternatively, in some embodiments, the apparatus 200 assigns, for each odd position in the start positions pairing set, a fixed slot of an available slot set. Non-limiting examples of slot assignment are described herein with respect to FIGS. 14, 15A, and 16A.

At operation 2704, the apparatus 200 sorts the target slots vector to attain parity between the slot value for each odd position and the fixed slot for the even position associated with the odd position. For example, the apparatus 200 includes means, such as the qubit instruction processing module 210, input/output module 206, communications module 208, processor 202, and/or the like, or a combination thereof, for sorting the target slots vector to attain parity between the slot value for each odd position and the fixed slot for the even position associated with the odd position. In some embodiments, the apparatus 200 sorts the target slots vector utilizing even-odd transposition sort, as described herein. Non-limiting examples of sorting the target slots vector to attain parity (e.g., equivalent to the common-column property) are described herein with respect to FIGS. 15A and 16A.

FIG. 28 illustrates an example flowchart of operations for target assignment, for example in an example process for instruction compilation for at least one time slice, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

The illustrated process begins at operation 2802. In some embodiments, the process begins as the first operation of any process. In other embodiments, the process begins after one or more of the operations depicted and/or described with respect to one of the other processes described herein. For example, in some embodiments as described, the process begins after execution of operation 2610. In this regard, the process may replace or supplement one or more blocks depicted and/or described with respect to one of the other processes described herein. Additionally or alternatively, in some embodiments, upon completion of the process depicted in FIG. 28, the process ends. Alternatively, in other embodiments, flow may return to one or more of the operations of another process, for example the operation 2610.

At operation 2802, the apparatus 200 identifies an original starting positions pairing set corresponding to the qubit pairing set. For example, the apparatus 200 includes means, such as the qubit instruction processing module 210, input/output module 206, communications module 208, processor 202, and/or the like, or a combination thereof, identifying an original starting positions pairing set corresponding to the qubit pairing set. Original starting positions pairing set may not satisfy one or more applicable constraints, for example as it may be based solely on the qubits to be paired at the time slice to be processed. The original starting positions pairing set may be parsed and/or otherwise extracted from a quantum circuit as described herein. In some embodiments, the original starting positions pairing set is embodied by the qubit pairing set.

At operation 2804, the apparatus 200 determines the original starting positions pairing set does not satisfy the even-odd only constraint. For example, the apparatus 200 includes means, such as the qubit instruction processing module 210, input/output module 206, communications module 208, processor 202, and/or the like, or a combination thereof, for determining the original starting positions pairing set does not satisfy the even-odd only constraint. The apparatus 200 may check each positions pair in the original starting positions pairing set to identify one or more ee-pairs and/or oo-pairs. Alternatively or additionally, in some embodiments the apparatus 200 processes the original starting positions pairing set to determine that the original starting positions pairing set does not satisfy one or more prerequisite (e.g., additional) constraints, for example an evenness constraint or a fullness constraint as described herein.

At operation 2806, the apparatus 200 converts the original starting positions pairing set to the starting positions pairing set satisfying the even-odd only constraint by applying the original starting positions pairing set to a modified Suurballe's algorithm. For example, the apparatus 200 includes means, such as the qubit instruction processing module 210, input/output module 206, communications module 208, processor 202, and/or the like, or a combination thereof, for converting the original starting positions pairing set to the starting positions pairing set satisfying the even-odd only constraint by applying the original starting positions pairing set to a modified Suurballe's algorithm. In some embodiments, the modified Suurballe's algorithm includes or is otherwise configured for generating a plurality of differential histogram of distances. Additionally or alternatively, in some embodiments, the modified Suurballe's algorithm includes or is configured for converting the original starting positions pairing set based on the plurality of differential histogram of distances. Non-limiting examples of converting the original starting positions pairing set utilizing a modified Suurballe's algorithm are described herein with respect to FIGS. 17A, 17B, and 18-25.

FIG. 29 illustrates an example flowchart of operations for target assignment, for example in an example process for instruction compilation for at least one time slice, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

The illustrated process begins at operation 2902. In some embodiments, the process begins as the first operation of any process. In other embodiments, the process begins after one or more of the operations depicted and/or described with respect to one of the other processes described herein. For example, in some embodiments as described, the process begins after execution of operation 2602. In this regard, the process may replace or supplement one or more blocks depicted and/or described with respect to one of the other processes described herein. Additionally or alternatively, in some embodiments, upon completion of the process depicted in FIG. 29, the process ends. Alternatively, in other embodiments, flow may return to one or more of the operations of another process, for example the operation 2604.

At operation 2902, the apparatus 200 determines an original starting pairing set does not satisfy at least one additional constraint. For example, the apparatus 200 includes means, such as the qubit instruction processing module 210, input/output module 206, communications module 208, processor 202, and/or the like, or a combination thereof, for determining an original starting positions pairing set does not satisfy at least one additional constraint. In some embodiments, the apparatus 200 performs one or more algorithmic process(es) to check whether the original starting positions pairing set satisfies an evenness constraint and/or a fullness constraint, as described herein. In circumstances where the apparatus 200 determines the original starting positions pairing set satisfies both additional constraints (and/or any other constraints required by the apparatus 200), the apparatus 200 may continue to process the original starting positions pairing set, such as to determine whether the set satisfies an even-odd only constraint and/or to proceed with target assignment.

At operation 2904, the apparatus 200 updates the original starting positions pairing set to satisfy the at least one additional constraint. For example, the apparatus 200 includes means, such as the qubit instruction processing module 210, input/output module 206, communications module 208, processor 202, and/or the like, or a combination thereof, for updating the original starting positions pairing set to satisfy the at least one additional constraint. In some embodiments, for example, the apparatus 200 assigns one or more new positions to be paired in the original starting positions pairing set. Such new positions may be utilized to satisfy a fullness constraint. Additionally or alternatively, in some embodiments, the original starting positions pairing set is updated with new position pairs. For example, the apparatus 200 may generate new position pairs for unused positions not previously present in the original starting positions pairing set to satisfy a fullness constraint. Alternatively or additionally, in some embodiments, a vacancy position may be created to satisfy an evenness constraint.

FIG. 30 illustrates an example flowchart of operations for target assignment, for example in an example process for instruction compilation for at least one time slice, in accordance with at least one example embodiments of the present disclosure. In this regard, the example operations are depicted and described with respect to the perspective of the controller 30. In this regard, the controller 30 may be embodied by any number of computing devices, for example the apparatus 200 as depicted and described herein with respect to FIG. 2. The apparatus 200 may be configured for communication with any number of other devices and/or systems, for example the computing entity 10 and/or other components of the quantum computer 102. In this regard, each operation will be described from the perspective of the controller 30 embodied by the specially configured apparatus 200.

The illustrated process begins at operation 3002. In some embodiments, the process begins as the first operation of any process. In other embodiments, the process begins after one or more of the operations depicted and/or described with respect to one of the other processes described herein. For example, in some embodiments as described, the process begins after execution of operation 2610. In this regard, the process may replace or supplement one or more blocks depicted and/or described with respect to one of the other processes described herein. Additionally or alternatively, in some embodiments, upon completion of the process depicted in FIG. 30, the process ends. Alternatively, in other embodiments, flow may return to one or more of the operations of another process, for example the operation 2610.

At operation 3002, the apparatus 200 determines a second target slots midpoint vector by sorting the target slots vector beginning at a second phase. For example, the apparatus 200 includes means, such as the qubit instruction processing module 210, input/output module 206, communications module 208, processor 202, and/or the like, or a combination thereof, for determining a second target slots midpoint vector by sorting the target slots vector beginning at a second phase. The second phase may be opposite a first phase utilized to generate a first target qubit position set. For example, in some embodiments, the apparatus 200 generates a first target qubit position set by sorting the target slots vector beginning in an even phase, and then performs sorting beginning in the odd phase of sort. Alternatively, in other embodiments, the apparatus 200 generates a first target qubit position set by sorting the target slots vector beginning in an odd phase, and then performs sorting beginning in the even phase of sort.

At operation 3004, the apparatus 200 generates a second target qubit position set based at least in part on the target slots midpoint vector, the second target qubit position set additional to the first target qubit position set previously generated. For example, the apparatus 200 includes means, such as the qubit instruction processing module 210, input/output module 206, communications module 208, processor 202, and/or the like, or a combination thereof, for generating a second target qubit position set based at least in part on the target slots midpoint vector, the second target qubit position set additional to the first target qubit position set previously generated. The first target qubit position set may have been previously generated at the opposite phase of sort from the second phase. It should be appreciated that the second target qubit position set is generated in a manner to that similarly described with respect to block 2610 utilizing the second target slots midpoint vector. Non-limiting examples of such two target slots vectors are described with respect to FIGS. 15A, 15B, 16A, and 16B.

At operation 3006, the apparatus 200 sorts the first target qubit position set utilizing even-odd transposition sort to generate a first algorithm swap command set. For example, the apparatus 200 includes means, such as the qubit instruction processing module 210, input/output module 206, communications module 208, processor 202, and/or the like, or a combination thereof, for sorting the first target qubit position set utilizing even-odd transposition sort to generate a first algorithm swap command set. The first algorithm swap command set identifies all parallel swaps to be performed based on the even-odd transposition sort. Non-limiting examples of such sorting is described herein with respect to FIGS. 4-12.

At operation 3008, the apparatus 200 sorts the second target qubit position set utilizing even-odd transposition sort to generate a second algorithm swap command set. For example, the apparatus 200 includes means, such as the qubit instruction processing module 210, input/output module 206, communications module 208, processor 202, and/or the like, or a combination thereof, for sorting the second target qubit position set utilizing even-odd transposition sort to generate a second algorithm swap command set. It should be appreciated that the second target qubit position set is generated in a manner similar to that generated at block 3008. However, the resulting first and second algorithm swap command sets differ in the parallel swaps required based on the differences between the first target qubit position set and the second target qubit position set. In this regard, each algorithm swap command set may include a different number of steps, as described herein.

At operation 3010, the apparatus 200 compares a first number of steps represented by the first algorithm swap command set and a second number of steps represented by the second swap command set. For example, the apparatus 200 includes means, such as the qubit instruction processing module 210, input/output module 206, communications module 208, processor 202, and/or the like, or a combination thereof, for comparing a first number of steps represented by the first algorithm swap command set and a second number of steps represented by the second swap command set. In this regard, the apparatus 200 may determine which of the algorithm swap command sets includes less steps (e.g., less algorithm swap commands including parallel swaps). Non-limiting examples of the stages of even-odd transposition sort are described herein with respect to FIGS. 5-12, 15A, and 15B.

At operation 3012, the apparatus 200 selects the first target qubit position set or the second target qubit position set based on the comparison between the first number of steps and the second number of steps. For example, the apparatus 200 includes means, such as the qubit instruction processing module 210, input/output module 206, communications module 208, processor 202, and/or the like, or a combination thereof, for selecting the first target qubit position set or the second target qubit position set based on the comparison between the first number of steps and the second number of steps. In some embodiments, the apparatus 200 selects the target qubit position set resulting in fewer number of steps (e.g., stages of the even-odd transposition sort). The apparatus 200 may subsequently implement instructions for executing the parallel swaps represented by the target qubit position set that is associated with the fewer number of steps. Non-limiting examples of selecting the target qubit position set based on the fewer number of steps are described herein with respect to FIGS. 15A, 15B, 16A, and 16B.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data, files, documents, and/or the like, to and receiving data, files, documents, and/or the like, from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for instruction compilation for at least one time slice in a one-dimensional quantum computing environment, the computer-implemented method comprising:
    identifying an initial qubit position set associated with a qubit set, the qubit set associated with a qubit pairing set for gating at a first time slice, the qubit pairing set including at least one qubit pair, each qubit pair having a first qubit and a second qubit;
    identifying a target qubit position set associated with the qubit set and the initial qubit position set at a first time slice,
    wherein, for each qubit pair, the first qubit is associated with a first target position index in the target qubit position set and the second qubit is associated with a second target position index in the target qubit position set, and wherein the first target position index is adjacent to the second target position index; and
    generating an algorithm swap command set by performing an even-odd transposition sort based on at least the target qubit position set.

2. An apparatus for instruction compilation for at least one time slice in a one-dimensional quantum computing environment, the apparatus comprising at least one processor and at least one non-transitory memory having computer program instructions stored thereon, wherein the computer program instructions in execution with the at least one processor configures the apparatus to:
    identify an initial qubit position set associated with a qubit set, the qubit set associated with a qubit pairing set for gating at a first time slice, the qubit pairing set including at least one qubit pair, each qubit pair having a first qubit and a second qubit;
    identify a target qubit position set associated with the qubit set and the initial qubit position set at a first time slice,
    wherein, for each qubit pair, the first qubit is associated with a first target position index in the target qubit position set and the second qubit is associated with a second target position index in the target qubit position set, and wherein the first target position index is adjacent to the second target position index; and
    generate an algorithm swap command set by performing an even-odd transposition sort based on at least the target qubit position set.

3. The apparatus of claim 2, wherein to generate the algorithm swap command set, the apparatus is configured to:
    store, in a data object representing the algorithm swap command set, a first swap indicator for each even swap determined from the even-odd transposition sort, and storing, to the data object representing the algorithm swap command set, a second swap indicator for each odd swap determined from the even-odd transposition sort.

4. The apparatus of claim 2, wherein to generate the algorithm swap command set, the apparatus is configured to:
    determine, while executing the even-odd transposition sort, a second qubit pair for gating at the first time slice is associated with a first position index and a second position index, wherein the first position index and second position index represent adjacent position indices;

store at least one command to perform a logical operation based on at least the second qubit pair; and determine a first updated target qubit position index and a second updated target qubit position index for the second qubit pair, wherein the first updated target qubit position index and the second updated target qubit position index are determined based on a second time slice.

5. The apparatus of claim 2, wherein the target qubit position set represents a second initial qubit position set, and wherein the apparatus is further configured to:

identify a second initial qubit position set at a second time slice based on the target qubit position set of the first time slice, identify a second target qubit position set associated with the qubit set at a second time slice based on the initial qubit position set at the second time slice; and generate a second algorithm swap command set by performing a second even-odd transposition sort based on at least the second target qubit position set.

6. The apparatus of claim 2, wherein to identify the target qubit position set, the apparatus is configured to:

receive a quantum program comprising a qubit pairing set associated with the qubit set, the qubit pairing set representing the at least one qubit pair for gating at the first time slice; and generate the target qubit position set based on the qubit pairing set.

7. The apparatus of claim 6, wherein for each qubit pair of the at least one qubit pair for gating, the first qubit is associated with a first initial position index of the initial qubit position set and the second qubit is associated with a second initial position index of the initial qubit position set, and wherein to generate the target qubit position set, the apparatus is configured to:

determine, for each of the at least one qubit pair for gating at the first time slice and starting with a qubit pair having a greatest position distance based on at least the first initial position index and the second initial position index, a near-midpoint open index pair based on at least the first initial position index and the second initial position index, wherein the near-midpoint open index pair comprises the first target position index and the second target position index; and assign, in the target qubit position set, the first target position index and the second target position index based on at least the near-midpoint open index pair.

8. The apparatus of claim 2, the apparatus further configured to:

generate, based on at least the algorithm swap command set, a qubit manipulation instruction set, the qubit manipulation instruction set comprising any number of qubit swap instructions, any number of qubit split instructions, any number of qubit join instructions, and any number of qubit shift instructions.

9. The apparatus of claim 8, the apparatus further configured to:

generate a hardware instruction set based on at least the qubit manipulation instruction set, wherein the hardware instruction set comprises at least one action to be performed by qubit manipulation hardware to position the qubit set based on the qubit manipulation instruction set; and the apparatus further comprising the qubit manipulation hardware configured for executing the hardware instruction set.

10. The apparatus of claim 2, wherein to identify the target qubit position set, the apparatus is configured to:

identify a starting positions pairing set corresponding to the qubit pairing set;

generate a target slots vector based at least in part on the starting positions pairing set;

determine a target slots midpoint vector by sorting the target slots vector utilizing even-odd transposition sort; and generate the target qubit position set based at least in part on the target slots midpoint vector.

11. The apparatus of claim 10, further configured to:

determine the start positions pairing set satisfies a first constraint indicating that each start positions pair in the start positions pairing set comprises:

a first position existing in a first subset of an equal bi-partitioning of all positions, and a second position existing in a second subset of the equal bi-partitioning of all positions, wherein each position in the first subset of the equal bi-partitioning is associated with a unique position in the second subset of the bipartitioning.

12. The apparatus of claim 11, wherein to generate the target slots vector, the apparatus is configured to:

assign, for each position in the first subset of the equal bi-partitioning, a fixed slot of an available slot set; and generate the target slots vector comprising, for each starting positions pair comprising the first position from the first subset of the equal bi-partitioning of all positions and the second position from the second subset of the equal bi-partitioning of all positions, a second slot representing the second position, the second slot generated at an index of the target slots vector corresponding to the fixed slot of the available slot set assigned for the first position.

13. The apparatus of claim 12, wherein to determine the target slots midpoint vector by sorting the target slots vector utilizing even-odd transposition sort, the apparatus is configured to:

sort the target slots vector to attain, for each starting position pair in the starting positions pairing set, parity between the second slot representing the second position and the fixed slot assigned for the first position.

14. The apparatus of claim 12, wherein the starting positions pairing set comprises a plurality of even-odd position pairs, each even-odd position pair comprising an even position and an odd position associated with the even position, wherein the targets slots vector is generated based on assigning the fixed slot of the available slot set for even position of the plurality of even-odd position pairs, and the target slots vector is generated based on each odd positions of the plurality of even-odd position pairs.

15. The apparatus of claim 11, the apparatus further configured to:

identify an original starting positions pairing set corresponding to the qubit pairing set;

determine the original starting positions pairing set does not satisfy the first constraint; and convert the original starting positions pairing set to the starting positions pairing set to satisfy the first constraint by:

generate a weighted graph based on the original starting positions pairing set; and apply a path selection algorithm to the graph.

16. The apparatus of claim 15, wherein to generate the weighted graph, the apparatus is configured to:
  generate a first set of nodes representing a first subset of pairs from the original starting positions pairing set, the first subset of pairs comprising a subset of ee-pairs or a subset of oo-pairs from the original starting positions pairing set;
  generate a second set of nodes representing a second subset of pairs from the original starting positions pairing set, the second subset of pairs comprising the other of the ee-pairs or the subset of oo-pairs from the original starting positions pairing set;
  generate a third set of nodes representing a third subset of pairs from the original starting positions pairing set, the third subset of pairs comprising a subset of eo-pairs from the original starting positions pairing set;
  generate a first set of directed edges emitting from each first node associated with the first set of nodes to a second node associated with the second set of nodes, wherein the first node is associated with a starting positions pair comprising at least one position that is adjacent to at least one position of a second starting positions pair associated with the second node consistent with a first phase of sort;
  generate a single source node and a second set of directed edges from the single source node to each node of the first set of nodes; and
  generate a single target node and a third set of directed edges from each node of the second set of nodes to the single target node.

17. The apparatus of claim 16, wherein the path selection algorithm comprises a Suurballe's algorithm implementation that finds a set of node-disjoint paths from the single source node to the single target node, the set of node-disjoint paths representing paths from the ee-pairs to the oo-pairs in one parallel swap command.

18. The apparatus of claim 17, wherein the Suurballe's algorithm implementation comprises a modified Suurballe's algorithm configured to:
  generate edge weights for one or more of the first set of directed edges, the second set of directed edges, and the third set of directed edges representing a differential histogram of distances.

19. The apparatus of claim 15, the apparatus further configured to:
  determine the original starting positions pairing set does not satisfy at least one additional constraint; and
  update the original starting positions pairing set to satisfy the at least one additional constraint.

20. A computer program product for instruction compilation for at least one time slice in a one-dimensional quantum computing environment, the computer program product comprising at least one non-transitory computer-readable storage medium storing computer program code thereon, the computer program code, in execution with at least one processor, configured for:
  identifying an initial qubit position set associated with a qubit set, the qubit set associated with a qubit pairing set for gating at a first time slice, the qubit pairing set including at least one qubit pair, each qubit pair having a first qubit and a second qubit;
  identifying a target qubit position set associated with the qubit set and the initial qubit position set at a first time slice,
  wherein, for each qubit pair, the first qubit is associated with a first target position index in the target qubit position set and the second qubit is associated with a second target position index in the target qubit position set, and wherein the first target position index is adjacent to the second target position index; and
  generating an algorithm swap command set by performing an even-odd transposition sort based on at least the target qubit position set.

* * * * *